(12) United States Patent
Bone et al.

(10) Patent No.: US 10,429,619 B2
(45) Date of Patent: Oct. 1, 2019

(54) OPTICAL IMAGING LENS

(71) Applicant: Genius Electronic Optical Co., Ltd., Taichung (TW)

(72) Inventors: Matthew Bone, Fujian (CN); Jiayuan Zhang, Fujian (CN); Ruibin Yang, Fujian (CN)

(73) Assignee: GENIUS ELECTRONIC OPTICAL (XIAMEN) CO., LTD., Xiamen, Fujian (CN)

(*) Notice: Subject to any disclaimer, the term of this patent is extended or adjusted under 35 U.S.C. 154(b) by 86 days.

(21) Appl. No.: 15/725,292

(22) Filed: Oct. 5, 2017

(65) Prior Publication Data

US 2019/0064480 A1 Feb. 28, 2019

(30) Foreign Application Priority Data

Aug. 22, 2017 (CN) .......................... 2017 1 0723422

(51) Int. Cl.
*G02B 13/00* (2006.01)
*G02B 9/60* (2006.01)
*G02B 13/18* (2006.01)

(52) U.S. Cl.
CPC ........... *G02B 13/0045* (2013.01); *G02B 9/60* (2013.01); *G02B 13/18* (2013.01)

(58) Field of Classification Search
CPC .............................. G02B 13/0045; G02B 9/60
USPC .......................................................... 359/714
See application file for complete search history.

(56) References Cited

FOREIGN PATENT DOCUMENTS

| CN | 104166220 | 11/2014 |
|----|-----------|---------|
| TW | 201403121 | 1/2014 |
| WO | 2016171811 | 10/2016 |
| WO | 2017023086 | 2/2017 |

OTHER PUBLICATIONS

"Office Action of Taiwan Counterpart Application," dated Jan. 18, 2018, p. 1-p. 7.

*Primary Examiner* — Evan P Dzierzynski
*Assistant Examiner* — Mitchell T Oestreich
(74) *Attorney, Agent, or Firm* — JCIPRNET

(57) ABSTRACT

The present invention provides an optical imaging lens including a first lens element, a second lens element, a third lens element, a fourth lens element and a fifth lens element arranged in a sequence from an object side to an image side. The present invention can shorten the lens length, enlarge field of view angle and have good thermal stability performance in a good optical performance condition via controlling the concave and convex shape design and arrangement of the object side surface or the image side surface of the abovementioned lens element, controlling the material of the abovementioned lens element in the optical imaging lens, and satisfying conditional expressions.

20 Claims, 53 Drawing Sheets

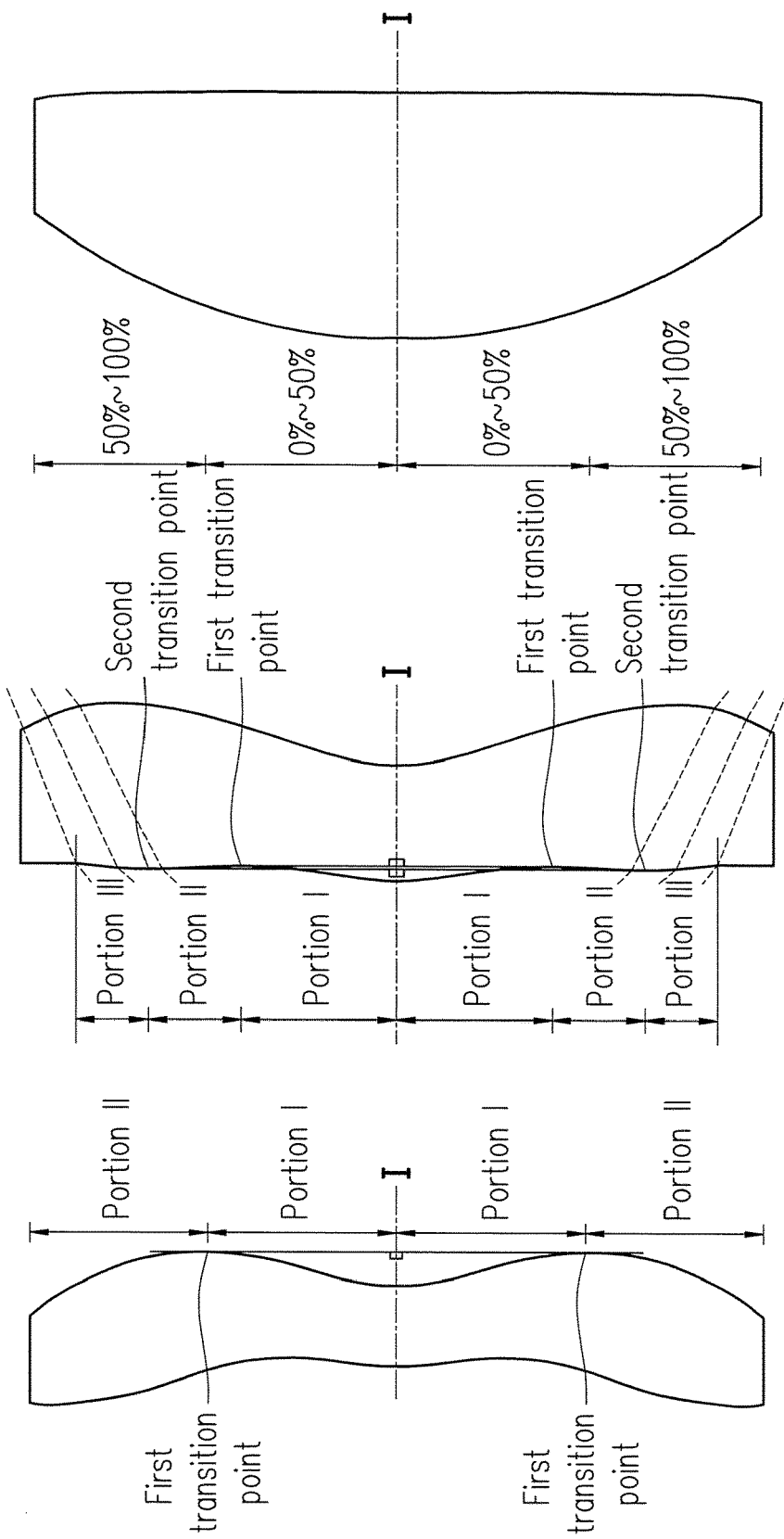

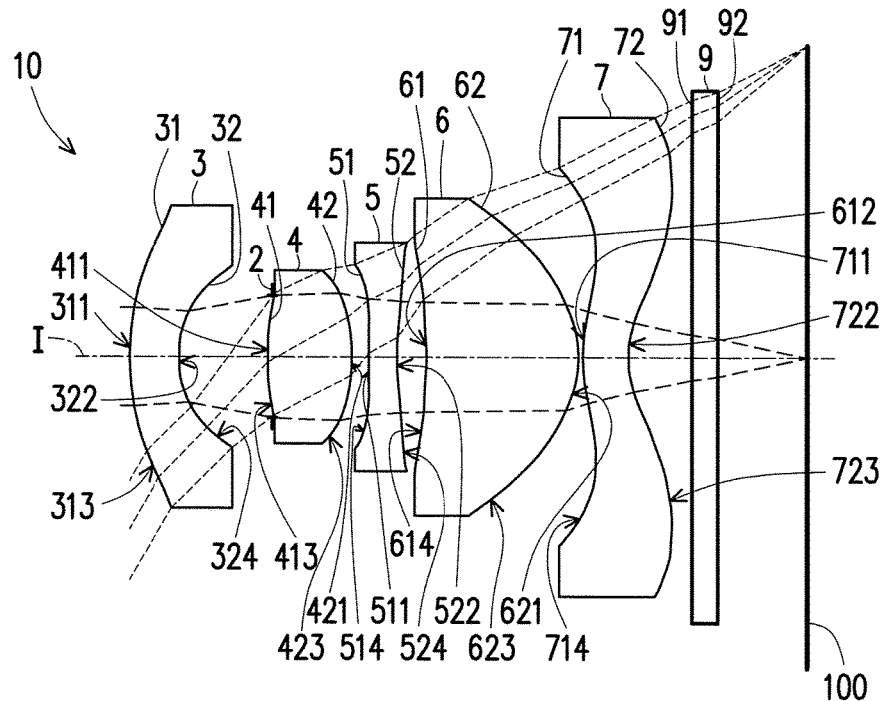
FIG. 6
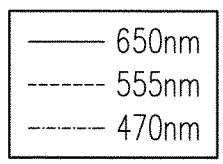
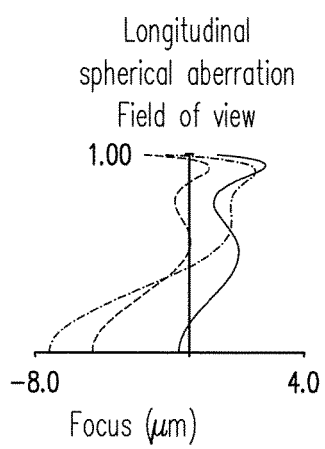
FIG. 7A
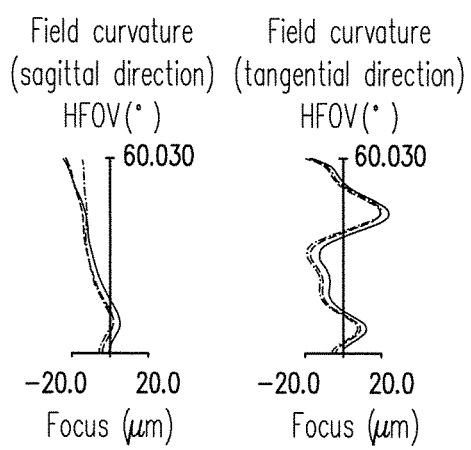
FIG. 7B   FIG. 7C
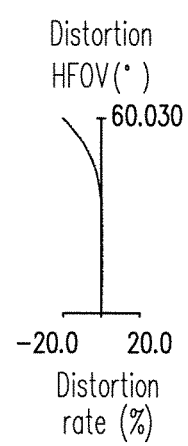
FIG. 7D

| First Embodiment | | | | | | | | |
|---|---|---|---|---|---|---|---|---|
| System focal length= 1.924 mm , Half field of view=60.03°, F-number=2.4, System length= 5.501mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.284 | 0.397 | Plastic | 1.535 | 55.712 | -2.730 |
| | Image-side surface 32 | Aspheric surface | 0.839 | 0.763 | | | | |
| Aperture stop 2 | | | Infinity | -0.040 | | | | |
| Second lens element 4 | Object-side surface 41 | Aspheric surface | 2.047 | 0.682 | Plastic | 1.535 | 55.780 | 1.835 |
| | Image-side surface 42 | Aspheric surface | -1.678 | 0.137 | | | | |
| Third lens element 5 | Object-side surface 51 | Aspheric surface | 5.851 | 0.232 | Plastic | 1.642 | 22.409 | -6.844 |
| | Image-side surface 52 | Aspheric surface | 2.482 | 0.232 | | | | |
| Fourth lens element 6 | Object-side surface 61 | Aspheric surface | -5.668 | 1.240 | Glass | 1.553 | 71.685 | 1.657 |
| | Image-side surface 62 | Aspheric surface | -0.853 | 0.037 | | | | |
| Fifth lens element 7 | Object-side surface 71 | Aspheric surface | 1.385 | 0.367 | Plastic | 1.642 | 22.409 | -2.672 |
| | Image-side surface 72 | Aspheric surface | 0.689 | 0.514 | | | | |
| Filter 9 | Object-side surface 91 | Spherical surface | Infinity | 0.210 | | | | |
| | Image-side surface 92 | Spherical surface | Infinity | 0.731 | | | | |
| | Image plane 100 | | Infinity | | | | | |

FIG. 8

| Surface | K | $a_2$ | $a_4$ | $a_6$ | $a_8$ |
|---|---|---|---|---|---|
| 31 | 1.283830E+00 | 0.000000E+00 | 3.816472E-02 | -4.017317E-02 | -5.498001E-03 |
| 32 | -9.109705E-01 | 0.000000E+00 | 2.991908E-01 | 1.707322E-01 | 0.000000E+00 |
| 41 | -1.260135E+00 | 0.000000E+00 | -2.166294E-02 | 6.966277E-02 | -9.061555E-01 |
| 42 | 1.044176E+00 | 0.000000E+00 | -4.102844E-01 | 9.635318E-01 | -2.919323E+00 |
| 51 | 0.000000E+00 | 0.000000E+00 | -7.748201E-01 | 1.062599E+00 | -1.075937E+00 |
| 52 | 4.044626E+00 | 0.000000E+00 | -5.110370E-01 | 6.895117E-01 | -5.360999E-01 |
| 61 | 2.482565E+01 | 0.000000E+00 | 3.652515E-02 | -2.743310E-01 | 4.662961E-01 |
| 62 | -4.658302E+00 | 0.000000E+00 | -3.868307E-01 | 5.959886E-01 | -9.123231E-01 |
| 71 | -2.464857E+00 | 0.000000E+00 | -3.111647E-01 | 1.585063E-01 | -1.325729E-01 |
| 72 | -3.505911E+00 | 0.000000E+00 | -1.532556E-01 | 5.635618E-02 | -7.322274E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.636986E+00 | -4.308654E+00 | 0.000000E+00 | 0.000000E+00 | |
| 51 | 0.000000E+00 | 0.000000E+00 | 0.000000E+00 | 0.000000E+00 | |
| 52 | 2.896398E-01 | -1.299660E-01 | 0.000000E+00 | 0.000000E+00 | |
| 61 | -3.325031E-01 | 2.272390E-01 | -9.866782E-02 | 0.000000E+00 | |
| 62 | 9.309680E-01 | -5.801021E-01 | 1.952739E-01 | -2.658872E-02 | |
| 71 | 1.137822E-01 | -5.877456E-02 | 1.537202E-02 | -1.566175E-03 | |
| 72 | -2.492450E-03 | 1.142067E-03 | -1.797334E-04 | 1.082419E-05 | |

FIG. 9

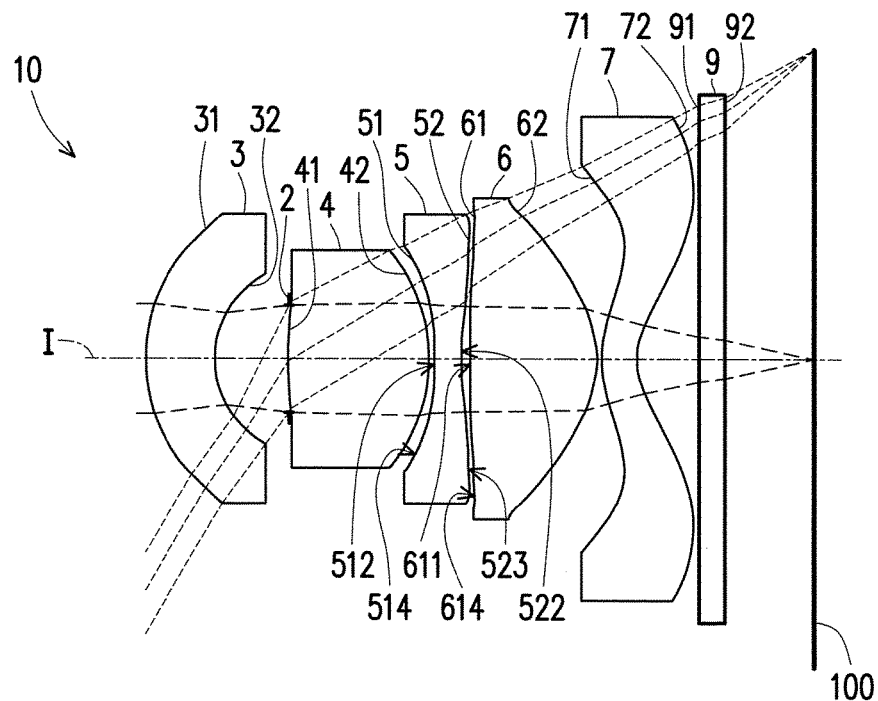
FIG. 10
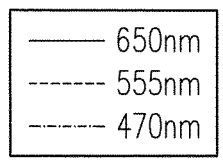
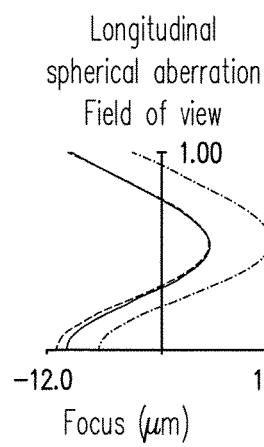
Longitudinal spherical aberration
Field of view
-12.0   12.0
Focus (μm)
FIG. 11A
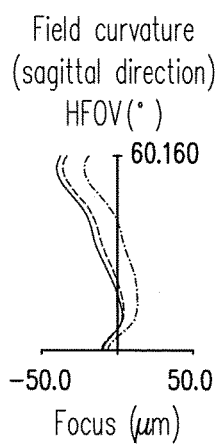
Field curvature (sagittal direction)
HFOV(°)
-50.0   50.0
Focus (μm)
FIG. 11B
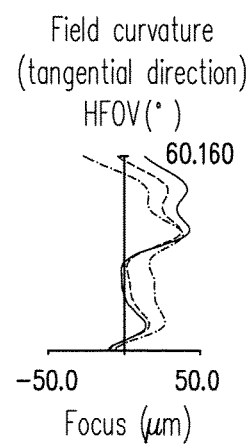
Field curvature (tangential direction)
HFOV(°)
-50.0   50.0
Focus (μm)
FIG. 11C
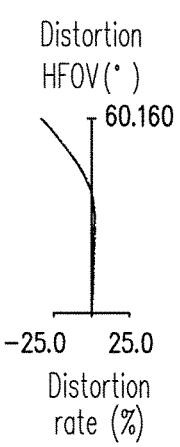
Distortion
HFOV(°)
-25.0   25.0
Distortion rate (%)
FIG. 11D

| Second Embodiment |||||||||
|---|---|---|---|---|---|---|---|---|
| System focal length= 2.132 mm , Half field of view=60.16°, F-number=2.4, System length= 5.498mm, Image height=2.525 mm |||||||||
| Lens element | Surface | Surface type | Radius of curvature(mm) | Thickness (mm) | Material | Refractive index (Nd) | Dispersion coefficient (Vd) | Focal length(mm) |
| Object |  | Spherical surface | Infinity | Infinity |  |  |  |  |
| First lens element 3 | Object-side surface 31 | Aspheric surface | 1.452 | 0.570 | Plastic | 1.545 | 55.987 | -5.042 |
|  | Image-side surface 32 | Aspheric surface | 0.819 | 0.609 |  |  |  |  |
| Aperture stop 2 |  |  | Infinity | -0.010 |  |  |  |  |
| Second lens element 4 | Object-side surface 41 | Spherical surface | 3.933 | 1.154 | Glass | 1.678 | 55.560 | 1.649 |
|  | Image-side surface 42 | Spherical surface | -1.382 | 0.045 |  |  |  |  |
| Third lens element 5 | Object-side surface 51 | Aspheric surface | -4.558 | 0.228 | Plastic | 1.642 | 22.409 | -2.350 |
|  | Image-side surface 52 | Aspheric surface | 2.328 | 0.068 |  |  |  |  |
| Fourth lens element 6 | Object-side surface 61 | Aspheric surface | 968.988 | 1.044 | Plastic | 1.545 | 55.987 | 1.523 |
|  | Image-side surface 62 | Aspheric surface | -0.832 | 0.040 |  |  |  |  |
| Fifth lens element 7 | Object-side surface 71 | Aspheric surface | 0.934 | 0.286 | Plastic | 1.535 | 55.712 | -2.844 |
|  | Image-side surface 72 | Aspheric surface | 0.517 | 0.514 |  |  |  |  |
| Filter 9 | Object-side surface 91 | Spherical surface | Infinity | 0.210 |  |  |  |  |
|  | Image-side surface 92 | Spherical surface | Infinity | 0.739 |  |  |  |  |
| Image plane 100 |  |  | Infinity |  |  |  |  |  |

FIG. 12

| Surface | K | $a_2$ | $a_4$ | $a_6$ | $a_8$ |
|---|---|---|---|---|---|
| 31 | 1.798159E-01 | 0.000000E+00 | 2.399159E-02 | 5.068988E-03 | 8.582003E-04 |
| 32 | -2.226213E+00 | 0.000000E+00 | 6.076875E-01 | -7.529210E-02 | 1.394795E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | -5.847994E-01 | 1.219706E+00 | -2.245699E+00 |
| 52 | -2.431024E+01 | 0.000000E+00 | -2.807647E-01 | 6.453775E-01 | -1.032154E+00 |
| 61 | 0.000000E+00 | 0.000000E+00 | 1.893176E-01 | -4.053806E-01 | 5.906000E-01 |
| 62 | -3.209888E+00 | 0.000000E+00 | -4.912828E-02 | -9.420899E-02 | 1.802020E-01 |
| 71 | -6.588245E+00 | 0.000000E+00 | 3.277792E-02 | -3.757257E-01 | 4.655508E-01 |
| 72 | -3.134278E+00 | 0.000000E+00 | -8.871873E-02 | -1.486365E-02 | 3.185987E-02 |
| Surface | $a_{10}$ | $a_{12}$ | $a_{14}$ | $a_{16}$ | |
| 31 | -9.625690E-03 | 1.718380E-03 | -6.059316E-03 | 1.753267E-04 | |
| 32 | -2.806392E+00 | 2.642220E+00 | -1.096305E+00 | -1.521314E-01 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 3.363585E+00 | -3.410199E+00 | 1.965598E+00 | -5.282308E-01 | |
| 52 | 1.020366E+00 | -5.787183E-01 | 1.874641E-01 | -3.278435E-02 | |
| 61 | -7.278069E-01 | 5.781618E-01 | -2.283620E-01 | 3.223284E-02 | |
| 62 | -1.830369E-01 | 1.191737E-01 | -5.104097E-02 | 1.101226E-02 | |
| 71 | -3.665776E-01 | 1.726803E-01 | -4.257434E-02 | 4.215745E-03 | |
| 72 | -1.827653E-02 | 5.499078E-03 | -8.448198E-04 | 5.166533E-05 | |

FIG. 13

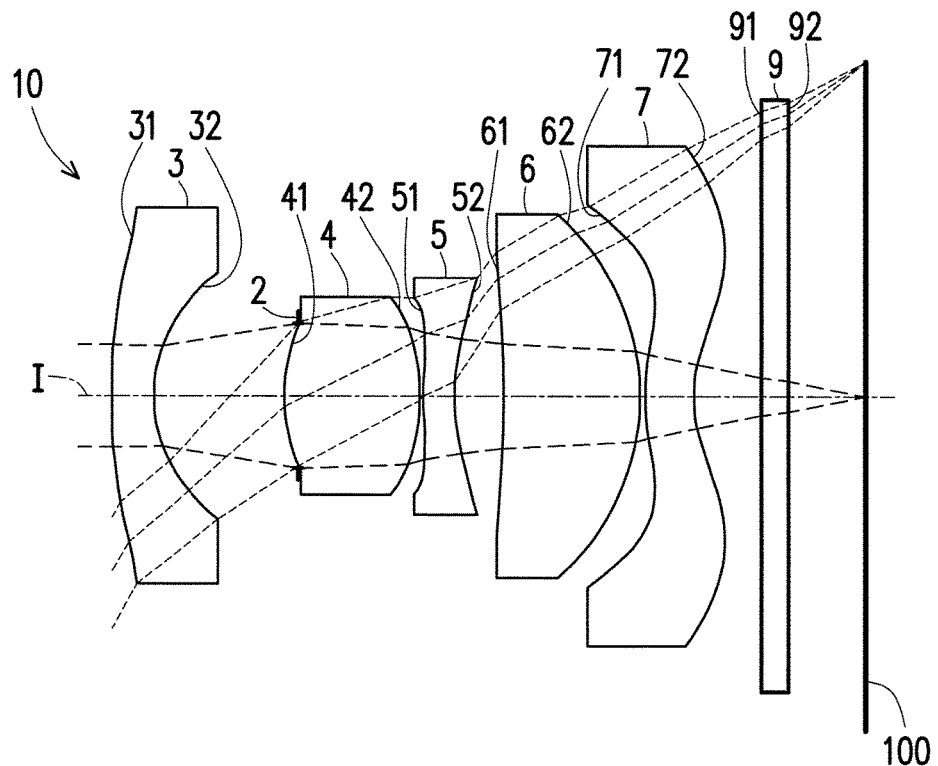
FIG. 14
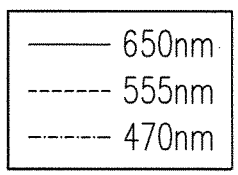
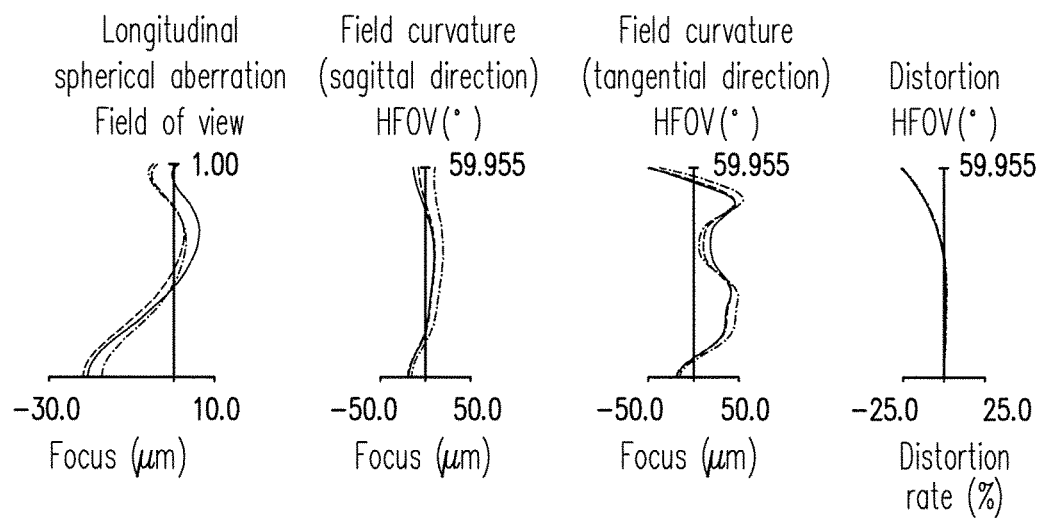
FIG. 15A   FIG. 15B   FIG. 15C   FIG. 15D

| Third Embodiment | | | | | | | | |
|---|---|---|---|---|---|---|---|---|
| System focal length= 1.934 mm, Half field of view=59.955°, F-number=2.4, System length= 5.704 mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 6.094 | 0.320 | Plastic | 1.536 | 55.794 | -2.669 |
| | Image-side surface 32 | Aspheric surface | 1.139 | 1.091 | | | | |
| Aperture stop 2 | | | Infinity | -0.101 | | | | |
| Second lens element 4 | Object-side surface 41 | Aspheric surface | 1.368 | 1.025 | Plastic | 1.535 | 55.780 | 1.398 |
| | Image-side surface 42 | Aspheric surface | -1.227 | 0.025 | | | | |
| Third lens element 5 | Object-side surface 51 | Aspheric surface | 5.635 | 0.230 | Plastic | 1.642 | 22.409 | -2.780 |
| | Image-side surface 52 | Aspheric surface | 1.342 | 0.374 | | | | |
| Fourth lens element 6 | Object-side surface 61 | Spherical surface | -10.977 | 1.033 | Glass | 1.729 | 54.680 | 2.869 |
| | Image-side surface 62 | Spherical surface | -1.832 | 0.040 | | | | |
| Fifth lens element 7 | Object-side surface 71 | Aspheric surface | 1.540 | 0.370 | Plastic | 1.642 | 22.409 | -5.482 |
| | Image-side surface 72 | Aspheric surface | 0.972 | 0.512 | | | | |
| Filter 9 | Object-side surface 91 | Spherical surface | Infinity | 0.210 | | | | |
| | Image-side surface 92 | Spherical surface | Infinity | 0.575 | | | | |
| | Image plane 100 | | Infinity | | | | | |

FIG. 16

| Surface | K | $a_2$ | $a_4$ | $a_6$ | $a_8$ |
|---|---|---|---|---|---|
| 31 | 1.118706E+01 | 0.000000E+00 | 5.713919E-02 | -5.228071E-02 | 1.433633E-02 |
| 32 | -4.233390E+00 | 0.000000E+00 | 4.089522E-01 | -1.545776E-01 | 0.000000E+00 |
| 41 | 1.034416E+00 | 0.000000E+00 | -2.908760E-02 | -3.904890E-01 | 9.732690E-01 |
| 42 | -1.414008E+01 | 0.000000E+00 | -3.249586E-01 | 3.846319E-01 | -1.055283E+00 |
| 51 | 0.000000E+00 | 6.648692E-09 | -7.608024E-02 | -1.381033E-01 | 3.361786E-01 |
| 52 | -3.679952E+00 | -2.396555E-08 | -7.347528E-01 | 3.117148E+00 | -8.866610E+00 |
| 71 | -4.115794E-01 | -6.169138E-03 | -1.749323E+00 | -5.854469E-02 | -3.252221E-01 |
| 72 | -3.014975E+00 | 5.450344E-02 | -4.910683E+00 | 9.000536E+00 | -1.486292E+01 |
| Surface | $a_{10}$ | $a_{12}$ | $a_{14}$ | $a_{16}$ | $a_{18}$ |
| 31 | -1.938529E-03 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | -1.563048E+00 | 0.000000E+00 | 0.000000E+00 | 0.000000E+00 | 0.000000E+00 |
| 42 | 9.272947E-01 | -5.410479E-01 | 0.000000E+00 | 0.000000E+00 | 0.000000E+00 |
| 51 | -9.494244E-01 | 1.090114E+00 | -5.611689E-01 | 0.000000E+00 | 0.000000E+00 |
| 52 | 1.457450E+01 | -1.255979E+01 | 4.537727E+00 | 0.000000E+00 | 0.000000E+00 |
| 71 | 6.146291E+00 | -1.341404E+01 | 1.046297E+01 | 1.253337E+00 | -5.815542E+00 |
| 72 | 2.962748E+01 | -4.713261E+01 | 2.690923E+01 | 3.210503E+01 | -5.262308E+01 |
| Surface | $a_{20}$ | $R_N$ | | | |
| 31 | 0.000000E+00 | 1.000000E+00 | | | |
| 32 | 0.000000E+00 | 1.000000E+00 | | | |
| 41 | 0.000000E+00 | 1.000000E+00 | | | |
| 42 | 0.000000E+00 | 1.000000E+00 | | | |
| 51 | 0.000000E+00 | 8.287066E-01 | | | |
| 52 | 0.000000E+00 | 1.149368E+00 | | | |
| 71 | 2.188028E+00 | 1.481074E+00 | | | |
| 72 | 2.034113E+01 | 2.174726E+00 | | | |

FIG. 17

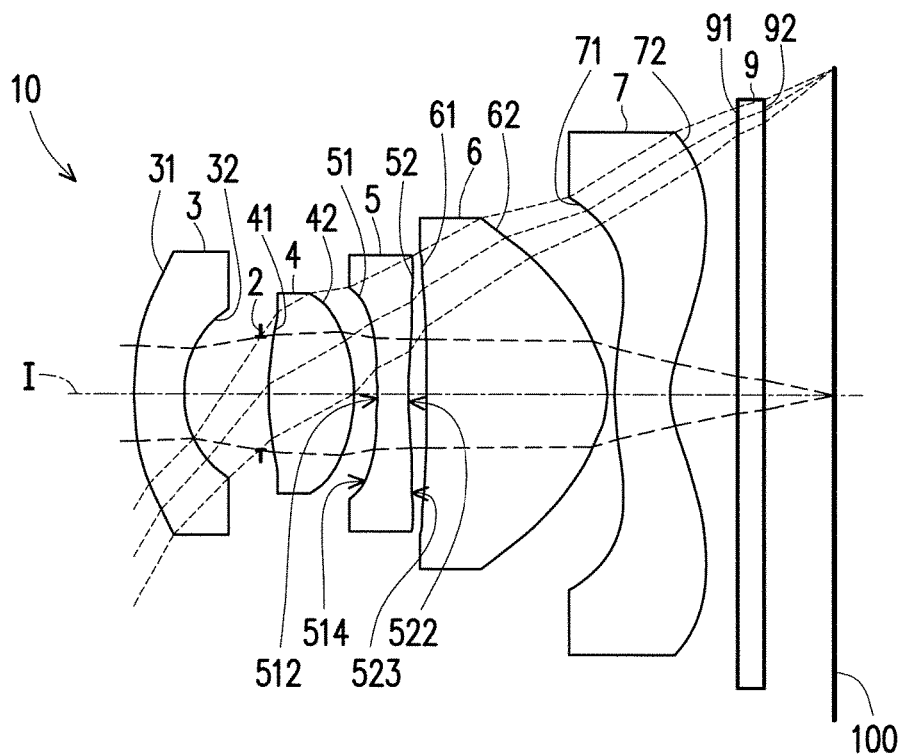
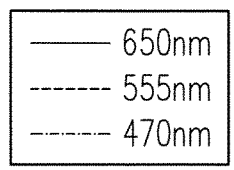
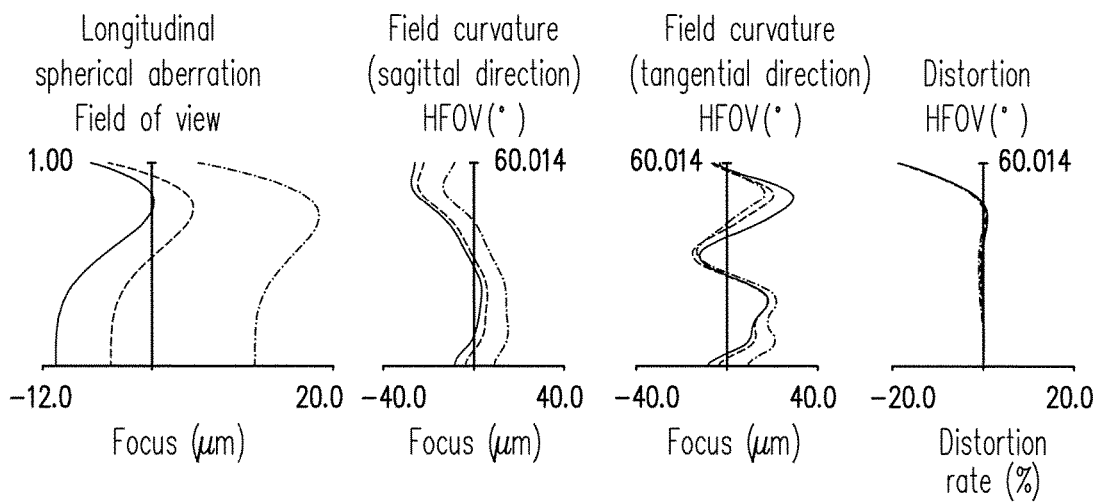
FIG. 18
FIG. 19A  FIG. 19B  FIG. 19C  FIG. 19D

| Fourth Embodiment ||||||||
|---|---|---|---|---|---|---|---|
| System focal length= 1.785 mm , Half field of view=60.014°, F-number=2.4, System length= 5.436 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.500 | 0.390 | Plastic | 1.536 | 55.794 | -2.699 |
| | Image-side surface 32 | Aspheric surface | 0.868 | 0.595 | | | | |
| Aperture stop 2 | | | Infinity | 0.060 | | | | |
| Second lens element 4 | Object-side surface 41 | Aspheric surface | 2.344 | 0.660 | Plastic | 1.535 | 55.780 | 1.683 |
| | Image-side surface 42 | Aspheric surface | -1.326 | 0.180 | | | | |
| Third lens element 5 | Object-side surface 51 | Aspheric surface | -29.666 | 0.240 | Plastic | 1.642 | 22.409 | -3.580 |
| | Image-side surface 52 | Aspheric surface | 2.522 | 0.144 | | | | |
| Fourth lens element 6 | Object-side surface 61 | Aspheric surface | -22.024 | 1.401 | Glass | 1.553 | 71.685 | 1.280 |
| | Image-side surface 62 | Aspheric surface | -0.703 | 0.060 | | | | |
| Fifth lens element 7 | Object-side surface 71 | Aspheric surface | 2.079 | 0.429 | Plastic | 1.642 | 22.409 | -1.846 |
| | Image-side surface 72 | Aspheric surface | 0.697 | 0.514 | | | | |
| Filter 9 | Object-side surface 91 | Spherical surface | Infinity | 0.210 | | 1.517 | 64.167 | |
| | Image-side surface 92 | Spherical surface | Infinity | 0.551 | | | | |
| | Image plane 100 | | Infinity | | | | | |

FIG. 20

| Surface | K | $a_2$ | $a_4$ | $a_6$ | $a_8$ |
|---|---|---|---|---|---|
| 31 | 1.874333E-01 | 0.000000E+00 | 9.924081E-02 | -2.556223E-02 | -2.309515E-02 |
| 32 | -7.877037E-01 | 0.000000E+00 | 3.850310E-01 | 3.042599E-01 | 0.000000E+00 |
| 41 | -5.053391E-01 | 0.000000E+00 | -1.513264E-02 | 7.361034E-02 | -6.186251E-01 |
| 42 | -6.021924E-01 | 0.000000E+00 | -2.704302E-01 | 9.065416E-01 | -3.231999E+00 |
| 51 | 0.000000E+00 | 0.000000E+00 | -7.036440E-01 | 1.081029E+00 | -9.680618E-01 |
| 52 | 1.289263E+00 | 0.000000E+00 | -5.496803E-01 | 6.994837E-01 | -5.058068E-01 |
| 61 | 8.357198E+01 | 0.000000E+00 | 4.514997E-02 | -3.141872E-01 | 4.469079E-01 |
| 62 | -4.083353E+00 | 0.000000E+00 | -3.423044E-01 | 5.883293E-01 | -9.124707E-01 |
| 71 | -4.356962E-01 | 0.000000E+00 | -2.664071E-01 | 1.376407E-01 | -1.390920E-01 |
| 72 | -5.446144E+00 | 0.000000E+00 | -1.381679E-01 | 5.553781E-02 | -7.882442E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 5.257285E+00 | -4.308654E+00 | 0.000000E+00 | 0.000000E+00 | |
| 51 | -8.196482E-02 | 0.000000E+00 | 0.000000E+00 | 0.000000E+00 | |
| 52 | 3.047398E-01 | -1.299660E-01 | 0.000000E+00 | 0.000000E+00 | |
| 61 | -3.219386E-01 | 2.272390E-01 | -9.866782E-02 | 0.000000E+00 | |
| 62 | 9.298929E-01 | -5.801021E-01 | 1.952739E-01 | -2.658872E-02 | |
| 71 | 1.129404E-01 | -5.823613E-02 | 1.562337E-02 | -1.633710E-03 | |
| 72 | -2.402696E-03 | 1.136851E-03 | -1.834559E-04 | 1.121042E-05 | |

FIG. 21

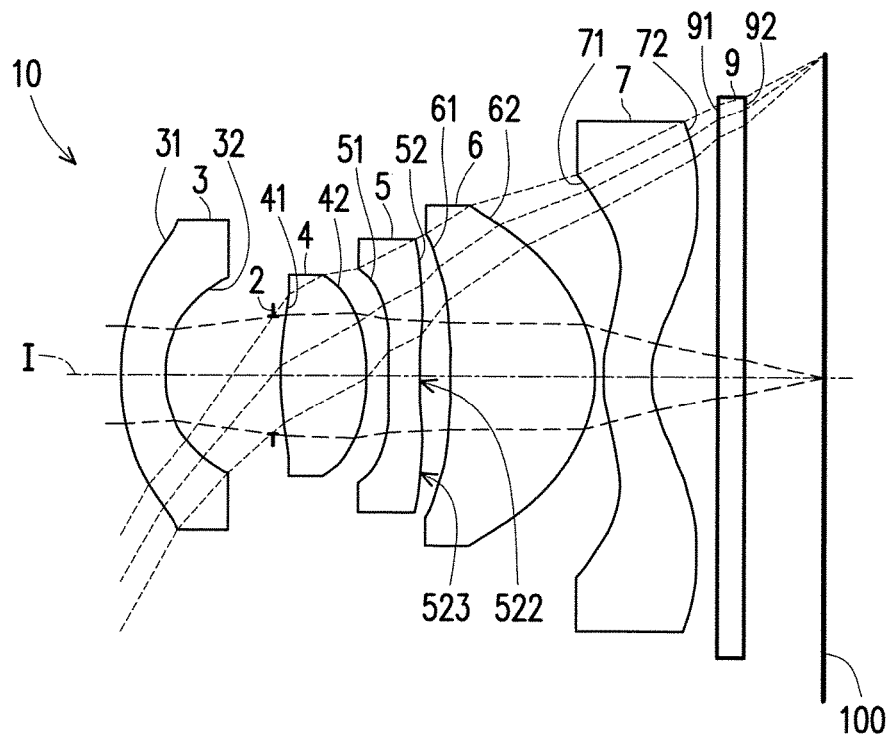
FIG. 22
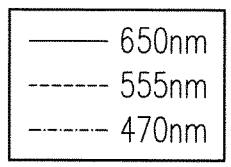
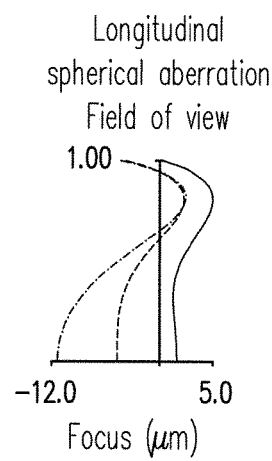
FIG. 23A
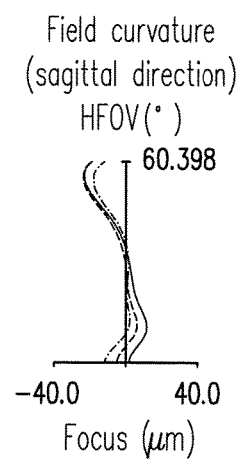
FIG. 23B
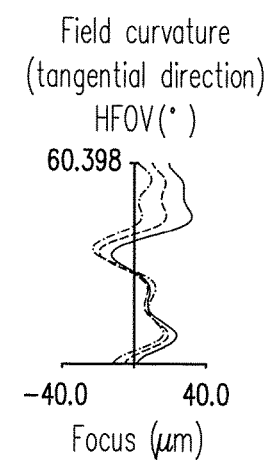
FIG. 23C
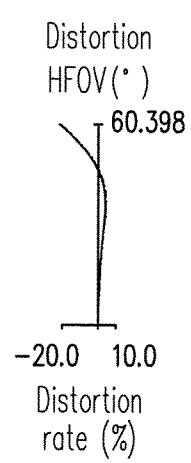
FIG. 23D

| Fifth Embodiment |||||||||
|---|---|---|---|---|---|---|---|---|
| System focal length= 1.821 mm , Half field of view=60.398°, F-number=2.4, System length= 5.521 mm, Image height=2.525 mm |||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.062 | 0.347 | Plastic | 1.536 | 55.794 | -3.279 |
| | Image-side surface 32 | Aspheric surface | 0.894 | 0.846 | | | | |
| Aperture stop 2 | | | Infinity | 0.060 | | | | |
| Second lens element 4 | Object-side surface 41 | Aspheric surface | 2.518 | 0.672 | Plastic | 1.535 | 55.780 | 1.998 |
| | Image-side surface 42 | Aspheric surface | -1.694 | 0.177 | | | | |
| Third lens element 5 | Object-side surface 51 | Aspheric surface | 6.936 | 0.240 | Plastic | 1.642 | 22.409 | -6.225 |
| | Image-side surface 52 | Aspheric surface | 2.514 | 0.241 | | | | |
| Fourth lens element 6 | Object-side surface 61 | Aspheric surface | -5.504 | 1.139 | Glass | 1.553 | 71.685 | 1.808 |
| | Image-side surface 62 | Aspheric surface | -0.911 | 0.063 | | | | |
| Fifth lens element 7 | Object-side surface 71 | Aspheric surface | 1.241 | 0.377 | Plastic | 1.642 | 22.409 | -3.491 |
| | Image-side surface 72 | Aspheric surface | 0.705 | 0.514 | | | | |
| Filter 9 | Object-side surface 91 | Spherical surface | Infinity | 0.210 | | 1.517 | 64.167 | |
| | Image-side surface 92 | Spherical surface | Infinity | 0.636 | | | | |
| | Image plane 100 | | Infinity | | | | | |

FIG. 24

| Surface | K | $a_2$ | $a_4$ | $a_6$ | $a_8$ |
|---|---|---|---|---|---|
| 31 | 1.144388E+00 | 0.000000E+00 | 8.278870E-02 | -1.982361E-02 | -2.911830E-02 |
| 32 | -9.833628E-01 | 0.000000E+00 | 3.645602E-01 | 2.176915E-01 | 0.000000E+00 |
| 41 | -1.268129E+00 | 0.000000E+00 | -2.318747E-02 | 1.527438E-02 | -5.921252E-01 |
| 42 | 2.771474E-01 | 0.000000E+00 | -4.623139E-01 | 1.280884E+00 | -3.859464E+00 |
| 51 | 0.000000E+00 | 0.000000E+00 | -9.689577E-01 | 1.285954E+00 | -1.322466E+00 |
| 52 | -3.920575E+00 | 0.000000E+00 | -5.805106E-01 | 6.656123E-01 | -4.644398E-01 |
| 61 | -9.500000E+01 | 0.000000E+00 | 5.938510E-02 | -4.216763E-01 | 4.185645E-01 |
| 62 | -4.731209E+00 | 0.000000E+00 | -3.626361E-01 | 5.728368E-01 | -9.227426E-01 |
| 71 | -1.240528E+00 | 0.000000E+00 | -3.343319E-01 | 1.090940E-01 | -1.220754E-01 |
| 72 | -3.081972E+00 | 0.000000E+00 | -1.704861E-01 | 6.179430E-02 | -7.908783E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 5.839856E+00 | -4.308654E+00 | 0.000000E+00 | 0.000000E+00 | |
| 51 | 4.005038E-01 | 0.000000E+00 | 0.000000E+00 | 0.000000E+00 | |
| 52 | 3.092055E-01 | -1.299660E-01 | 0.000000E+00 | 0.000000E+00 | |
| 61 | -2.671590E-01 | 2.272390E-01 | -9.866782E-02 | 0.000000E+00 | |
| 62 | 9.374029E-01 | -5.801021E-01 | 1.952739E-01 | -2.658872E-02 | |
| 71 | 1.239580E-01 | -6.164899E-02 | 1.532509E-02 | -1.566175E-03 | |
| 72 | -2.474188E-03 | 1.176580E-03 | -1.796717E-04 | 9.307569E-06 | |

FIG. 25

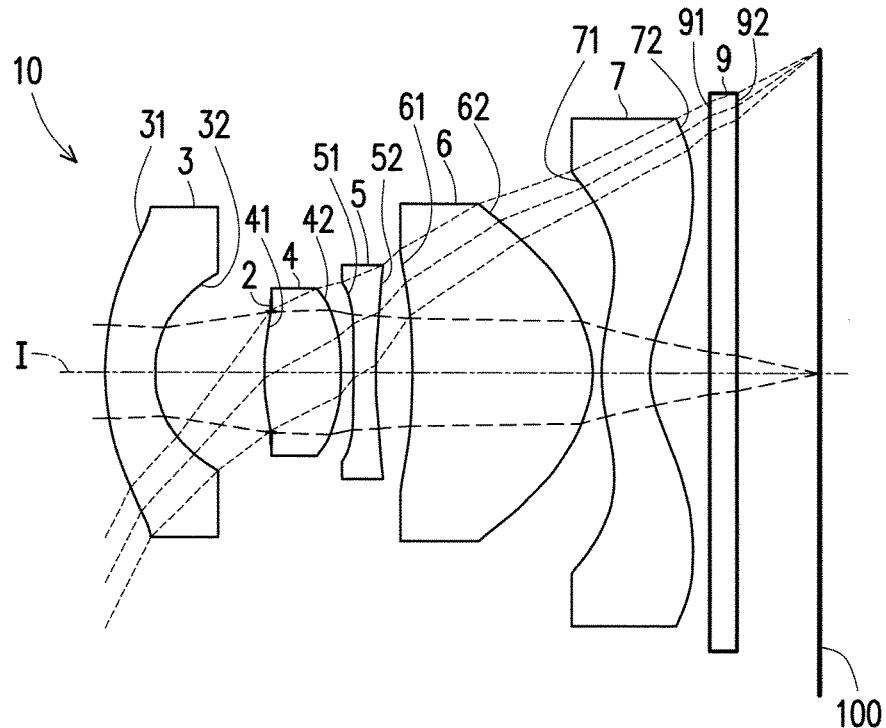
FIG. 26
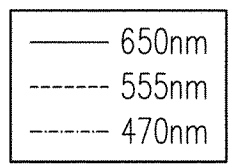
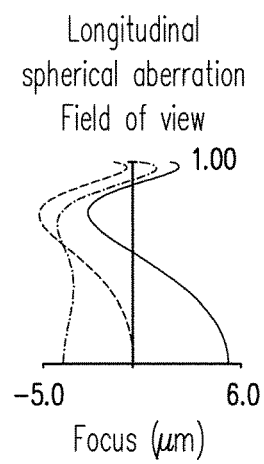
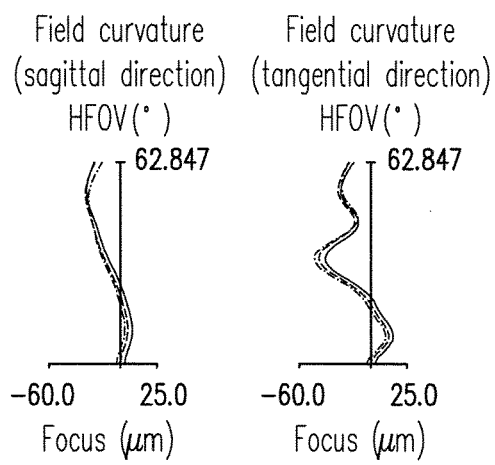
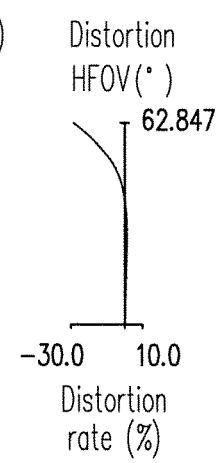
FIG. 27A    FIG. 27B    FIG. 27C    FIG. 27D

| Sixth Embodiment | | | | | | | | |
|---|---|---|---|---|---|---|---|---|
| System focal length= 1.810 mm , Half field of view=62.847°, F-number=2.4, System length= 5.619 mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.290 | 0.394 | Plastic | 1.535 | 55.712 | -2.815 |
| | Image-side surface 32 | Aspheric surface | 0.856 | 0.901 | | | | |
| Aperture stop 2 | | | Infinity | -0.042 | | | | |
| Second lens element 4 | Object-side surface 41 | Aspheric surface | 2.042 | 0.602 | Plastic | 1.535 | 55.780 | 1.840 |
| | Image-side surface 42 | Aspheric surface | -1.716 | 0.096 | | | | |
| Third lens element 5 | Object-side surface 51 | Aspheric surface | 5.554 | 0.178 | Plastic | 1.642 | 22.409 | -7.151 |
| | Image-side surface 52 | Aspheric surface | 2.493 | 0.286 | | | | |
| Fourth lens element 6 | Object-side surface 61 | Aspheric surface | -5.705 | 1.418 | Glass | 1.553 | 71.685 | 1.685 |
| | Image-side surface 62 | Aspheric surface | -0.874 | 0.071 | | | | |
| Fifth lens element 7 | Object-side surface 71 | Aspheric surface | 1.498 | 0.380 | Plastic | 1.642 | 22.409 | -2.837 |
| | Image-side surface 72 | Aspheric surface | 0.743 | 0.468 | | | | |
| Filter 9 | Object-side surface 91 | Spherical surface | Infinity | 0.210 | | 1.517 | 64.167 | |
| | Image-side surface 92 | Spherical surface | Infinity | 0.658 | | | | |
| | Image plane 100 | | Infinity | | | | | |

FIG. 28

| Surface | K | $a_2$ | $a_4$ | $a_6$ | $a_8$ |
|---|---|---|---|---|---|
| 31 | 1.172554E+00 | 0.000000E+00 | 4.055106E-02 | -3.796040E-02 | -5.212959E-03 |
| 32 | -9.452844E-01 | 0.000000E+00 | 2.933956E-01 | 1.159629E-01 | 0.000000E+00 |
| 41 | -7.875601E-01 | 0.000000E+00 | -1.458294E-02 | 9.064282E-02 | -9.111046E-01 |
| 42 | 7.752548E-01 | 0.000000E+00 | -3.928401E-01 | 9.552731E-01 | -2.947482E+00 |
| 51 | 0.000000E+00 | 0.000000E+00 | -7.760922E-01 | 1.045107E+00 | -1.129059E+00 |
| 52 | 3.955533E+00 | 0.000000E+00 | -5.118424E-01 | 6.923164E-01 | -5.343594E-01 |
| 61 | 2.471641E+01 | 0.000000E+00 | 3.981610E-02 | -2.761993E-01 | 4.631447E-01 |
| 62 | -4.532001E+00 | 0.000000E+00 | -3.818876E-01 | 5.991012E-01 | -9.109823E-01 |
| 71 | -2.132148E+00 | 0.000000E+00 | -3.125095E-01 | 1.574354E-01 | -1.325886E-01 |
| 72 | -3.590442E+00 | 0.000000E+00 | -1.526701E-01 | 5.725578E-02 | -7.355526E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.541151E+00 | -4.703056E+00 | 0.000000E+00 | 0.000000E+00 | |
| 51 | 0.000000E+00 | 0.000000E+00 | 0.000000E+00 | 0.000000E+00 | |
| 52 | 2.844417E-01 | -1.479668E-01 | 0.000000E+00 | 0.000000E+00 | |
| 61 | -3.347216E-01 | 2.264047E-01 | -9.833667E-02 | 0.000000E+00 | |
| 62 | 9.315472E-01 | -5.799186E-01 | 1.952703E-01 | -2.665097E-02 | |
| 71 | 1.138608E-01 | -5.874468E-02 | 1.537500E-02 | -1.569997E-03 | |
| 72 | -2.510807E-03 | 1.139504E-03 | -1.796495E-04 | 1.100826E-05 | |

FIG. 29

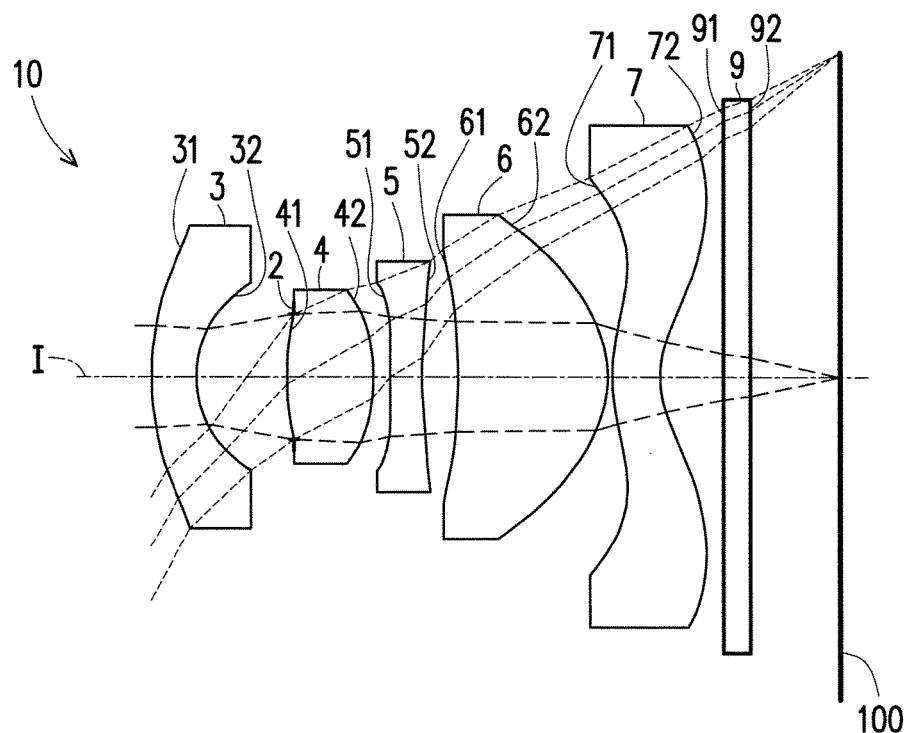
FIG. 30
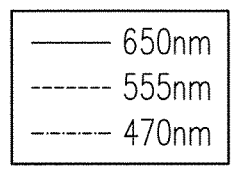
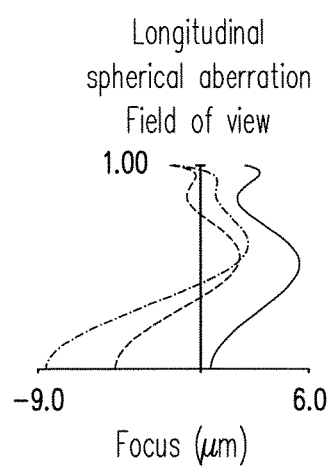
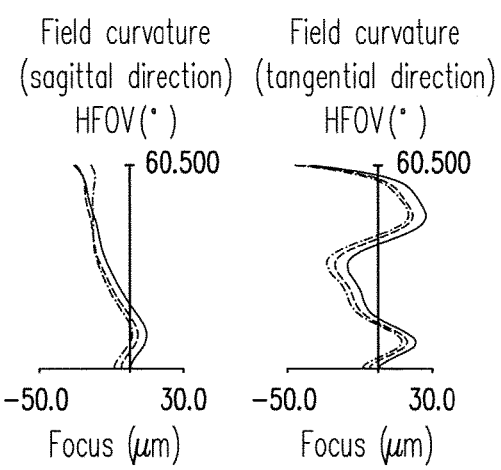
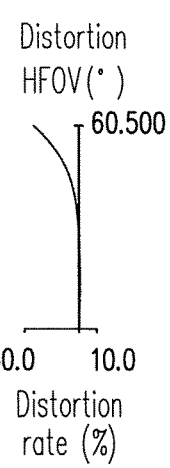
FIG. 31A  FIG. 31B  FIG. 31C  FIG. 31D

| Seventh Embodiment ||||||||
|---|---|---|---|---|---|---|---|
| System focal length= 1.905 mm , Half field of view=60.500°, F-number=2.4, System length= 5.359 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.298 | 0.351 | Plastic | 1.535 | 55.712 | -2.736 |
| | Image-side surface 32 | Aspheric surface | 0.849 | 0.756 | | | | |
| Aperture stop 2 | | | Infinity | -0.055 | | | | |
| Second lens element 4 | Object-side surface 41 | Aspheric surface | 1.991 | 0.668 | Plastic | 1.535 | 55.780 | 1.825 |
| | Image-side surface 42 | Aspheric surface | -1.702 | 0.133 | | | | |
| Third lens element 5 | Object-side surface 51 | Aspheric surface | 5.801 | 0.247 | Plastic | 1.642 | 22.409 | -6.906 |
| | Image-side surface 52 | Aspheric surface | 2.482 | 0.278 | | | | |
| Fourth lens element 6 | Object-side surface 61 | Aspheric surface | -5.617 | 1.168 | Glass | 1.553 | 71.685 | 1.694 |
| | Image-side surface 62 | Aspheric surface | -0.865 | 0.036 | | | | |
| Fifth lens element 7 | Object-side surface71 | Aspheric surface | 1.353 | 0.369 | Plastic | 1.642 | 22.409 | -2.812 |
| | Image-side surface 72 | Aspheric surface | 0.693 | 0.491 | | | | |
| Filter 9 | Object-side surface 91 | Spherical surface | Infinity | 0.210 | | 1.517 | 64.167 | |
| | Image-side surface 92 | Spherical surface | Infinity | 0.708 | | | | |
| | Image plane 100 | | Infinity | | | | | |

FIG. 32

| Surface | K | $a_2$ | $a_4$ | $a_6$ | $a_8$ |
|---|---|---|---|---|---|
| 31 | 1.286260E+00 | 0.000000E+00 | 3.360169E-02 | -4.204674E-02 | -6.155958E-03 |
| 32 | -9.453295E-01 | 0.000000E+00 | 2.899751E-01 | 1.902347E-01 | 0.000000E+00 |
| 41 | -1.068210E+00 | 0.000000E+00 | -1.873837E-02 | 9.311263E-02 | -8.990138E-01 |
| 42 | 1.096962E+00 | 0.000000E+00 | -4.141167E-01 | 9.654331E-01 | -2.907219E+00 |
| 51 | 0.000000E+00 | 0.000000E+00 | -7.739960E-01 | 1.057014E+00 | -1.084853E+00 |
| 52 | 3.994019E+00 | 0.000000E+00 | -5.126474E-01 | 6.882274E-01 | -5.384672E-01 |
| 61 | 2.488047E+01 | 0.000000E+00 | 3.286975E-02 | -2.787506E-01 | 4.626030E-01 |
| 62 | -4.718841E+00 | 0.000000E+00 | -3.856825E-01 | 5.940573E-01 | -9.132380E-01 |
| 71 | -2.231053E+00 | 0.000000E+00 | -3.098050E-01 | 1.580469E-01 | -1.328415E-01 |
| 72 | -3.402552E+00 | 0.000000E+00 | -1.534548E-01 | 5.597700E-02 | -7.277485E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.647654E+00 | -4.346901E+00 | 0.000000E+00 | 0.000000E+00 | |
| 51 | 0.000000E+00 | 0.000000E+00 | 0.000000E+00 | 0.000000E+00 | |
| 52 | 2.858359E-01 | -1.343361E-01 | 0.000000E+00 | 0.000000E+00 | |
| 61 | -3.344353E-01 | 2.276901E-01 | -9.575545E-02 | 0.000000E+00 | |
| 62 | 9.311399E-01 | -5.796240E-01 | 1.956591E-01 | -2.637544E-02 | |
| 71 | 1.137126E-01 | -5.878073E-02 | 1.537992E-02 | -1.560184E-03 | |
| 72 | -2.486948E-03 | 1.142042E-03 | -1.798783E-04 | 1.078865E-05 | |

FIG. 33

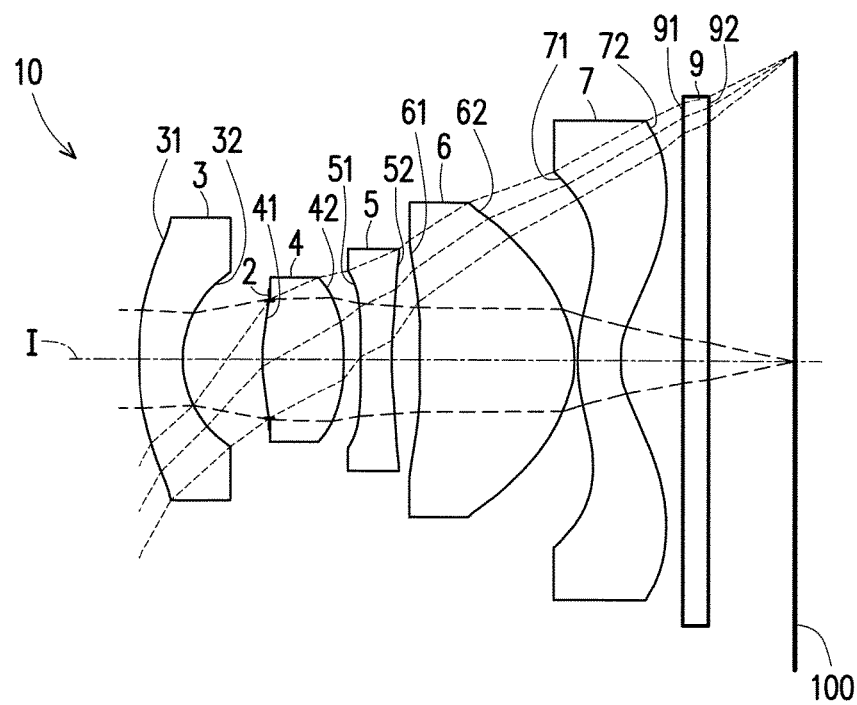
FIG. 34
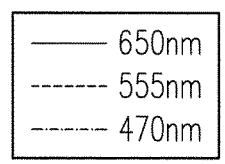
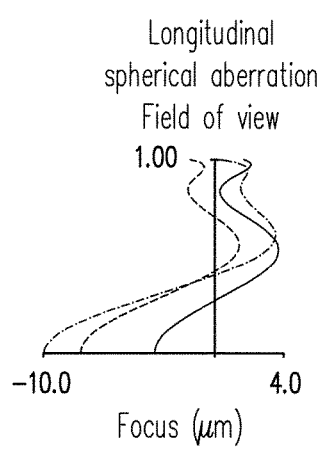
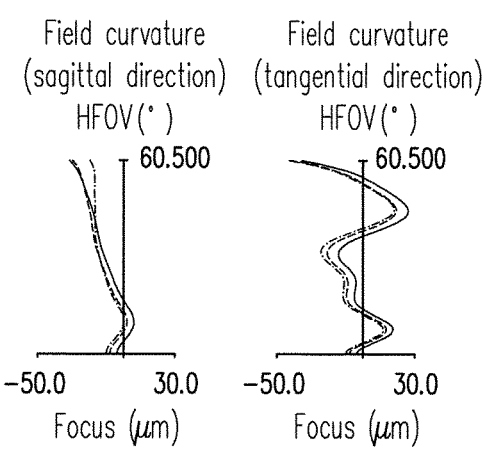
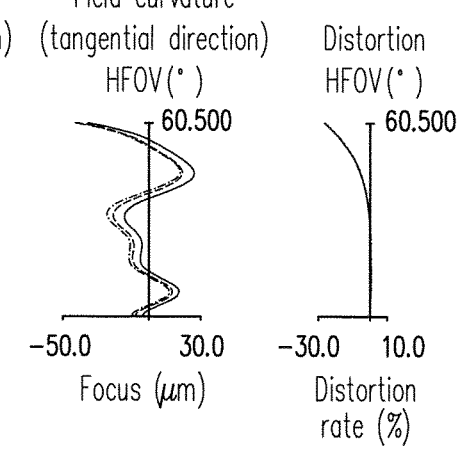
FIG. 35A   FIG. 35B   FIG. 35C   FIG. 35D

| Eighth Embodiment | | | | | | | | |
|---|---|---|---|---|---|---|---|---|
| System focal length= 1.929 mm , Half field of view=60.500°, F-number=2.4, System length= 5.366 mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.352 | 0.362 | Plastic | 1.535 | 55.712 | -2.786 |
| | Image-side surface 32 | Aspheric surface | 0.865 | 0.704 | | | | |
| Aperture stop 2 | | | Infinity | -0.052 | | | | |
| Second lens element 4 | Object-side surface 41 | Aspheric surface | 2.000 | 0.661 | Plastic | 1.535 | 55.780 | 1.820 |
| | Image-side surface 42 | Aspheric surface | -1.690 | 0.133 | | | | |
| Third lens element 5 | Object-side surface 51 | Aspheric surface | 6.176 | 0.257 | Plastic | 1.642 | 22.409 | -6.519 |
| | Image-side surface 52 | Aspheric surface | 2.466 | 0.234 | | | | |
| Fourth lens element 6 | Object-side surface 61 | Aspheric surface | -5.973 | 1.261 | Glass | 1.553 | 71.685 | 1.617 |
| | Image-side surface62 | Aspheric surface | -0.839 | 0.026 | | | | |
| Fifth lens element 7 | Object-side surface71 | Aspheric surface | 1.276 | 0.354 | Plastic | 1.642 | 22.409 | -2.652 |
| | Image-side surface 72 | Aspheric surface | 0.652 | 0.502 | | | | |
| Filter 9 | Object-side surface 91 | Spherical surface | Infinity | 0.210 | | 1.517 | 64.167 | |
| | Image-side surface 92 | Spherical surface | Infinity | 0.712 | | | | |
| | Image plane 100 | | Infinity | | | | | |

FIG. 36

| Surface | K | $a_2$ | $a_4$ | $a_6$ | $a_8$ |
|---|---|---|---|---|---|
| 31 | 1.382067E+00 | 0.000000E+00 | 2.400794E-02 | -4.186454E-02 | -5.309515E-03 |
| 32 | -9.887184E-01 | 0.000000E+00 | 2.824055E-01 | 1.496710E-01 | 0.000000E+00 |
| 41 | -9.203581E-01 | 0.000000E+00 | -1.639817E-02 | 1.069208E-01 | -9.285263E-01 |
| 42 | 9.863584E-01 | 0.000000E+00 | -4.072821E-01 | 9.648776E-01 | -2.913454E+00 |
| 51 | 0.000000E+00 | 0.000000E+00 | -7.792705E-01 | 1.081149E+00 | -1.155958E+00 |
| 52 | 3.820111E+00 | 0.000000E+00 | -5.167727E-01 | 6.771347E-01 | -5.395058E-01 |
| 61 | 2.533365E+01 | 0.000000E+00 | 3.616644E-02 | -2.730199E-01 | 4.655789E-01 |
| 62 | -4.651807E+00 | 0.000000E+00 | -3.787888E-01 | 5.941229E-01 | -9.134201E-01 |
| 71 | -2.141582E+00 | 0.000000E+00 | -3.133817E-01 | 1.556990E-01 | -1.334542E-01 |
| 72 | -3.238459E+00 | 0.000000E+00 | -1.582016E-01 | 5.625782E-02 | -7.242797E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.648205E+00 | -4.481472E+00 | 0.000000E+00 | 0.000000E+00 | |
| 51 | 0.000000E+00 | 0.000000E+00 | 0.000000E+00 | 0.000000E+00 | |
| 52 | 2.917751E-01 | -1.249894E-01 | 0.000000E+00 | 0.000000E+00 | |
| 61 | -3.366388E-01 | 2.228977E-01 | -1.005323E-01 | 0.000000E+00 | |
| 62 | 9.314920E-01 | -5.794031E-01 | 1.955495E-01 | -2.667735E-02 | |
| 71 | 1.136706E-01 | -5.874140E-02 | 1.539622E-02 | -1.561481E-03 | |
| 72 | -2.489079E-03 | 1.140441E-03 | -1.801584E-04 | 1.083914E-05 | |

FIG. 37

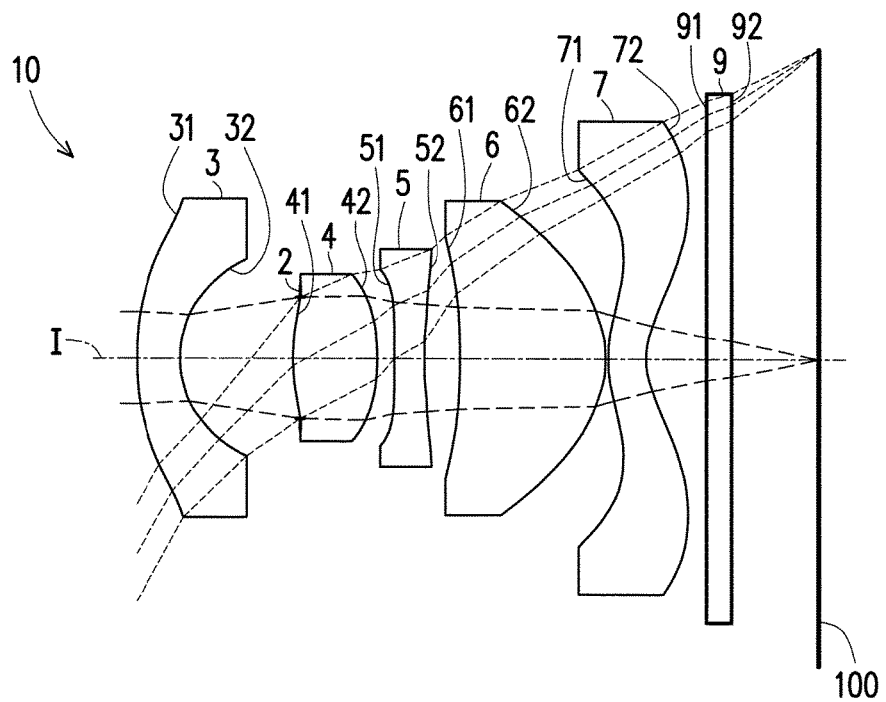
FIG. 38
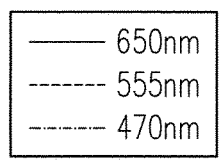
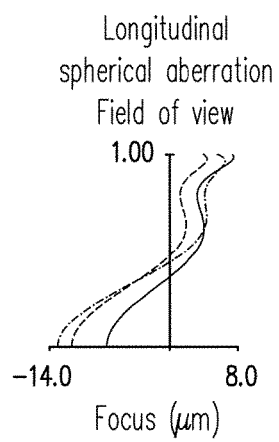
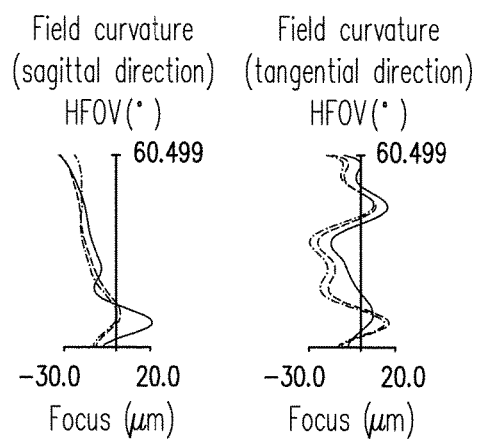
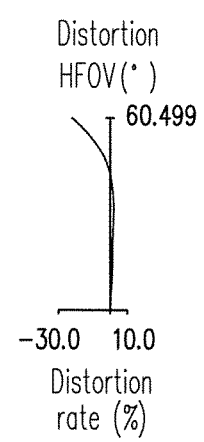
FIG. 39A    FIG. 39B    FIG. 39C    FIG. 39D

| Ninth Embodiment ||||||||
|---|---|---|---|---|---|---|---|
| System focal length= 1.826 mm , Half field of view=60.499°, F-number=2.4, System length= 5.586 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.282 | 0.358 | Plastic | 1.535 | 55.712 | -2.781 |
| | Image-side surface 32 | Aspheric surface | 0.854 | 0.983 | | | | |
| Aperture stop 2 | | | Infinity | -0.060 | | | | |
| Second lens element 4 | Object-side surface 41 | Aspheric surface | 1.873 | 0.684 | Plastic | 1.535 | 55.780 | 1.817 |
| | Image-side surface 42 | Aspheric surface | -1.776 | 0.137 | | | | |
| Third lens element 5 | Object-side surface 51 | Aspheric surface | 6.257 | 0.248 | Plastic | 1.642 | 22.409 | -6.450 |
| | Image-side surface 52 | Aspheric surface | 2.465 | 0.297 | | | | |
| Fourth lens element 6 | Object-side surface 61 | Aspheric surface | -5.658 | 1.193 | Glass | 1.553 | 71.685 | 1.569 |
| | Image-side surface 62 | Aspheric surface | -0.811 | 0.025 | | | | |
| Fifth lens element 7 | Object-side surface 71 | Aspheric surface | 1.225 | 0.307 | Plastic | 1.642 | 22.409 | -2.458 |
| | Image-side surface 72 | Aspheric surface | 0.624 | 0.493 | | | | |
| Filter 9 | Object-side surface 91 | Spherical surface | Infinity | 0.210 | | 1.517 | 64.167 | |
| | Image-side surface 92 | Spherical surface | Infinity | 0.711 | | | | |
| | Image plane 100 | | Infinity | | | | | |

FIG. 40

| Surface | K | $a_2$ | $a_4$ | $a_6$ | $a_8$ |
|---|---|---|---|---|---|
| 31 | 1.020645E+00 | 0.000000E+00 | 4.323979E-02 | -3.676349E-02 | -3.611309E-03 |
| 32 | -9.824162E-01 | 0.000000E+00 | 2.830007E-01 | 1.403593E-01 | 0.000000E+00 |
| 41 | -1.173261E+00 | 0.000000E+00 | -1.988444E-02 | 1.261043E-01 | -8.842179E-01 |
| 42 | 9.179200E-01 | 0.000000E+00 | -4.043879E-01 | 9.661338E-01 | -2.928317E+00 |
| 51 | 0.000000E+00 | 0.000000E+00 | -7.878283E-01 | 1.030290E+00 | -1.098273E+00 |
| 52 | 3.952159E+00 | 0.000000E+00 | -5.184924E-01 | 6.841148E-01 | -5.410637E-01 |
| 61 | 2.412168E+01 | 0.000000E+00 | 3.177315E-02 | -2.822262E-01 | 4.568827E-01 |
| 62 | -5.264043E+00 | 0.000000E+00 | -3.863106E-01 | 5.929464E-01 | -9.131706E-01 |
| 71 | -2.730720E+00 | 0.000000E+00 | -3.184076E-01 | 1.547961E-01 | -1.330938E-01 |
| 72 | -3.497808E+00 | 0.000000E+00 | -1.649359E-01 | 5.804837E-02 | -7.450240E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.617952E+00 | -4.200799E+00 | 0.000000E+00 | 0.000000E+00 | |
| 51 | 0.000000E+00 | 0.000000E+00 | 0.000000E+00 | 0.000000E+00 | |
| 52 | 2.854308E-01 | -1.238844E-01 | 0.000000E+00 | 0.000000E+00 | |
| 61 | -3.387148E-01 | 2.277428E-01 | -9.025216E-02 | 0.000000E+00 | |
| 62 | 9.315212E-01 | -5.794119E-01 | 1.956461E-01 | -2.653427E-02 | |
| 71 | 1.139046E-01 | -5.868279E-02 | 1.540148E-02 | -1.562539E-03 | |
| 72 | -2.519010E-03 | 1.140715E-03 | -1.792183E-04 | 1.106282E-05 | |

FIG. 41

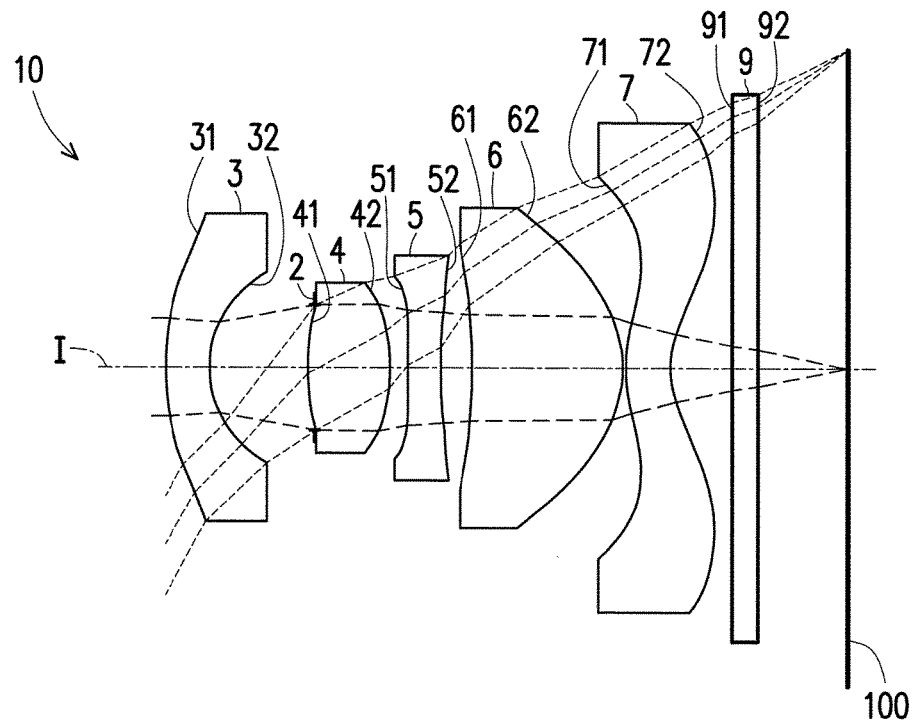
FIG. 42
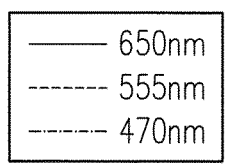
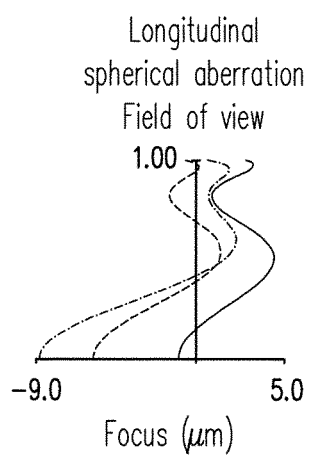 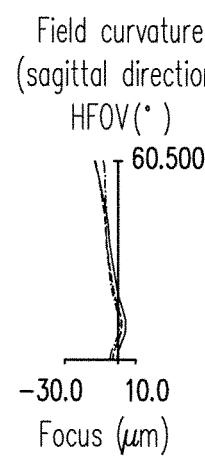 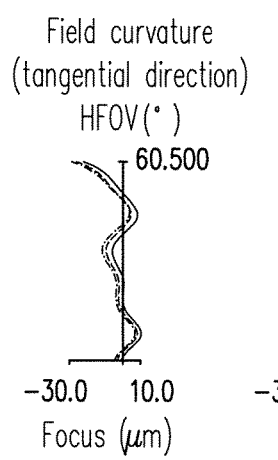 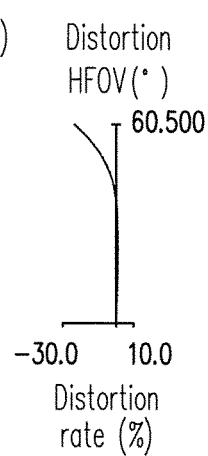
FIG. 43A    FIG. 43B    FIG. 43C   FIG. 43D

| Tenth Embodiment ||||||||
|---|---|---|---|---|---|---|---|
| System focal length= 1.868 mm , Half field of view=60.500°, F-number=2.4, System length= 5.405 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.291 | 0.350 | Plastic | 1.535 | 55.712 | -2.786 |
| | Image-side surface 32 | Aspheric surface | 0.857 | 0.830 | | | | |
| Aperture stop 2 | | | Infinity | -0.051 | | | | |
| Second lens element 4 | Object-side surface 41 | Aspheric surface | 1.905 | 0.647 | Plastic | 1.535 | 55.780 | 1.829 |
| | Image-side surface 42 | Aspheric surface | -1.786 | 0.145 | | | | |
| Third lens element 5 | Object-side surface 51 | Aspheric surface | 6.159 | 0.258 | Plastic | 1.642 | 22.409 | -6.507 |
| | Image-side surface 52 | Aspheric surface | 2.460 | 0.253 | | | | |
| Fourth lens element 6 | Object-side surface 61 | Aspheric surface | -5.848 | 1.195 | Glass | 1.553 | 71.685 | 1.641 |
| | Image-side surface 62 | Aspheric surface | -0.845 | 0.024 | | | | |
| Fifth lens element 7 | Object-side surface 71 | Aspheric surface | 1.302 | 0.349 | Plastic | 1.642 | 22.409 | -2.744 |
| | Image-side surface 72 | Aspheric surface | 0.672 | 0.490 | | | | |
| Filter 9 | Object-side surface 91 | Spherical surface | Infinity | 0.210 | | 1.517 | 64.167 | |
| | Image-side surface 92 | Spherical surface | Infinity | 0.707 | | | | |
| | Image plane 100 | | Infinity | | | | | |

FIG. 44

| Surface | K | $a_2$ | $a_4$ | $a_6$ | $a_8$ |
|---|---|---|---|---|---|
| 31 | 1.143362E+00 | 0.000000E+00 | 3.476561E-02 | -3.963145E-02 | -5.273741E-03 |
| 32 | -9.838526E-01 | 0.000000E+00 | 2.835410E-01 | 1.457061E-01 | 0.000000E+00 |
| 41 | -1.006865E+00 | 0.000000E+00 | -1.754785E-02 | 1.114573E-01 | -9.183896E-01 |
| 42 | 9.652876E-01 | 0.000000E+00 | -4.044337E-01 | 9.516540E-01 | -2.915857E+00 |
| 51 | 0.000000E+00 | 0.000000E+00 | -7.784099E-01 | 1.052438E+00 | -1.128448E+00 |
| 52 | 3.926528E+00 | 0.000000E+00 | -5.170972E-01 | 6.840933E-01 | -5.364805E-01 |
| 61 | 2.503962E+01 | 0.000000E+00 | 3.761660E-02 | -2.754280E-01 | 4.627216E-01 |
| 62 | -4.767777E+00 | 0.000000E+00 | -3.818402E-01 | 5.941724E-01 | -9.135239E-01 |
| 71 | -2.289478E+00 | 0.000000E+00 | -3.177432E-01 | 1.545086E-01 | -1.334333E-01 |
| 72 | -3.414439E+00 | 0.000000E+00 | -1.608214E-01 | 5.661850E-02 | -7.232229E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.637962E+00 | -4.509242E+00 | 0.000000E+00 | 0.000000E+00 | |
| 51 | 0.000000E+00 | 0.000000E+00 | 0.000000E+00 | 0.000000E+00 | |
| 52 | 2.896659E-01 | -1.299450E-01 | 0.000000E+00 | 0.000000E+00 | |
| 61 | -3.372271E-01 | 2.245302E-01 | -9.753413E-02 | 0.000000E+00 | |
| 62 | 9.312439E-01 | -5.794922E-01 | 1.956398E-01 | -2.650395E-02 | |
| 71 | 1.137600E-01 | -5.870913E-02 | 1.540396E-02 | -1.559942E-03 | |
| 72 | -2.491926E-03 | 1.139435E-03 | -1.804142E-04 | 1.077832E-05 | |

FIG. 45

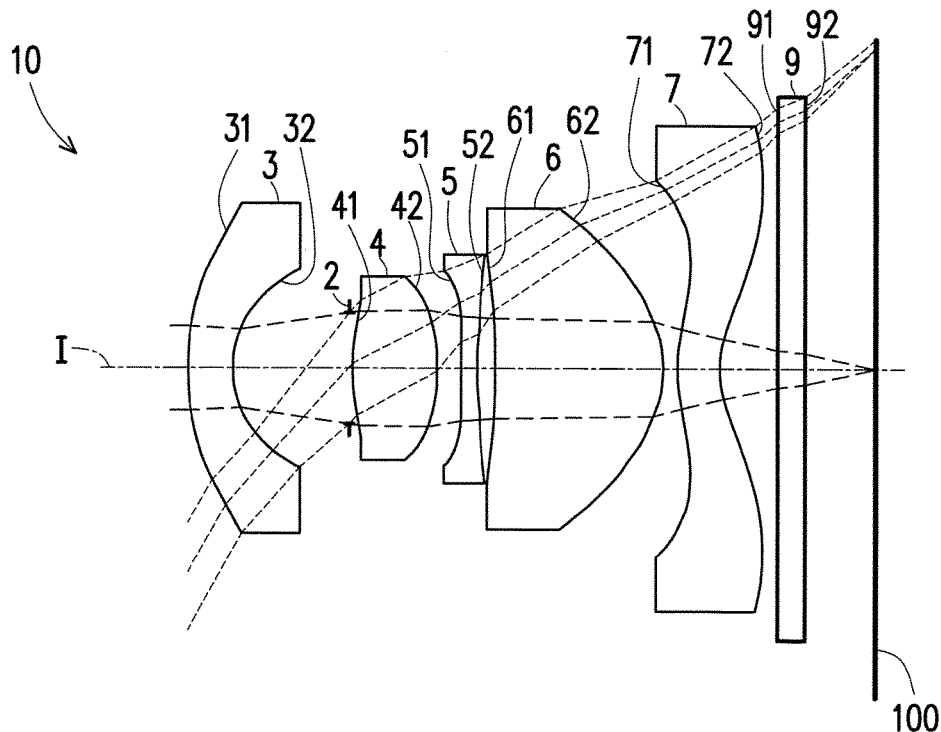
FIG. 46
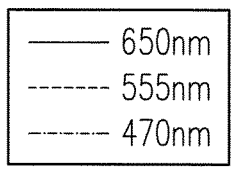
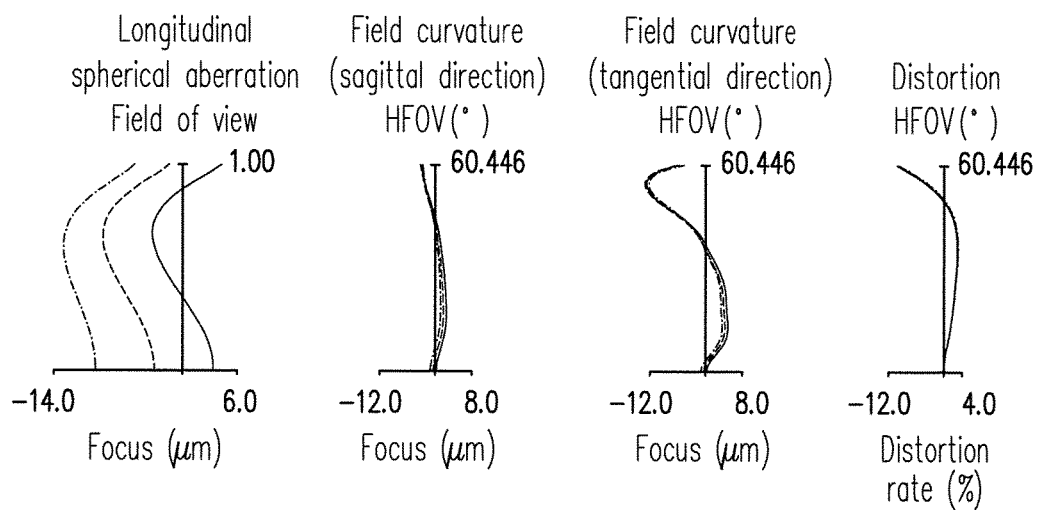
FIG. 47A  FIG. 47B  FIG. 47C  FIG. 47D

| Eleventh Embodiment ||||||||
| --- | --- | --- | --- | --- | --- | --- | --- |
| System focal length= 1.588 mm , Half field of view=60.446°, F-number=2.4, System length= 5.414 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.277 | 0.357 | Plastic | 1.535 | 55.712 | -2.582 |
| | Image-side surface 32 | Aspheric surface | 0.815 | 0.916 | | | | |
| Aperture stop 2 | | | Infinity | 0.026 | | | | |
| Second lens element 4 | Object-side surface 41 | Aspheric surface | 1.972 | 0.660 | Plastic | 1.535 | 55.780 | 1.814 |
| | Image-side surface 42 | Aspheric surface | -1.698 | 0.184 | | | | |
| Third lens element 5 | Object-side surface 51 | Aspheric surface | 5.199 | 0.130 | Plastic | 1.642 | 22.409 | -7.635 |
| | Image-side surface 52 | Aspheric surface | 2.509 | 0.148 | | | | |
| Fourth lens element 6 | Object-side surface 61 | Aspheric surface | -6.053 | 1.317 | Glass | 1.553 | 71.685 | 1.647 |
| | Image-side surface 62 | Aspheric surface | -0.855 | 0.113 | | | | |
| Fifth lens element 7 | Object-side surface 71 | Aspheric surface | 1.509 | 0.330 | Plastic | 1.642 | 22.409 | -3.013 |
| | Image-side surface 72 | Aspheric surface | 0.778 | 0.465 | | | | |
| Filter 9 | Object-side surface 91 | Spherical surface | Infinity | 0.210 | | 1.517 | 64.167 | |
| | Image-side surface 92 | Spherical surface | Infinity | 0.559 | | | | |
| | Image plane 100 | | Infinity | | | | | |

FIG. 48

| Surface | K | $a_2$ | $a_4$ | $a_6$ | $a_8$ |
|---|---|---|---|---|---|
| 31 | 1.188646E+00 | 0.000000E+00 | 5.180893E-02 | -3.549379E-02 | -3.967803E-03 |
| 32 | -8.969564E-01 | 0.000000E+00 | 2.945259E-01 | 1.851355E-01 | 0.000000E+00 |
| 41 | -2.273694E+00 | 0.000000E+00 | -3.609706E-02 | 5.830886E-02 | -9.729282E-01 |
| 42 | 7.529316E-01 | 0.000000E+00 | -3.760008E-01 | 9.318646E-01 | -2.991148E+00 |
| 51 | 0.000000E+00 | 0.000000E+00 | -7.972204E-01 | 1.045139E+00 | -1.052481E+00 |
| 52 | 4.095058E+00 | 0.000000E+00 | -5.199822E-01 | 6.868229E-01 | -5.362663E-01 |
| 61 | 2.435172E+01 | 0.000000E+00 | 5.405958E-02 | -2.683187E-01 | 4.688466E-01 |
| 62 | -4.669966E+00 | 0.000000E+00 | -3.847597E-01 | 6.019887E-01 | -9.098284E-01 |
| 71 | -1.886608E+00 | 0.000000E+00 | -3.096157E-01 | 1.576510E+00 | -1.330472E-01 |
| 72 | -3.775901E+00 | 0.000000E+00 | -1.441932E-01 | 5.540638E-02 | -7.316738E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.564676E+00 | -4.324406E+00 | 0.000000E+00 | 0.000000E+00 | |
| 51 | 0.000000E+00 | 0.000000E+00 | 0.000000E+00 | 0.000000E+00 | |
| 52 | 2.925488E-01 | -1.230219E-01 | 0.000000E+00 | 0.000000E+00 | |
| 61 | -3.326698E-01 | 2.233401E-01 | -1.071018E-01 | 0.000000E+00 | |
| 62 | 9.314454E-01 | -5.802242E-01 | 1.951020E-01 | -2.669001E-02 | |
| 71 | 1.136073E-01 | -5.883677E-02 | 1.535074E-02 | -1.572674E-03 | |
| 72 | -2.477565E-03 | 1.146056E-03 | -1.790879E-04 | 1.083779E-05 | |

FIG. 49

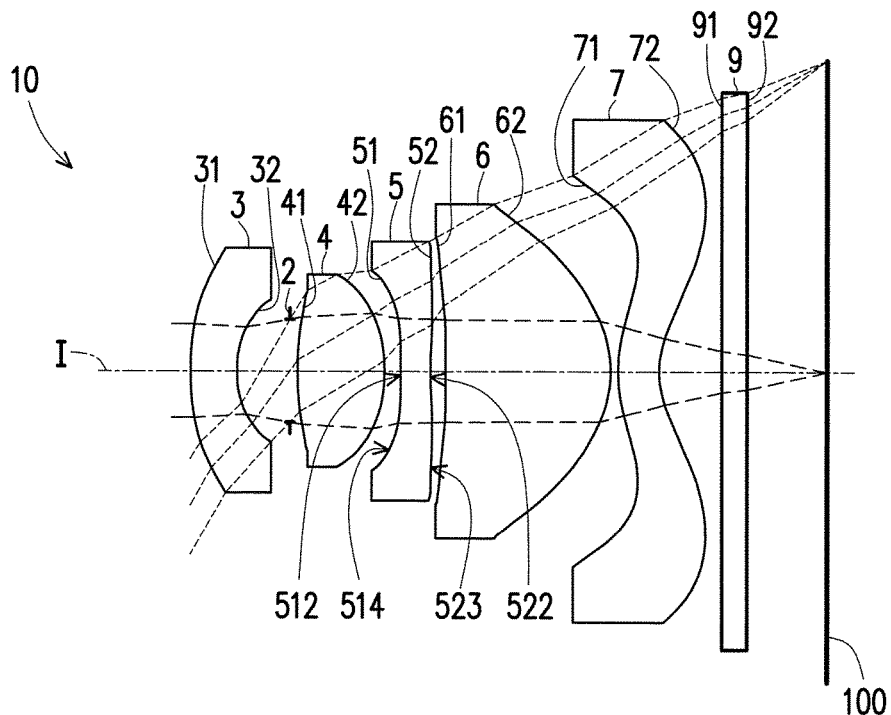
FIG. 50
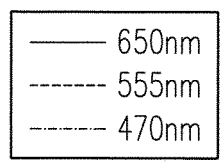
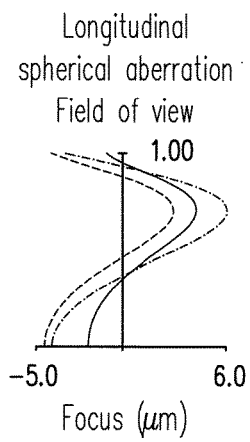
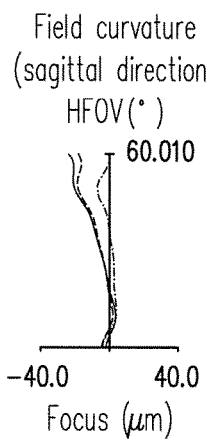
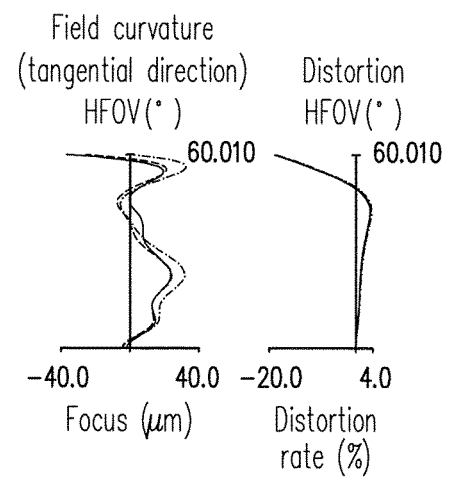
FIG. 51A    FIG. 51B    FIG. 51C    FIG. 51D

| Twelfth Embodiment | | | | | | | | |
|---|---|---|---|---|---|---|---|---|
| System focal length= 1.789 mm , Half field of view=60.010°, F-number=2.4, System length= 5.196 mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.519 | 0.375 | Plastic | 1.536 | 55.794 | -2.724 |
| | Image-side surface 32 | Aspheric surface | 0.878 | 0.435 | | | | |
| Aperture stop 2 | | | Infinity | 0.060 | | | | |
| Second lens element 4 | Object-side surface 41 | Aspheric surface | 2.519 | 0.705 | Plastic | 1.535 | 55.780 | 1.679 |
| | Image-side surface 42 | Aspheric surface | -1.267 | 0.135 | | | | |
| Third lens element 5 | Object-side surface 51 | Aspheric surface | -21.385 | 0.240 | Plastic | 1.642 | 22.409 | -4.373 |
| | Image-side surface 52 | Aspheric surface | 3.277 | 0.132 | | | | |
| Fourth lens element 6 | Object-side surface 61 | Aspheric surface | -8.165 | 1.342 | Glass | 1.553 | 71.685 | 1.658 |
| | Image-side surface 62 | Aspheric surface | -0.875 | 0.060 | | | | |
| Fifth lens element 7 | Object-side surface 71 | Aspheric surface | 1.174 | 0.336 | Plastic | 1.642 | 22.409 | -3.512 |
| | Image-side surface 72 | Aspheric surface | 0.687 | 0.514 | | | | |
| Filter 9 | Object-side surface 91 | Spherical surface | Infinity | 0.210 | | 1.517 | 64.167 | |
| | Image-side surface 92 | Spherical surface | Infinity | 0.653 | | | | |
| Image plane 100 | | | Infinity | | | | | |

FIG. 52

| Surface | K | $a_2$ | $a_4$ | $a_6$ | $a_8$ |
|---|---|---|---|---|---|
| 31 | -1.283244E-01 | 0.000000E+00 | 1.419806E-01 | -1.510783E-02 | -4.326969E-02 |
| 32 | 4.902866E-01 | 0.000000E+00 | 2.864294E-01 | 2.730493E-01 | 0.000000E+00 |
| 41 | 8.708727E-01 | 0.000000E+00 | 8.257037E-04 | 9.902868E-02 | -5.278029E-01 |
| 42 | 4.164626E-01 | 0.000000E+00 | -3.453889E-01 | 9.496227E-01 | -2.988201E+00 |
| 51 | 0.000000E+00 | 0.000000E+00 | -8.135242E-01 | 1.100420E+00 | -9.795129E-01 |
| 52 | 2.268823E+00 | 0.000000E+00 | -5.420186E-01 | 7.013544E-01 | -5.065318E-01 |
| 61 | 1.412223E+01 | 0.000000E+00 | 4.488228E-02 | -2.880622E-01 | 4.490163E-01 |
| 62 | -4.277589E+00 | 0.000000E+00 | -3.597469E-01 | 5.911691E-01 | -9.169268E-01 |
| 71 | -1.223494E+00 | 0.000000E+00 | -3.245161E-01 | 1.369569E-01 | -1.369295E-01 |
| 72 | -2.867177E+00 | 0.000000E+00 | -1.688105E-01 | 5.842902E-02 | -7.382141E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 5.317062E+00 | -4.308654E+00 | 0.000000E+00 | 0.000000E+00 | |
| 51 | -1.589059E-02 | 0.000000E+00 | 0.000000E+00 | 0.000000E+00 | |
| 52 | 3.078838E-01 | -1.299660E-01 | 0.000000E+00 | 0.000000E+00 | |
| 61 | -3.350859E-01 | 2.272390E-01 | -9.866782E-02 | 0.000000E+00 | |
| 62 | 9.304087E-01 | -5.784153E-01 | 1.952739E-01 | -2.658872E-02 | |
| 71 | 1.135093E-01 | -5.847140E-02 | 1.549538E-02 | -1.540477E-03 | |
| 72 | -2.587823E-03 | 1.130774E-03 | -1.795877E-04 | 1.151521E-05 | |

FIG. 53

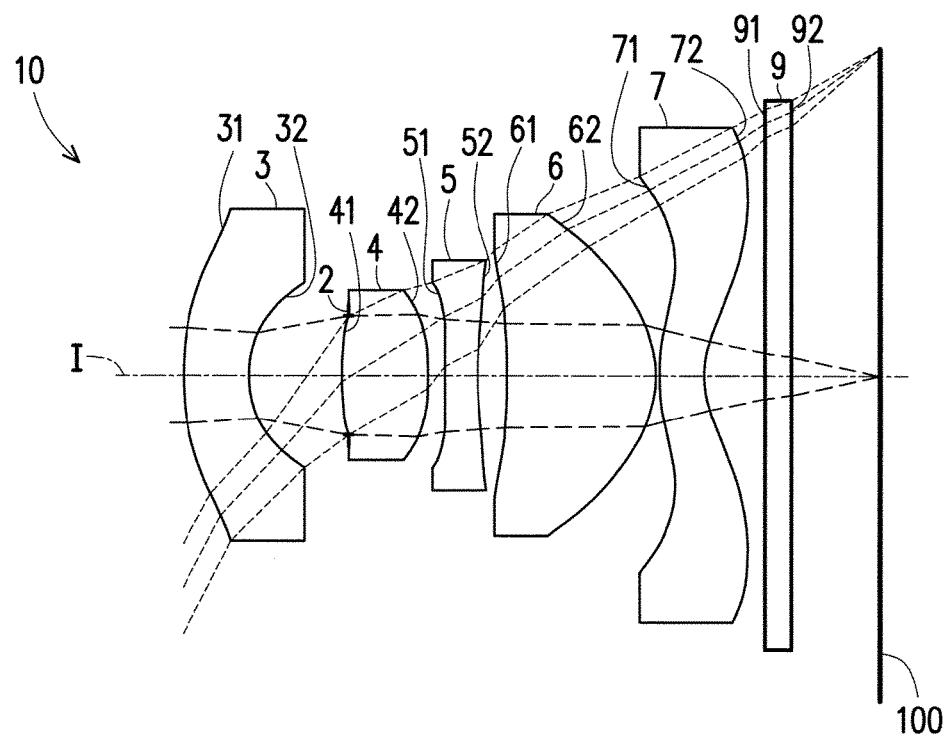
FIG. 54
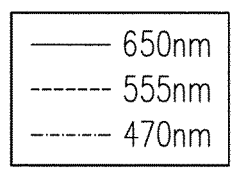
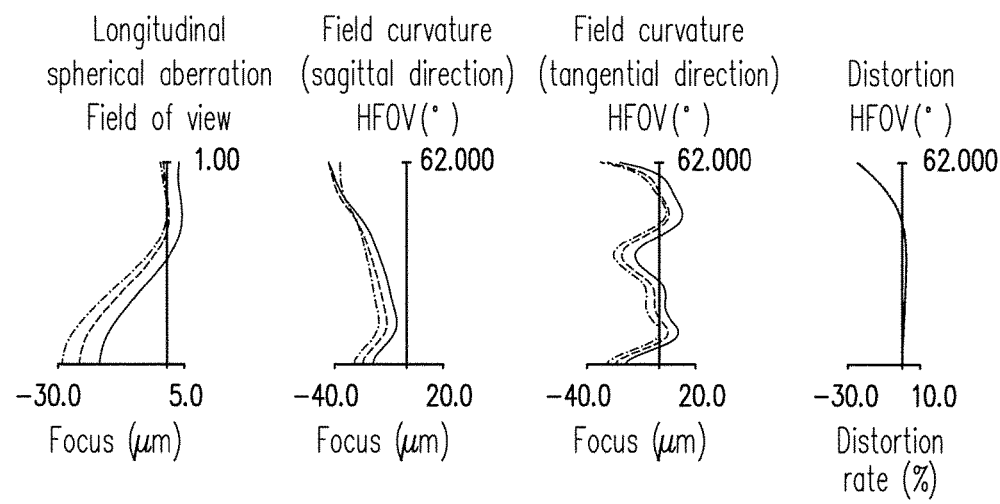
FIG. 55A  FIG. 55B  FIG. 55C  FIG. 55D

| Thirteenth Embodiment |||||||||
|---|---|---|---|---|---|---|---|---|
| System focal length= 1.769 mm , Half field of view=62.000°, F-number=2.4, System length= 5.434 mm, Image height=2.525 mm |||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.295 | 0.513 | Plastic | 1.535 | 55.712 | -2.618 |
| | Image-side surface 32 | Aspheric surface | 0.804 | 0.765 | | | | |
| Aperture stop 2 | | | Infinity | -0.046 | | | | |
| Second lens element 4 | Object-side surface 41 | Aspheric surface | 1.937 | 0.677 | Plastic | 1.535 | 55.780 | 1.796 |
| | Image-side surface 42 | Aspheric surface | -1.685 | 0.126 | | | | |
| Third lens element 5 | Object-side surface 51 | Aspheric surface | 5.822 | 0.257 | Plastic | 1.642 | 22.409 | -6.875 |
| | Image-side surface 52 | Aspheric surface | 2.478 | 0.232 | | | | |
| Fourth lens element 6 | Object-side surface 61 | Aspheric surface | -5.653 | 1.157 | Glass | 1.553 | 71.685 | 1.605 |
| | Image-side surface 62 | Aspheric surface | -0.825 | 0.028 | | | | |
| Fifth lens element 7 | Object-side surface 71 | Aspheric surface | 1.336 | 0.348 | Plastic | 1.642 | 22.409 | -2.963 |
| | Image-side surface 72 | Aspheric surface | 0.707 | 0.475 | | | | |
| Filter 9 | Object-side surface 91 | Spherical surface | Infinity | 0.210 | | 1.517 | 64.167 | |
| | Image-side surface 92 | Spherical surface | Infinity | 0.691 | | | | |
| | Image plane 100 | | Infinity | | | | | |

FIG. 56

| Surface | K | $a_2$ | $a_4$ | $a_6$ | $a_8$ |
|---|---|---|---|---|---|
| 31 | 1.138620E+00 | 0.000000E+00 | 4.258150E-02 | -3.691940E-02 | -4.661641E-03 |
| 32 | -7.844045E-01 | 0.000000E+00 | 3.465939E-01 | 4.042662E-02 | 0.000000E+00 |
| 41 | -1.705552E+00 | 0.000000E+00 | -3.143738E-02 | 1.653545E-01 | -1.078632E+00 |
| 42 | 1.325980E+00 | 0.000000E+00 | -4.112023E-01 | 9.688115E-01 | -2.892274E+00 |
| 51 | 0.000000E+00 | 0.000000E+00 | -7.720929E-01 | 1.064761E+00 | -1.094143E+00 |
| 52 | 3.860795E+00 | 0.000000E+00 | -5.136187E-01 | 6.821034E-01 | -5.302934E-01 |
| 61 | 2.424184E+01 | 0.000000E+00 | 3.453336E-02 | -2.757313E-01 | 4.650618E-01 |
| 62 | -4.536731E+00 | 0.000000E+00 | -3.871005E-01 | 5.969071E-01 | -9.118378E-01 |
| 71 | -2.230533E+00 | 0.000000E+00 | -3.101687E-01 | 1.582057E-01 | -1.327011E-01 |
| 72 | -3.717171E+00 | 0.000000E+00 | -1.511507E-01 | 5.603303E-02 | -7.301466E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.689643E+00 | -4.573653E+00 | 0.000000E+00 | 0.000000E+00 | |
| 51 | 0.000000E+00 | 0.000000E+00 | 0.000000E+00 | 0.000000E+00 | |
| 52 | 2.941651E-01 | -1.249965E-01 | 0.000000E+00 | 0.000000E+00 | |
| 61 | -3.330379E-01 | 2.266860E-01 | -9.951555E-02 | 0.000000E+00 | |
| 62 | 9.312452E-01 | -5.799609E-01 | 1.953098E-01 | -2.662277E-02 | |
| 71 | 1.137585E-01 | -5.877225E-02 | 1.537656E-02 | -1.562959E-03 | |
| 72 | -2.488499E-03 | 1.142444E-03 | -1.796786E-04 | 1.084215E-05 | |

FIG. 57

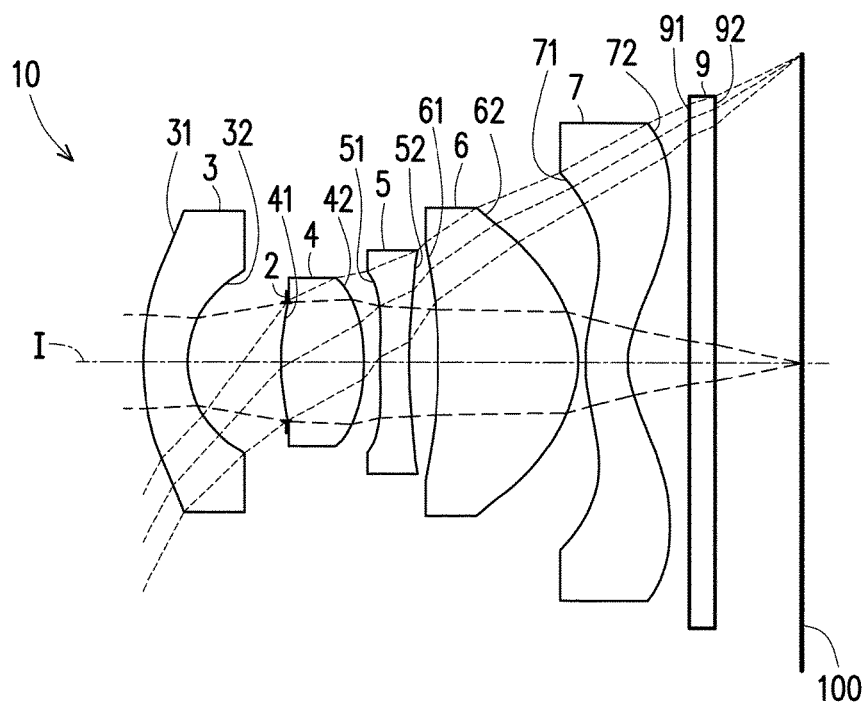
FIG. 58
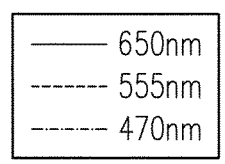
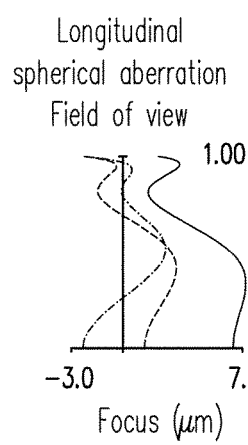
FIG. 59A
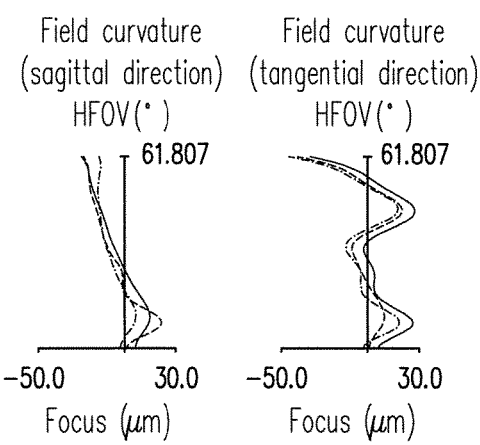
FIG. 59B  FIG. 59C
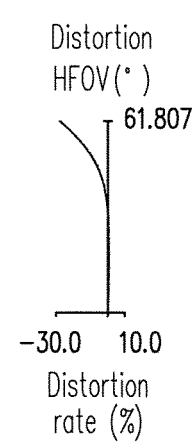
FIG. 59D

| Fourteenth Embodiment | | | | | | | | |
|---|---|---|---|---|---|---|---|---|
| System focal length= 1.877 mm , Half field of view=61.807°, F-number=2.4, System length= 5.392 mm, Image height=2.525 mm | | | | | | | | |
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 2.289 | 0.369 | Plastic | 1.535 | 55.712 | -2.722 |
| | Image-side surface 32 | Aspheric surface | 0.842 | 0.802 | | | | |
| Aperture stop 2 | | | Infinity | -0.042 | | | | |
| Second lens element 4 | Object-side surface 41 | Aspheric surface | 1.990 | 0.674 | Plastic | 1.535 | 55.780 | 1.831 |
| | Image-side surface 42 | Aspheric surface | -1.713 | 0.138 | | | | |
| Third lens element 5 | Object-side surface 51 | Aspheric surface | 5.815 | 0.230 | Plastic | 1.642 | 22.409 | -6.894 |
| | Image-side surface 52 | Aspheric surface | 2.486 | 0.243 | | | | |
| Fourth lens element 6 | Object-side surface 61 | Aspheric surface | -5.603 | 1.147 | Glass | 1.553 | 71.685 | 1.709 |
| | Image-side surface 62 | Aspheric surface | -0.870 | 0.060 | | | | |
| Fifth lens element 7 | Object-side surface 71 | Aspheric surface | 1.383 | 0.348 | Plastic | 1.642 | 22.409 | -2.868 |
| | Image-side surface 72 | Aspheric surface | 0.714 | 0.498 | | | | |
| Filter 9 | Object-side surface 91 | Spherical surface | Infinity | 0.210 | | 1.517 | 64.167 | |
| | Image-side surface 92 | Spherical surface | Infinity | 0.715 | | | | |
| | Image plane 100 | | Infinity | | | | | |

FIG. 60

| Sur-face | K | $a_2$ | $a_4$ | $a_6$ | $a_8$ |
|---|---|---|---|---|---|
| 31 | 1.290048E+00 | 0.000000E+00 | 3.785400E-02 | -4.008300E-02 | -5.450455E-03 |
| 32 | -9.340534E-01 | 0.000000E+00 | 2.931775E-01 | 1.772199E-01 | 0.000000E+00 |
| 41 | -1.216884E+00 | 0.000000E+00 | -2.104630E-02 | 7.603738E-02 | -9.128412E-01 |
| 42 | 1.036564E+00 | 0.000000E+00 | -4.096526E-01 | 9.633481E-01 | -2.921201E+00 |
| 51 | 0.000000E+00 | 0.000000E+00 | -7.749527E-01 | 1.058861E+00 | -1.074168E+00 |
| 52 | 4.034509E+00 | 0.000000E+00 | -5.123578E-01 | 6.888486E-01 | -5.373120E-01 |
| 61 | 2.530794E+01 | 0.000000E+00 | 3.660423E-02 | -2.756966E-01 | 4.651913E-01 |
| 62 | -4.776500E+00 | 0.000000E+00 | -3.860091E-01 | 5.950454E-01 | -9.127675E-01 |
| 71 | -2.411780E+00 | 0.000000E+00 | -3.108913E-01 | 1.582085E-01 | -1.327728E-01 |
| 72 | -3.522107E+00 | 0.000000E+00 | -1.527682E-01 | 5.546853E-02 | -7.290935E-03 |
| Sur-face | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.626872E+00 | -4.343829E+00 | 0.000000E+00 | 0.000000E+00 | |
| 51 | 0.000000E+00 | 0.000000E+00 | 0.000000E+00 | 0.000000E+00 | |
| 52 | 2.881825E-01 | -1.307671E-01 | 0.000000E+00 | 0.000000E+00 | |
| 61 | -3.329754E-01 | 2.271511E-01 | -9.875004E-02 | 0.000000E+00 | |
| 62 | 9.311100E-01 | -5.797937E-01 | 1.955331E-01 | -2.642049E-02 | |
| 71 | 1.137161E-01 | -5.878712E-02 | 1.537249E-02 | -1.564219E-03 | |
| 72 | -2.486012E-03 | 1.141821E-03 | -1.801340E-04 | 1.066947E-05 | |

FIG. 61

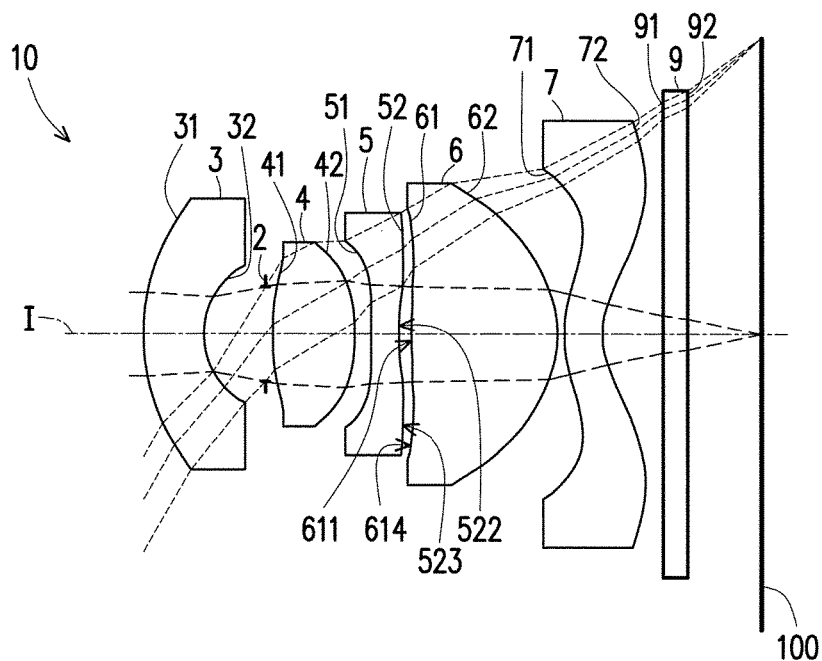
FIG. 62
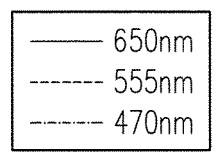
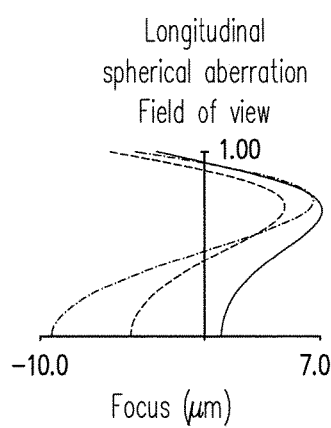
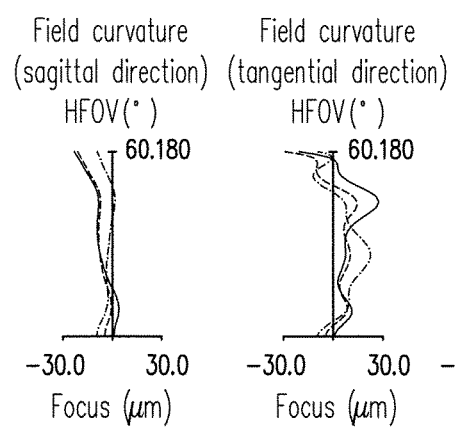
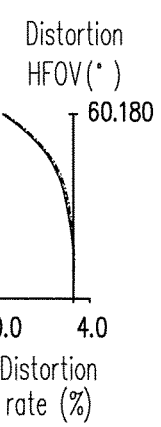
FIG. 63A   FIG. 63B   FIG. 63C   FIG. 63D

| Fifteenth Embodiment ||||||||
| --- | --- | --- | --- | --- | --- | --- | --- |
| System focal length= 1.739 mm , Half field of view=60.180°, F-number=2.4, System length= 5.290 mm, Image height=2.525 mm ||||||||
| Lens element | Surface | Surface type | Radius of curvature(mm) | Thickness (mm) | Material | Refractive index (Nd) | Dispersion coefficient (Vd) | Focal length(mm) |
| Object | | Spherical surface | Infinity | Infinity | | | | |
| First lens element 3 | Object-side surface 31 | Aspheric surface | 1.815 | 0.516 | Plastic | 1.536 | 55.794 | -2.376 |
| | Image-side surface 32 | Aspheric surface | 0.675 | 0.528 | | | | |
| Aperture stop 2 | | | Infinity | 0.060 | | | | |
| Second lens element 4 | Object-side surface 41 | Aspheric surface | 2.163 | 0.705 | Plastic | 1.535 | 55.780 | 1.895 |
| | Image-side surface 42 | Aspheric surface | -1.702 | 0.135 | | | | |
| Third lens element 5 | Object-side surface 51 | Aspheric surface | 4.893 | 0.240 | Plastic | 1.642 | 22.409 | -5.111 |
| | Image-side surface 52 | Aspheric surface | 1.936 | 0.108 | | | | |
| Fourth lens element 6 | Object-side surface 61 | Aspheric surface | 7.621 | 1.250 | Glass | 1.553 | 71.685 | 1.668 |
| | Image-side surface 62 | Aspheric surface | -0.992 | 0.060 | | | | |
| Fifth lens element 7 | Object-side surface 71 | Aspheric surface | 1.127 | 0.327 | Plastic | 1.642 | 22.409 | -4.231 |
| | Image-side surface 72 | Aspheric surface | 0.707 | 0.514 | | | | |
| Filter 9 | Object-side surface 91 | Spherical surface | Infinity | 0.210 | | 1.517 | 64.167 | |
| | Image-side surface 92 | Spherical surface | Infinity | 0.637 | | | | |
| | Image plane 100 | | Infinity | | | | | |

FIG. 64

| Surface | K | $a_2$ | $a_4$ | $a_6$ | $a_8$ |
|---|---|---|---|---|---|
| 31 | -1.386108E+00 | 0.000000E+00 | 3.944392E-02 | 4.640538E-03 | -8.985003E-03 |
| 32 | -2.531663E-02 | 0.000000E+00 | 5.925177E-02 | 2.386918E-02 | 0.000000E+00 |
| 41 | 2.818219E-01 | 0.000000E+00 | -1.350544E-02 | 1.161466E-01 | -4.123167E-01 |
| 42 | 5.712367E-01 | 0.000000E+00 | -5.979957E-01 | 1.299877E+00 | -3.569222E+00 |
| 51 | 0.000000E+00 | 0.000000E+00 | -1.022504E+00 | 1.208614E+00 | -1.059526E+00 |
| 52 | -3.282599E+00 | 0.000000E+00 | -5.800955E-01 | 6.633656E-01 | -4.809355E-01 |
| 61 | 2.911130E+01 | 0.000000E+00 | 4.984031E-03 | -3.524711E-01 | 4.217457E-01 |
| 62 | -4.799756E+00 | 0.000000E+00 | -3.559307E-01 | 5.848947E-01 | -9.335728E-01 |
| 71 | -1.620238E+00 | 0.000000E+00 | -3.038724E-01 | 1.118090E-01 | -1.426275E-01 |
| 72 | -2.443674E+00 | 0.000000E+00 | -1.984030E-01 | 5.975295E-02 | -4.963291E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 5.907870E+00 | -4.308654E+00 | 0.000000E+00 | 0.000000E+00 | |
| 51 | -3.441672E-02 | 0.000000E+00 | 0.000000E+00 | 0.000000E+00 | |
| 52 | 3.205124E-01 | -1.299660E-01 | 0.000000E+00 | 0.000000E+00 | |
| 61 | -2.962385E-01 | 2.272390E-01 | -9.866782E-02 | 0.000000E+00 | |
| 62 | 9.379439E-01 | -5.801021E-01 | 1.952739E-01 | -2.658872E-02 | |
| 71 | 1.185557E-01 | -5.613544E-02 | 1.598683E-02 | -2.181651E-03 | |
| 72 | -2.727275E-03 | 1.071015E-03 | -1.549697E-04 | 7.844757E-06 | |

FIG. 65

| Conditional expression | First Embodiment | Second Embodiment | Third Embodiment | Fourth Embodiment | Fifth Embodiment |
|---|---|---|---|---|---|
| T1 | 0.397 | 0.570 | 0.320 | 0.390 | 0.347 |
| G12 | 0.722 | 0.600 | 0.990 | 0.655 | 0.906 |
| T2 | 0.682 | 1.154 | 1.025 | 0.660 | 0.672 |
| G23 | 0.137 | 0.045 | 0.025 | 0.180 | 0.177 |
| T3 | 0.232 | 0.228 | 0.230 | 0.240 | 0.240 |
| G34 | 0.232 | 0.068 | 0.374 | 0.144 | 0.241 |
| T4 | 1.240 | 1.044 | 1.033 | 1.401 | 1.139 |
| G45 | 0.037 | 0.040 | 0.040 | 0.060 | 0.063 |
| T5 | 0.367 | 0.286 | 0.370 | 0.429 | 0.377 |
| G5F | 0.514 | 0.514 | 0.512 | 0.514 | 0.514 |
| TF | 0.210 | 0.210 | 0.210 | 0.210 | 0.210 |
| GFP | 0.731 | 0.739 | 0.575 | 0.551 | 0.636 |
| BFL | 1.455 | 1.463 | 1.297 | 1.275 | 1.360 |
| EFL | 1.924 | 2.132 | 1.934 | 1.785 | 1.821 |
| TTL | 5.501 | 5.498 | 5.704 | 5.436 | 5.521 |
| TL | 4.045 | 4.036 | 4.407 | 4.160 | 4.161 |
| ALT | 2.918 | 3.283 | 2.978 | 3.121 | 2.774 |
| AAG | 1.128 | 0.753 | 1.429 | 1.039 | 1.387 |
| $T_{max}$ | 1.240 | 1.154 | 1.033 | 1.401 | 1.139 |
| $T_{min}$ | 0.232 | 0.228 | 0.230 | 0.240 | 0.240 |

FIG. 66

| Conditional expression | First Embodiment | Second Embodiment | Third Embodiment | Fourth Embodiment | Fifth Embodiment |
|---|---|---|---|---|---|
| (T1+G12+T2)/(G23+T5) | 3.576 | 7.006 | 5.912 | 2.800 | 3.472 |
| ALT/(G45+T5) | 7.228 | 10.051 | 7.264 | 6.376 | 6.300 |
| EFL/(T1+T3) | 3.059 | 2.670 | 3.516 | 2.833 | 3.103 |
| ALT/AAG | 2.587 | 4.357 | 2.084 | 3.004 | 2.000 |
| TL/(T2+T3) | 4.424 | 2.920 | 3.512 | 4.621 | 4.564 |
| ALT/T1 | 7.356 | 5.756 | 9.307 | 8.000 | 8.000 |
| TTL/(G34+T4) | 3.737 | 4.946 | 4.053 | 3.517 | 4.003 |
| (T2+T4)/T5 | 5.241 | 7.674 | 5.563 | 4.800 | 4.800 |
| (T1+G12)/(T3+G34) | 2.409 | 3.954 | 2.168 | 2.719 | 2.606 |
| (T2+T5)/T1 | 2.644 | 2.525 | 4.360 | 2.793 | 3.025 |
| (G12+T2)/T3 | 6.043 | 7.686 | 8.761 | 5.480 | 6.574 |
| (G12+G23+G34)/T5 | 2.974 | 2.490 | 3.755 | 2.280 | 3.511 |
| (G12+T4)/(G23+T3) | 5.314 | 6.009 | 7.934 | 4.900 | 4.900 |
| T2/T3 | 2.935 | 5.057 | 4.457 | 2.751 | 2.799 |
| $T_{max}/T_{min}$ | 5.336 | 5.057 | 4.491 | 5.839 | 4.744 |
| ALT/(G12+G23+G34) | 2.675 | 4.603 | 2.144 | 3.188 | 2.095 |
| EFL/AAG | 1.706 | 2.830 | 1.353 | 1.718 | 1.313 |
| (T2+G23)/(T3+G45) | 3.041 | 4.468 | 3.889 | 2.800 | 2.800 |
| T4/T5 | 3.381 | 3.645 | 2.792 | 3.263 | 3.019 |
| AAG/(T3+G34) | 2.429 | 2.546 | 2.365 | 2.703 | 2.886 |

FIG. 67

| Conditional expression | Sixth Embodiment | Seventh Embodiment | Eighth Embodiment | Ninth Embodiment | Tenth Embodiment |
|---|---|---|---|---|---|
| T1 | 0.394 | 0.351 | 0.362 | 0.358 | 0.350 |
| G12 | 0.859 | 0.700 | 0.652 | 0.923 | 0.779 |
| T2 | 0.602 | 0.668 | 0.661 | 0.684 | 0.647 |
| G23 | 0.096 | 0.133 | 0.133 | 0.137 | 0.145 |
| T3 | 0.178 | 0.247 | 0.257 | 0.248 | 0.258 |
| G34 | 0.286 | 0.278 | 0.234 | 0.297 | 0.253 |
| T4 | 1.418 | 1.168 | 1.261 | 1.193 | 1.195 |
| G45 | 0.071 | 0.036 | 0.026 | 0.025 | 0.024 |
| T5 | 0.380 | 0.369 | 0.354 | 0.307 | 0.349 |
| G5F | 0.468 | 0.491 | 0.502 | 0.493 | 0.490 |
| TF | 0.210 | 0.210 | 0.210 | 0.210 | 0.210 |
| GFP | 0.658 | 0.708 | 0.712 | 0.711 | 0.707 |
| BFL | 1.335 | 1.409 | 1.425 | 1.414 | 1.407 |
| EFL | 1.810 | 1.905 | 1.929 | 1.826 | 1.868 |
| TTL | 5.619 | 5.358 | 5.366 | 5.586 | 5.405 |
| TL | 4.283 | 3.949 | 3.942 | 4.172 | 3.998 |
| ALT | 2.972 | 2.803 | 2.896 | 2.790 | 2.798 |
| AAG | 1.312 | 1.147 | 1.046 | 1.383 | 1.200 |
| $T_{max}$ | 1.418 | 1.168 | 1.261 | 1.193 | 1.195 |
| $T_{min}$ | 0.178 | 0.247 | 0.257 | 0.248 | 0.258 |

FIG. 68

| Conditional expression | Sixth Embodiment | Seventh Embodiment | Eighth Embodiment | Ninth Embodiment | Tenth Embodiment |
|---|---|---|---|---|---|
| (T1+G12+T2)/(G23+T5) | 3.894 | 3.429 | 3.441 | 4.426 | 3.596 |
| ALT/(G45+T5) | 6.585 | 6.921 | 7.615 | 8.405 | 7.502 |
| EFL/(T1+T3) | 3.164 | 3.186 | 3.113 | 3.013 | 3.075 |
| ALT/AAG | 2.265 | 2.443 | 2.769 | 2.018 | 2.331 |
| TL/(T2+T3) | 5.494 | 4.318 | 4.294 | 4.473 | 4.422 |
| ALT/T1 | 7.542 | 7.983 | 7.989 | 7.797 | 7.997 |
| TTL/(G34+T4) | 3.298 | 3.705 | 3.587 | 3.750 | 3.734 |
| (T2+T4)/T5 | 5.310 | 4.981 | 5.432 | 6.120 | 5.277 |
| (T1+G12)/(T3+G34) | 2.701 | 2.002 | 2.064 | 2.349 | 2.212 |
| (T2+T5)/T1 | 2.492 | 2.952 | 2.800 | 2.770 | 2.846 |
| (G12+T2)/T3 | 8.203 | 5.540 | 5.106 | 6.477 | 5.534 |
| (G12+G23+G34)/T5 | 3.263 | 3.013 | 2.881 | 4.426 | 3.371 |
| (G12+T4)/(G23+T3) | 8.305 | 4.923 | 4.904 | 5.488 | 4.906 |
| T2/T3 | 3.379 | 2.704 | 2.570 | 2.758 | 2.510 |
| $T_{max}/T_{min}$ | 7.961 | 4.732 | 4.906 | 4.805 | 4.639 |
| ALT/(G12+G23+G34) | 2.395 | 2.523 | 2.840 | 2.055 | 2.379 |
| EFL/AAG | 1.380 | 1.661 | 1.844 | 1.321 | 1.556 |
| (T2+G23)/(T3+G45) | 2.801 | 2.826 | 2.800 | 3.006 | 2.810 |
| T4/T5 | 3.728 | 3.169 | 3.565 | 3.888 | 3.424 |
| AAG/(T3+G34) | 2.828 | 2.185 | 2.128 | 2.535 | 2.353 |

FIG. 69

| Conditional expression | Eleventh Embodiment | Twelfth Embodiment | Thirteenth Embodiment | Fourteenth Embodiment | Fifteenth Embodiment |
|---|---|---|---|---|---|
| T1 | 0.357 | 0.375 | 0.513 | 0.369 | 0.516 |
| G12 | 0.942 | 0.495 | 0.719 | 0.760 | 0.588 |
| T2 | 0.660 | 0.705 | 0.677 | 0.674 | 0.705 |
| G23 | 0.184 | 0.135 | 0.126 | 0.138 | 0.135 |
| T3 | 0.130 | 0.240 | 0.257 | 0.230 | 0.240 |
| G34 | 0.148 | 0.132 | 0.232 | 0.243 | 0.108 |
| T4 | 1.317 | 1.342 | 1.157 | 1.147 | 1.250 |
| G45 | 0.113 | 0.060 | 0.028 | 0.060 | 0.060 |
| T5 | 0.330 | 0.336 | 0.348 | 0.348 | 0.327 |
| G5F | 0.465 | 0.514 | 0.475 | 0.498 | 0.514 |
| TF | 0.210 | 0.210 | 0.210 | 0.210 | 0.210 |
| GFP | 0.559 | 0.653 | 0.691 | 0.715 | 0.637 |
| BFL | 1.234 | 1.377 | 1.376 | 1.422 | 1.361 |
| EFL | 1.588 | 1.789 | 1.769 | 1.877 | 1.739 |
| TTL | 5.414 | 5.196 | 5.434 | 5.392 | 5.290 |
| TL | 4.181 | 3.820 | 4.058 | 3.969 | 3.929 |
| ALT | 2.794 | 2.998 | 2.953 | 2.767 | 3.038 |
| AAG | 1.387 | 0.822 | 1.105 | 1.202 | 0.891 |
| $T_{max}$ | 1.317 | 1.342 | 1.157 | 1.147 | 1.250 |
| $T_{min}$ | 0.130 | 0.240 | 0.257 | 0.230 | 0.240 |

FIG. 70

| Conditional expression | Eleventh Embodiment | Twelfth Embodiment | Thirteenth Embodiment | Fourteenth Embodiment | Fifteenth Embodiment |
|---|---|---|---|---|---|
| (T1+G12+T2)/(G23+T5) | 3.815 | 3.346 | 4.026 | 3.711 | 3.914 |
| ALT/(G45+T5) | 6.310 | 7.578 | 7.840 | 6.782 | 7.847 |
| EFL/(T1+T3) | 3.261 | 2.910 | 2.300 | 3.136 | 2.300 |
| ALT/AAG | 2.015 | 3.647 | 2.672 | 2.303 | 3.409 |
| TL/(T2+T3) | 5.291 | 4.042 | 4.342 | 4.391 | 4.158 |
| ALT/T1 | 7.823 | 8.000 | 5.760 | 7.505 | 5.887 |
| TTL/(G34+T4) | 3.696 | 3.524 | 3.911 | 3.878 | 3.897 |
| (T2+T4)/T5 | 5.994 | 6.101 | 5.269 | 5.239 | 5.975 |
| (T1+G12)/(T3+G34) | 4.675 | 2.338 | 2.519 | 2.386 | 3.172 |
| (T2+T5)/T1 | 2.773 | 2.777 | 2.001 | 2.771 | 2.000 |
| (G12+T2)/T3 | 12.342 | 5.000 | 5.432 | 6.243 | 5.387 |
| (G12+G23+G34)/T5 | 3.862 | 2.271 | 3.092 | 3.284 | 2.541 |
| (G12+T4)/(G23+T3) | 7.202 | 4.900 | 4.900 | 5.183 | 4.900 |
| T2/T3 | 5.086 | 2.938 | 2.635 | 2.935 | 2.937 |
| $T_{max}/T_{min}$ | 10.142 | 5.593 | 4.502 | 4.992 | 5.206 |
| ALT(/G12+G23+G34) | 2.193 | 3.934 | 2.742 | 2.424 | 3.655 |
| EFL/AAG | 1.145 | 2.176 | 1.601 | 1.562 | 1.952 |
| (T2+G23)/(T3+G45) | 3.477 | 2.800 | 2.814 | 2.800 | 2.800 |
| T4/T5 | 3.992 | 4.000 | 3.324 | 3.299 | 3.820 |
| AAG/(T3+G34) | 4.991 | 2.209 | 2.260 | 2.541 | 2.560 |

FIG. 71

OPTICAL IMAGING LENS

CROSS-REFERENCE TO RELATED APPLICATION

This application claims the priority benefit of China application serial no. 201710723422.5, filed on Aug. 22, 2017. The entirety of the above-mentioned patent application is hereby incorporated by reference herein and made a part of this specification.

BACKGROUND OF THE INVENTION

Field of the Invention

The invention relates to an optical device, particularly to an optical imaging lens.

Description of Related Art

Recently, the popularity of mobile phones and digital cameras has facilitated the development of camera modules. Whether an optical imaging lens is for capturing images or for video recording, a lightweight and compact design is desired. However, in current optical imaging lenses, a distance from an object-side surface of a first lens element to an image plane of the optical imaging lens along an optical axis tends to be greater, which is unfavorable for miniaturization of mobile phones, digital cameras and vehicle lenses. In addition, when the above electronic apparatuses are used in different environments, a difference in environmental temperature may cause a shift in a focus position of the optical imaging lens to thus affect imaging quality. Hence, persons skilled in the art expect that the optical imaging lens can maintain thermal stability, i.e., a system focal shift of the optical imaging lens can be made less likely to be affected by a change in temperature. In view of the above problem, how to design an optical imaging lens having good imaging quality and a shorter lens length while maintaining thermal stability has been a goal for persons skilled in the art.

SUMMARY OF THE INVENTION

The invention provides an optical imaging lens having good imaging quality and a shorter lens length and also having thermal stability.

An embodiment of the invention proposes an optical imaging lens including a first lens element, a second lens element, a third lens element, a fourth lens element and a fifth lens element arranged in sequence from an object side to an image side along an optical axis. The first lens element to the fifth lens element each includes an object-side surface facing the object side and allowing an imaging ray to pass therethrough and an image-side surface facing the image side and allowing the imaging ray to pass therethrough. The first lens element has negative refractive power. The object-side surface of the first lens element has a convex portion in a vicinity of the optical axis. The object-side surface of the second lens element has a convex portion in a vicinity of a periphery of the second lens element, and the image-side surface of the second lens element has a convex portion in the vicinity of the optical axis. The image-side surface of the third lens element has a concave portion in the vicinity of the optical axis. The fifth lens element has negative refractive power, and the image-side surface of the fifth lens element has a concave portion in a vicinity of the optical axis and a convex portion in a vicinity of a periphery of the fifth lens element. The optical imaging lens includes at least one lens element having positive refractive power and made of glass. Among the lens elements of the optical imaging lens, only the aforementioned five lens elements have refractive power, and the optical imaging lens satisfies: $(T1+G12+T2)/(G23+T5) \geq 2.800$ and $ALT/(G45+T5) \geq 6.300$, wherein T1 represents a central thickness of the first lens element along the optical axis, T2 represents a central thickness of the second lens element along the optical axis, T5 represents a central thickness of the fifth lens element along the optical axis, G12 represents an air gap between the first lens element and the second lens element along the optical axis, G23 represents an air gap between the second lens element and the third lens element along the optical axis, G45 represents an air gap between the fourth lens element and the fifth lens element along the optical axis, and ALT represents a sum of the central thicknesses of the first lens element, the second lens element, the third lens element, the fourth lens element and the fifth lens element along the optical axis.

Based on the above, the optical imaging lens of embodiments of the invention provides the following advantageous effects. By satisfying the combination of refractive power of the lens elements, the arrangement of concave and convex curved surfaces and the material of each lens element, as well as satisfying the aforementioned conditional expressions, the optical imaging lens can effectively reduce a lens length while maintaining imaging quality and having thermal stability.

To make the above features and advantages of the invention more comprehensible, embodiments accompanied with drawings are described in detail as follows.

BRIEF DESCRIPTION OF THE DRAWINGS

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view of an optical imaging lens according to a first embodiment of the invention.

FIGS. 7A to 7D illustrate longitudinal spherical aberration and various aberrations of the optical imaging lens according to the first embodiment.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view of an optical imaging lens according to a second embodiment of the invention.

FIGS. 11A to 11D illustrate longitudinal spherical aberration and various aberrations of the optical imaging lens according to the second embodiment.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view of an optical imaging lens according to a third embodiment of the invention.

FIGS. 15A to 15D illustrate longitudinal spherical aberration and various aberrations of the optical imaging lens according to the third embodiment.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view of an optical imaging lens according to a fourth embodiment of the invention.

FIGS. 19A to 19D illustrate longitudinal spherical aberration and various aberrations of the optical imaging lens according to the fourth embodiment.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view of an optical imaging lens according to a fifth embodiment of the invention.

FIGS. 23A to 23D illustrate longitudinal spherical aberration and various aberrations of the optical imaging lens according to the fifth embodiment.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view of an optical imaging lens according to a sixth embodiment of the invention.

FIGS. 27A to 27D illustrate longitudinal spherical aberration and various aberrations of the optical imaging lens according to the sixth embodiment.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 is a schematic view of an optical imaging lens according to a seventh embodiment of the invention.

FIGS. 31A to 31D illustrate longitudinal spherical aberration and various aberrations of the optical imaging lens according to the seventh embodiment.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 34 is a schematic view of an optical imaging lens according to an eighth embodiment of the invention.

FIGS. 35A to 35D illustrate longitudinal spherical aberration and various aberrations of the optical imaging lens according to the eighth embodiment.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 38 is a schematic view of an optical imaging lens according to a ninth embodiment of the invention.

FIGS. 39A to 39D illustrate longitudinal spherical aberration and various aberrations of the optical imaging lens according to the ninth embodiment.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 is a schematic view of an optical imaging lens according to a tenth embodiment of the invention.

FIGS. 43A to 43D illustrate longitudinal spherical aberration and various aberrations of the optical imaging lens according to the tenth embodiment.

FIG. 44 shows detailed optical data pertaining to the optical imaging lens according to the tenth embodiment of the invention.

FIG. 45 shows aspheric parameters pertaining to the optical imaging lens according to the tenth embodiment of the invention.

FIG. 46 is a schematic view of an optical imaging lens according to an eleventh embodiment of the invention.

FIGS. 47A to 47D illustrate longitudinal spherical aberration and various aberrations of the optical imaging lens according to the eleventh embodiment.

FIG. 48 shows detailed optical data pertaining to the optical imaging lens according to the eleventh embodiment of the invention.

FIG. 49 shows aspheric parameters pertaining to the optical imaging lens according to the eleventh embodiment of the invention.

FIG. 50 is a schematic view of an optical imaging lens according to a twelfth embodiment of the invention.

FIGS. 51A to 51D illustrate longitudinal spherical aberration and various aberrations of the optical imaging lens according to the twelfth embodiment.

FIG. 52 shows detailed optical data pertaining to the optical imaging lens according to the twelfth embodiment of the invention.

FIG. 53 shows aspheric parameters pertaining to the optical imaging lens according to the twelfth embodiment of the invention.

FIG. 54 is a schematic view of an optical imaging lens according to a thirteenth embodiment of the invention.

FIGS. 55A to 55D illustrate longitudinal spherical aberration and various aberrations of the optical imaging lens according to the thirteenth embodiment.

FIG. 56 shows detailed optical data pertaining to the optical imaging lens according to the thirteenth embodiment of the invention.

FIG. 57 shows aspheric parameters pertaining to the optical imaging lens according to the thirteenth embodiment of the invention.

FIG. 58 is a schematic view of an optical imaging lens according to a fourteenth embodiment of the invention.

FIGS. 59A to 59D illustrate longitudinal spherical aberration and various aberrations of the optical imaging lens according to the fourteenth embodiment.

FIG. 60 shows detailed optical data pertaining to the optical imaging lens according to the fourteenth embodiment of the invention.

FIG. 61 shows aspheric parameters pertaining to the optical imaging lens according to the fourteenth embodiment of the invention.

FIG. 62 is a schematic view of an optical imaging lens according to a fifteenth embodiment of the invention.

FIGS. 63A to 63D illustrate longitudinal spherical aberration and various aberrations of the optical imaging lens according to the fifteenth embodiment.

FIG. 64 shows detailed optical data pertaining to the optical imaging lens according to the fifteenth embodiment of the invention.

FIG. 65 shows aspheric parameters pertaining to the optical imaging lens according to the fifteenth embodiment of the invention.

FIGS. 66 and 67 show important parameters and relation values thereof pertaining to the optical imaging lens according to the first through the fifth embodiments of the invention.

FIGS. 68 and 69 show important parameters and relation values thereof pertaining to the optical imaging lens according to the sixth through the tenth embodiments of the invention.

FIGS. 70 and 71 show important parameters and relation values thereof pertaining to the optical imaging lens according to the eleventh through the fifteenth embodiments of the invention.

DETAILED DESCRIPTION OF DISCLOSED EMBODIMENTS

In the present specification, the description "a lens element having positive refractive power (or negative refractive power)" means that the paraxial refractive power of the lens element in Gaussian optics is positive (or negative). The description "an object-side (or image-side) surface of a lens element" only includes a specific region of that surface of the lens element through which imaging rays are capable of passing, namely the clear aperture of the surface. The aforementioned imaging rays can be classified into two types, chief rays Lc and marginal rays Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E and only pass through the clear aperture. The structures and shapes of the aforementioned extending portion E are only examples for technical explanation, and the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in the vicinity of the optical axis, the portion in the vicinity of the periphery of a lens element surface, and other types of lens element surfaces such as those having multiple portions.

Figure 1:
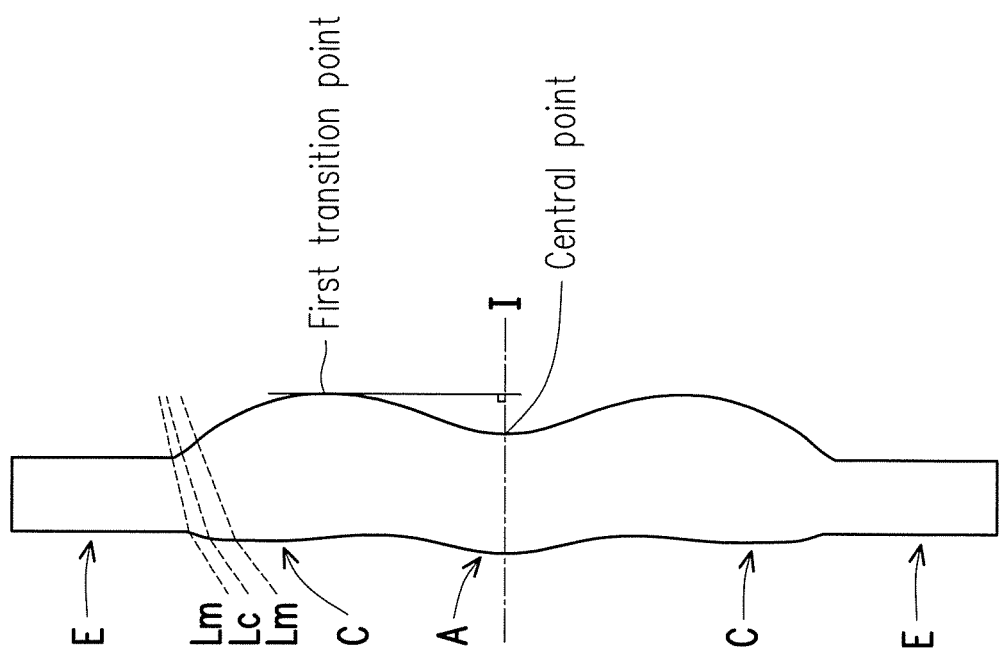
FIG. 1 is a schematic view illustrating a surface structure of a lens element.

1. FIG. 1 is a radial cross-sectional view of a lens element. Before determining boundaries of those aforementioned portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point, for instance, the first transition point (closest one to the optical axis), the second transition point, and the $N^{th}$ transition point (farthest one from the optical axis within the scope of the clear aperture of the surface). The portion of a surface of a lens element between the central point and the first transition point is defined as the portion in the vicinity of the optical axis. The portion located radially outside of the $N^{th}$ transition point (but still within the scope of the clear aperture) is defined as the portion in the vicinity of the periphery of the lens element. In some embodiments, there are other portions existing between the portion in the vicinity of the optical axis and the portion in the vicinity of the periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
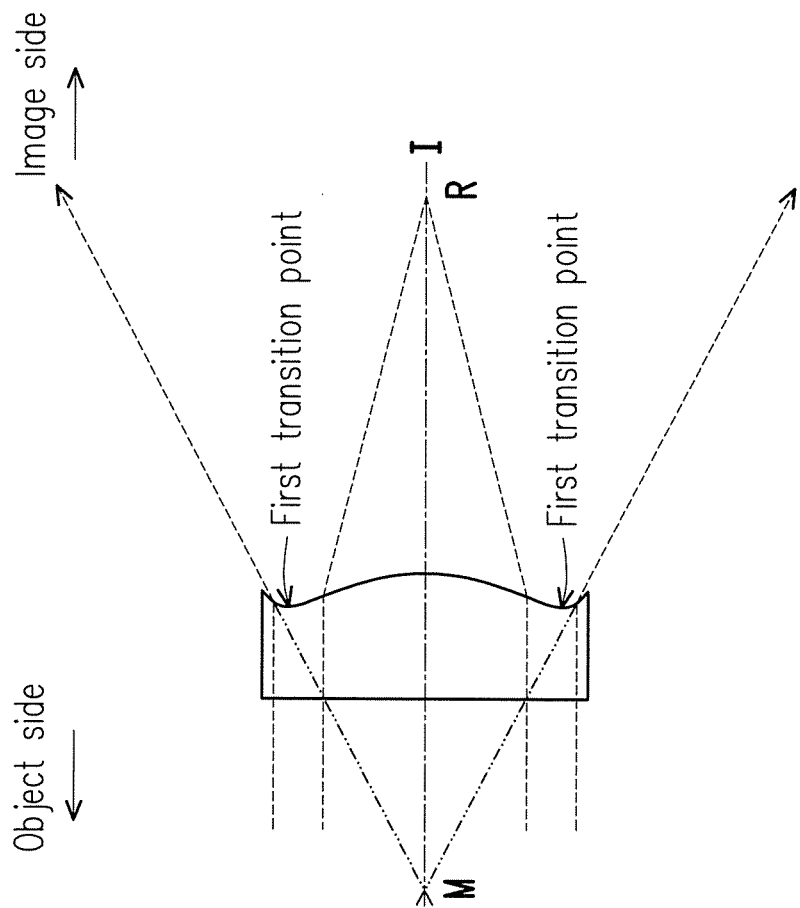
FIG. 2 is a schematic view illustrating a concave and convex surface structure of a lens element and a ray focal point.

2. Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bent and the ray itself or its extension line will eventually meet the optical axis. The shape of that portion can be determined by whether the ray or its extension line meets (intersects) the optical axis (focal point) at the object side or image side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, and the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in the vicinity of the optical axis has a convex or concave shape by referring to the sign of an "R" value, which is the (paraxial) radius of curvature of a lens surface. The R value may be used in optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent with that by using the other way mentioned above, which determines surface shapes by referring to whether the focal point of a collimated ray is at the object side or the image side.

3. For none transition point cases, the portion in the vicinity of the optical axis is defined as the portion between 0% to 50% of the effective radius (radius of the clear aperture) of the surface, whereas the portion in the vicinity of the periphery of the lens element is defined as the portion between 50% to 100% of effective radius (radius of the clear aperture) of the surface.

Referring to the first example depicted in FIG. 3, only one transition point, namely a first transition point, appears within the clear aperture of the image-side surface of the lens element. Portion I is a portion in the vicinity of the optical axis, and portion II is a portion in the vicinity of the periphery of the lens element. The portion in the vicinity of the optical axis is determined as having a concave shape because the R value at the image-side surface of the lens element is positive. The shape of the portion in the vicinity of the periphery of the lens element is different from that of the radially inner adjacent portion, i.e., the shape of the portion in the vicinity of the periphery of the lens element is different from the shape of the portion in the vicinity of the optical axis; the portion in the vicinity of the periphery of the lens element has a convex shape.

Referring to the second example depicted in FIG. 4, a first transition point and a second transition point exist on the object-side surface (within the clear aperture) of a lens element. Portion I is the portion in the vicinity of the optical axis, and portion III is the portion in the vicinity of the periphery of the lens element. The portion in the vicinity of the optical axis is determined as having a convex shape because the R value at the object-side surface of the lens element is positive. The portion (portion II) between the first and second transition points has a concave shape, and the portion (portion III) in the vicinity of the periphery of the lens element has a convex shape.

Referring to the third example depicted in FIG. 5, no transition point exists on the object-side surface of the lens element. In this case, the portion between 0% to 50% of the effective radius (the radius of the clear aperture) is determined as the portion in the vicinity of the optical axis, and the portion between 50% to 100% of the effective radius is determined as the portion in the vicinity of the periphery of the lens element. The portion in the vicinity of the optical axis of the object-side surface of the lens element is determined as having a convex shape because the R value of the portion in the vicinity of the optical axis is positive; the portion in the vicinity of the periphery of the lens element is determined as having a convex shape since no transition point exists between the portion in the vicinity of the periphery of the lens element and the portion in the vicinity of the optical axis.

FIG. 6 is a schematic view of an optical imaging lens according to a first embodiment of the invention. FIGS. 7A to 7D illustrate longitudinal spherical aberration and various aberrations of the optical imaging lens according to the first embodiment. Referring first to FIG. 6, an optical imaging lens 10 of the first embodiment of the invention includes a first lens element 3, an aperture stop 2, a second lens element 4, a third lens element 5, a fourth lens element 6, a fifth lens element 7 and an infrared (IR) cut filter 9 arranged in sequence from an object side to an image side along an optical axis I of the optical imaging lens 10. When a ray emitted from an object to be shot enters the optical imaging lens 10 and passes through the first lens element 3, the second lens element 4, the third lens element 5, the fourth lens element 6, the fifth lens element 7 and the IR cut filter 9, an image is formed on an image plane 100. The IR cut filter 9 is disposed between the fifth lens element 7 and the image plane 100. It should be added that the object side is a side facing the object to be shot, and the image side is a side facing the image plane 100.

In the present embodiment, the first lens element 3, the second lens element 4, the third lens element 5, the fourth lens element 6, the fifth lens element 7 and the filter 9 of the optical imaging lens 10 respectively have object-side surfaces 31, 41, 51, 61, 71, and 91 facing the object side and allowing an imaging ray to pass therethrough, and respectively have image-side surfaces 32, 42, 52, 62, 72, and 92 facing the image side and allowing the imaging ray to pass therethrough. In the present embodiment, the aperture stop 2 is disposed between the first lens element 3 and the second lens element 4.

The first lens element 3 has negative refractive power. A material of the first lens element 3 includes plastic. The object-side surface 31 of the first lens element 3 is a convex surface and has a convex portion 311 in a vicinity of the optical axis I and a convex portion 313 in a vicinity of a periphery of the first lens element 3. The image-side surface 32 of the first lens element 3 is a concave surface and has a concave portion 322 in the vicinity of the optical axis I and a concave portion 324 in the vicinity of the periphery of the first lens element 3. In the present embodiment, the object-side surface 31 and the image-side surface 32 of the first lens element 3 are both aspheric surfaces.

The second lens element 4 has positive refractive power. A material of the second lens element 4 includes plastic. The object-side surface 41 of the second lens element 4 is a convex surface and has a convex portion 411 in the vicinity of the optical axis I and a convex portion 413 in a vicinity of a periphery of the second lens element 4. The image-side surface 42 of the second lens element 4 is a convex surface and has a convex portion 421 in the vicinity of the optical axis I and a convex portion 423 in the vicinity of the periphery of the second lens element 4. In the present embodiment, the object-side surface 41 and the image-side surface 42 of the second lens element 4 are both aspheric surfaces.

The third lens element 5 has negative refractive power. A material of the third lens element 5 includes plastic. The object-side surface 51 of the third lens element 5 has a convex portion 511 in the vicinity of the optical axis I and a concave portion 514 in a vicinity of a periphery of the third lens element 5. The image-side surface 52 of the third lens element 5 is a concave surface and has a concave portion 522 in the vicinity of the optical axis I and a concave portion 524 in the vicinity of the periphery of the third lens element 5. In the present embodiment, the object-side surface 51 and the image-side surface 52 of the third lens element 5 are both aspheric surfaces.

The fourth lens element 6 has positive refractive power. A material of the fourth lens element 6 includes glass. The object-side surface 61 of the fourth lens element 6 is a concave surface and has a concave portion 612 in the vicinity of the optical axis I and a concave portion 614 in a vicinity of a periphery of the fourth lens element 6. The image-side surface 62 of the fourth lens element 6 is a convex surface and has a convex portion 621 in the vicinity of the optical axis I and a convex portion 623 in the vicinity of the periphery of the fourth lens element 6. In the present embodiment, the object-side surface 61 and the image-side surface 62 of the fourth lens element 6 are both aspheric surfaces.

The fifth lens element 7 has negative refractive power. A material of the fifth lens element 7 includes plastic. The object-side surface 71 of the fifth lens element 7 has a convex portion 711 in the vicinity of the optical axis I and a concave portion 714 in a vicinity of a periphery of the fifth lens element 7. The image-side surface 72 of the fifth lens element 7 has a concave portion 722 in the vicinity of the optical axis I and a convex portion 723 in the vicinity of the periphery of the fifth lens element 7. In the present embodiment, the object-side surface 71 and the image-side surface 72 of the fifth lens element 7 are both aspheric surfaces.

In the present embodiment, among the lens elements of the optical imaging lens 10, only the aforementioned five have refractive power.

The other detailed optical data of the first embodiment is as shown in FIG. 8. Moreover, in the optical imaging lens 10 of the first embodiment, an effective focal length (EFL) of the whole system is 1.924 millimeters (mm), a half field of view (HFOV) is 60.03°, an F-number (Fno) is 2.4; a system length is 5.501 mm, and an image height is 2.525 mm, wherein the system length refers to a distance from the object-side surface 31 of the first lens element 3 to the image plane 100 along the optical axis I.

In addition, in the present embodiment, the totally ten surfaces, namely the object-side surfaces 31, 41, 51, 61 and 71, and the image-side surfaces 32, 42, 52, 62 and 72, of the first lens element 3, the second lens element 4, the third lens element 5, the fourth lens element 6 and the fifth lens element 7 are all aspheric surfaces, wherein the object-side surfaces 31, 41, 51, 61 and 71 and the image-side surfaces 32, 42, 52, 62 and 72 are common even aspheric surfaces. In other embodiments, the object-side surface or the image-side surface of some of the lens elements is an extended aspheric surface. These aspheric surfaces are defined by the following formula:

$$Z(Y) = \frac{Y^2}{R}\left(1 + \sqrt{1-(1+K)\frac{Y^2}{R^2}}\right) + \sum_{i=1}^{n} a_{2i} \times \left(\frac{Y}{R_N}\right)^{2i} \quad (1)$$

wherein:

Y represents a distance from a point on an aspheric curve to the optical axis I;

Z represents a depth of the aspheric surface (a vertical distance between the point on the aspheric surface that is spaced from the optical axis I by the distance Y and a tangent plane tangent to a vertex of the aspheric surface on the optical axis I);

R represents a radius of curvature of the surface of the lens element close to the optical axis I;

K represents a conic constant;

$a_{2i}$ represents a $2i^{th}$ aspheric coefficient;

$R_N$ represents a normalization radius, wherein when $R_N$=1, the aspheric surface defined by formula (1) is a common even aspheric surface; when $R_N \neq 1$, the aspheric surface defined by formula (1) is an extended aspheric surface.

Various aspheric coefficients of the object-side surface 31 of the first lens element 3 to the image-side surface 72 of the fifth lens element 7 in formula (1) are as shown in FIG. 9. In FIG. 9, column number 31 indicates the aspheric coefficients of the object-side surface 31 of the first lens element 3, and the other columns are defined in a similar manner.

In addition, relationships among important parameters pertaining to the optical imaging lens 10 of the first embodiment are as shown in FIGS. 66 and 67, wherein EFL represents a system focal length of the optical imaging lens 10;

HFOV represents a half field of view of the optical imaging lens 10;

Fno represents an F-number of the optical imaging lens 10;

T1 represents a central thickness of the first lens element 3 along the optical axis I;

T2 represents a central thickness of the second lens element 4 along the optical axis I;

T3 represents a central thickness of the third lens element 5 along the optical axis I;

T4 represents a central thickness of the fourth lens element 6 along the optical axis I;

T5 represents a central thickness of the fifth lens element 7 along the optical axis I;

G12 represents a distance from the image-side surface 32 of the first lens element 3 to the object-side surface 41 of the second lens element 4 along the optical axis I, i.e., an air gap between the first lens element 3 and the second lens element 4 along the optical axis I;

G23 represents a distance from the image-side surface 42 of the second lens element 4 to the object-side surface 51 of the third lens element 5 along the optical axis I, i.e., an air gap between the second lens element 4 and the third lens element 5 along the optical axis I;

G34 represents a distance from the image-side surface 52 of the third lens element 5 to the object-side surface 61 of the fourth lens element 6 along the optical axis I, i.e., an air gap between the third lens element 5 and the fourth lens element 6 along the optical axis I;

G45 represents a distance from the image-side surface 62 of the fourth lens element 6 to the object-side surface 71 of the fifth lens element 7 along the optical axis I, i.e., an air gap between the fourth lens element 6 and the fifth lens element 7 along the optical axis I;

G5F represents a distance from the image-side surface 72 of the fifth lens element 7 to the object-side surface 91 of the filter 9 along the optical axis I, i.e., an air gap between the fifth lens element 7 and the filter 9 along the optical axis I;

TF represents a thickness of the filter 9 along the optical axis I;

GFP represents a distance from the image-side surface 92 of the filter 9 to the image plane 100 along the optical axis I, i.e., an air gap between the filter 9 and the image plane 100 along the optical axis I;

TTL represents a distance from the object-side surface 31 of the first lens element 3 to the image plane 100 along the optical axis I;

BFL represents a distance from the image-side surface 72 of the fifth lens element 7 to the image plane 100 along the optical axis I;

AAG represents a sum of the four air gaps between the first lens element 3 and the fifth lens element 7 along the optical axis I, i.e., the sum of G12, G23, G34 and G45;

ALT represents a sum of the thicknesses of the first lens element 3, the second lens element 4, the third lens element 5, the fourth lens element 6 and the fifth lens element 7 along the optical axis I, i.e., the sum of T1, T2, T3, T4 and T5;

TL represents a distance from the object-side surface 31 of the first lens element 3 to the image-side surface 72 of the fifth lens element 7 along the optical axis I;

T$_{max}$ represents the maximum value among the central thicknesses of the first lens element 3, the second lens element 4, the third lens element 5, the fourth lens element 6 and the fifth lens element 7 along the optical axis I; and T$_{min}$ represents the minimum value among the central thicknesses of the first lens element 3, the second lens element 4, the third lens element 5, the fourth lens element 6 and the fifth lens element 7 along the optical axis I.

In addition, it is defined:

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
v1 is an Abbe number (also referred to as dispersion coefficient) of the first lens element 3;
v2 is an Abbe number of the second lens element 4;
v3 is an Abbe number of the third lens element 5;
v4 is an Abbe number of the fourth lens element 6; and
v5 is an Abbe number of the fifth lens element 7.

In the optical design of the optical imaging lens 10 of the first embodiment, good thermal stability is provided. The room temperature of 20° C. is set as a standard under which a focal shift is 0 mm, and the focal shift is -0.00161 mm at a temperature of 0° C. When the temperature rises to 70° C., the focal shift is -0.0001 mm.

Then, referring to FIGS. 7A to 7D, FIG. 7A illustrates a longitudinal spherical aberration at the time when a pupil radius is 0.4008 mm in the first embodiment; FIGS. 7B and 7C respectively illustrate field curvature aberrations on the image plane 100 in a sagittal direction and in a tangential direction at wavelengths of 470 nm, 555 nm and 650 nm in the first embodiment; and FIG. 7D illustrates a distortion aberration on the image plane 100 at wavelengths of 470 nm, 555 nm and 650 nm in the first embodiment. In FIG. 7A that illustrates the longitudinal spherical aberration of the first embodiment, curves of each wavelength are close to one another and approach the center, which indicates that off-axis rays of each wavelength at different heights are concentrated around an imaging point. A deviation range of a curve of each wavelength indicates that deviations of the imaging points of the off-axis rays at different heights are controlled within a range of ±8 μm. Hence, it is evident that the spherical aberration at the same wavelength can be significantly improved according to the first embodiment. In addition, distances among the three representative wavelengths are quite close, which indicates that imaging positions of the rays of different wavelengths are rather concentrated; therefore, a chromatic aberration can be significantly improved as well.

In FIGS. 7B and 7C that illustrate the two field curvature aberrations, a focal length variation of the three representative wavelengths within the entire field of view falls within ±30 μm, which indicates that aberration of the optical system of the first embodiment can be effectively eliminated. In FIG. 7D, the diagram of distortion aberration shows that the distortion aberration of the first embodiment is maintained within a range of ±25%, which indicates that the distortion aberration of the first embodiment complies with an imaging quality requirement of the optical system. Accordingly, compared to the existing optical lenses, the first embodiment can still provide good imaging quality under a condition that the system length is shortened to about 5.501 mm. Therefore, according to the first embodiment, a lens length can be shortened and the thermal stability can be provided, while good optical properties are maintained.

FIG. 10 is a schematic view of an optical imaging lens according to a second embodiment of the invention. FIGS. 11A to 11D illustrate longitudinal spherical aberration and various aberrations of the optical imaging lens according to the second embodiment. Referring first to FIG. 10, the optical imaging lens 10 according to the second embodiment of the invention is roughly similar to that of the first embodiment, while the optical data, the aspheric coefficients and the parameters of the lens elements 3, 4, 5, 6 and 7 in the two embodiments are different to some extent. In addition, in the present embodiment, the second lens element 4 is made of glass. The fourth lens element 6 is made of plastic. In addition, the object-side surface 51 of the third lens element 5 is a concave surface and has a concave portion 512 in the vicinity of the optical axis I and the concave portion 514 in the vicinity of the periphery of the third lens element 5. The image-side surface 52 of the third lens element 5 has the concave portion 522 in the vicinity of the optical axis I and a convex portion 523 in the vicinity of the periphery of the third lens element 5. The object-side surface 61 of the fourth lens element 6 has a convex portion 611 in the vicinity of the optical axis I and the concave portion 614 in the vicinity of the periphery of the fourth lens element 6. It should be noted that, for clear illustration, some of the reference numerals of the concave portions and the convex portions same as those of the first embodiment are omitted from FIG. 10. In addition, in the present embodiment, the object-side surface 41 and the image-side surface 42 of the second lens element 4 are both spherical surfaces.

In the optical design of the optical imaging lens 10 of the second embodiment, good thermal stability is provided. The room temperature of 20° C. is set as the standard under which the focal shift is 0 mm, and the focal shift is 0.00696 mm at the temperature of 0° C. When the temperature rises to 70° C., the focal shift is -0.0189 mm.

The detailed optical data of the optical imaging lens 10 of the second embodiment is as shown in FIG. 12. Moreover, in the optical imaging lens 10 of the second embodiment, the EFL of the whole system is 2.132 mm, the HFOV is 60.16°, the Fno is 2.4, the system length is 5.498 mm, and the image height is 2.525 mm.

FIG. 13 shows the various aspheric coefficients of the object-side surface 31 of the first lens element 3 to the image-side surface 72 of the fifth lens element 7 in formula (1) in the second embodiment.

In addition, the relationships among the important parameters pertaining to the optical imaging lens 10 of the second embodiment are as shown in FIGS. 66 and 67.

In FIG. 11A that illustrates the longitudinal spherical aberration at the time when the pupil radius is 0.4442 mm in the second embodiment, deviations of the imaging points of the off-axis rays at different heights are controlled within a range of ±12 μm. In FIGS. 11B and 11C that illustrate the two field curvature aberrations, the focal length variation of the three representative wavelengths within the entire field of view falls within ±40 μm. In FIG. 11D, the diagram of distortion aberration shows that the distortion aberration of the second embodiment is maintained within a range of ±32%.

It is clear from the above descriptions that the system length of the second embodiment is shorter than the system length of the first embodiment. The HFOV of the second embodiment is greater than the HFOV of the first embodiment. The second embodiment is easier to manufacture than the first embodiment, and therefore has a higher yield.

FIG. 14 is a schematic view of an optical imaging lens according to a third embodiment of the invention. FIGS. 15A to 15D illustrate longitudinal spherical aberration and various aberrations of the optical imaging lens according to the third embodiment. Referring first to FIG. 14, the optical imaging lens 10 according to the third embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 14. In addition, in the present embodiment, the object-side surface 31 and the image-side surface 32 of the first lens element 3 are common even aspheric surfaces. The object-side surface 41 and the image-side surface 42 of the second lens element 4 are common even aspheric surfaces. The object-side surface 51 and the image-side surface 52 of the third lens element 5 are both extended aspheric surfaces. The object-side surface 61 and the image-side surface 62 of the fourth lens element 6 are both spherical surfaces. The object-side surface 71 and the image-side surface 72 of the fifth lens element 7 are both extended aspheric surfaces.

In the optical design of the optical imaging lens 10 of the third embodiment, good thermal stability is provided. The room temperature of 20° C. is set as the standard under which the focal shift is 0 mm, and the focal shift is −0.0045 mm at the temperature of 0° C. When the temperature rises to 70° C., the focal shift is 0.0005 mm.

The detailed optical data of the optical imaging lens 10 of the third embodiment is as shown in FIG. 16. Moreover, in the optical imaging lens 10 of the third embodiment, the EFL of the whole system is 1.934 mm, the HFOV is 59.955°, the Fno is 2.4, the system length is 5.704 mm, and the image height is 2.525 mm.

FIG. 17 shows the various aspheric coefficients of the object-side surface 31 of the first lens element 3 to the image-side surface 72 of the fifth lens element 7 in formula (1) in the third embodiment.

In addition, the relationships among the important parameters pertaining to the optical imaging lens 10 of the third embodiment are as shown in FIGS. 66 and 67.

In FIG. 15A that illustrates the longitudinal spherical aberration at the time when the pupil radius is 0.3919 mm in the third embodiment, deviations of the imaging points of the off-axis rays at different heights are controlled within a range of ±25 µm. In FIGS. 15B and 15C that illustrate the two field curvature aberrations, the focal length variation of the three representative wavelengths within the entire field of view falls within ±65 µm. In FIG. 15D, the diagram of distortion aberration shows that the distortion aberration of the third embodiment is maintained within a range of ±25%.

FIG. 18 is a schematic view of an optical imaging lens according to a fourth embodiment of the invention. FIGS. 19A to 19D illustrate longitudinal spherical aberration and various aberrations of the optical imaging lens according to the fourth embodiment. Referring first to FIG. 18, the optical imaging lens 10 according to the fourth embodiment of the invention is roughly similar to that of the first embodiment, while the optical data, the aspheric coefficients and the parameters of the lens elements 3, 4, 5, 6 and 7 in the two embodiments are different to some extent. In addition, the object-side surface 51 of the third lens element 5 is a concave surface and has the concave portion 512 in the vicinity of the optical axis I and the concave portion 514 in the vicinity of the periphery of the third lens element 5. The image-side surface 52 of the third lens element 5 has the concave portion 522 in the vicinity of the optical axis I and the convex portion 523 in the vicinity of the periphery of the third lens element 5. It should be noted that, for clear illustration, some of the reference numerals of the concave portions and the convex portions same as those of the first embodiment are omitted from FIG. 18.

In the optical design of the optical imaging lens 10 of the fourth embodiment, good thermal stability is provided. The room temperature of 20° C. is set as the standard under which the focal shift is 0 mm, and the focal shift is 0.0035 mm at the temperature of 0° C. When the temperature rises to 70° C., the focal shift is −0.018 mm.

The detailed optical data of the optical imaging lens 10 of the fourth embodiment is as shown in FIG. 20. Moreover, in the optical imaging lens 10 of the fourth embodiment, the EFL of the whole system is 1.785 mm, the HFOV is 60.014°, the Fno is 2.4, the system length is 5.436 mm, and the image height is 2.525 mm.

FIG. 21 shows the various aspheric coefficients of the object-side surface 31 of the first lens element 3 to the image-side surface 72 of the fifth lens element 7 in formula (1) in the fourth embodiment.

In addition, the relationships among the important parameters pertaining to the optical imaging lens 10 of the fourth embodiment are as shown in FIGS. 66 and 67.

In FIG. 19A that illustrates the longitudinal spherical aberration at the time when the pupil radius is 0.3718 mm in the fourth embodiment, deviations of the imaging points of the off-axis rays at different heights are controlled within a range of ±19 µm. In FIGS. 19B and 19C that illustrate the two field curvature aberrations, the focal length variation of the three representative wavelengths within the entire field of view falls within ±35 µm. In FIG. 19D, the diagram of distortion aberration shows that the distortion aberration of the fourth embodiment is maintained within a range of ±18%.

It is clear from the above descriptions that the system length of the fourth embodiment is shorter than the system length of the first embodiment. The distortion of the fourth embodiment is smaller than the distortion of the first embodiment.

FIG. 22 is a schematic view of an optical imaging lens according to a fifth embodiment of the invention. FIGS. 23A to 23D illustrate longitudinal spherical aberration and various aberrations of the optical imaging lens according to the fifth embodiment. Referring first to FIG. 22, the optical imaging lens 10 according to the fifth embodiment of the invention is roughly similar to that of the first embodiment, while the optical data, the aspheric coefficients and the parameters of the lens elements 3, 4, 5, 6 and 7 in the two embodiments are different to some extent. In addition, the image-side surface 52 of the third lens element 5 has the concave portion 522 in the vicinity of the optical axis I and the convex portion 523 in the vicinity of the periphery of the third lens element 5. It should be noted that, for clear illustration, some of the reference numerals of the concave portions and the convex portions same as those of the first embodiment are omitted from FIG. 22.

In the optical design of the optical imaging lens 10 of the fifth embodiment, good thermal stability is provided. The room temperature of 20° C. is set as the standard under which the focal shift is 0 mm, and the focal shift is 0 mm at the temperature of 0° C. When the temperature rises to 70° C., the focal shift is −0.006 mm.

The detailed optical data of the optical imaging lens 10 of the fifth embodiment is as shown in FIG. 24. Moreover, in the optical imaging lens 10 of the fifth embodiment, the EFL of the whole system is 1.821 mm, the HFOV is 60.398°, the Fno is 2.4, the system length is 5.521 mm, and the image height is 2.525 mm.

FIG. 25 shows the various aspheric coefficients of the object-side surface 31 of the first lens element 3 to the image-side surface 72 of the fifth lens element 7 in formula (1) in the fifth embodiment.

In addition, the relationships among the important parameters pertaining to the optical imaging lens 10 of the fifth embodiment are as shown in FIGS. 66 and 67.

In FIG. 23A that illustrates the longitudinal spherical aberration at the time when the pupil radius is 0.3793 mm in the fifth embodiment, deviations of the imaging points of the off-axis rays at different heights are controlled within a range of ±12 μm. In FIGS. 23B and 23C that illustrate the two field curvature aberrations, the focal length variation of the three representative wavelengths within the entire field of view falls within ±32 μm. In FIG. 23D, the diagram of distortion aberration shows that the distortion aberration of the fifth embodiment is maintained within a range of ±21%.

It is clear from the above descriptions that the HFOV of the fifth embodiment is greater than the HFOV of the first embodiment. The distortion of the fifth embodiment is smaller than the distortion of the first embodiment. The fifth embodiment is better than the first embodiment in thermal stability at low temperatures. The fifth embodiment is easier to manufacture than the first embodiment, and therefore has a higher yield.

FIG. 26 is a schematic view of an optical imaging lens according to a sixth embodiment of the invention. FIGS. 27A to 27D illustrate longitudinal spherical aberration and various aberrations of the optical imaging lens according to the sixth embodiment. Referring first to FIG. 26, the optical imaging lens 10 according to the sixth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 26.

In the optical design of the optical imaging lens 10 of the sixth embodiment, good thermal stability is provided. The room temperature of 20° C. is set as the standard under which the focal shift is 0 mm, and the focal shift is –0.0015 mm at the temperature of 0° C. When the temperature rises to 70° C., the focal shift is –0.0005 mm.

The detailed optical data of the optical imaging lens 10 of the sixth embodiment is as shown in FIG. 28. Moreover, in the optical imaging lens 10 of the sixth embodiment, the EFL of the whole system is 1.810 mm, the HFOV is 62.847°, the Fno is 2.4, the system length is 5.619 mm, and the image height is 2.525 mm.

FIG. 29 shows the various aspheric coefficients of the object-side surface 31 of the first lens element 3 to the image-side surface 72 of the fifth lens element 7 in formula (1) in the sixth embodiment.

In addition, the relationships among the important parameters pertaining to the optical imaging lens 10 of the sixth embodiment are as shown in FIGS. 68 and 69.

In FIG. 27A that illustrates the longitudinal spherical aberration at the time when the pupil radius is 0.3770 mm in the sixth embodiment, deviations of the imaging points of the off-axis rays at different heights are controlled within a range of ±6 μm. In FIGS. 27B and 27C that illustrate the two field curvature aberrations, the focal length variation of the three representative wavelengths within the entire field of view falls within ±65 μm. In FIG. 27D, the diagram of distortion aberration shows that the distortion aberration of the sixth embodiment is maintained within a range of ±29%.

It is clear from the above descriptions that the HFOV of the sixth embodiment is greater than the HFOV of the first embodiment. The longitudinal spherical aberration of the sixth embodiment is smaller than the longitudinal spherical aberration of the first embodiment. The sixth embodiment is better than the first embodiment in thermal stability at low temperatures.

FIG. 30 is a schematic view of an optical imaging lens according to a seventh embodiment of the invention. FIGS. 31A to 31D illustrate longitudinal spherical aberration and various aberrations of the optical imaging lens according to the seventh embodiment. Referring first to FIG. 30, the optical imaging lens 10 according to the seventh embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 30.

In the optical design of the optical imaging lens 10 of the seventh embodiment, good thermal stability is provided. The room temperature of 20° C. is set as the standard under which the focal shift is 0 mm, and the focal shift is –0.0015 mm at the temperature of 0° C. When the temperature rises to 70° C., the focal shift is –0.0005 mm.

The detailed optical data of the optical imaging lens 10 of the seventh embodiment is as shown in FIG. 32. Moreover, in the optical imaging lens 10 of the seventh embodiment, the EFL of the whole system is 1.905 mm, the HFOV is 60.500°, the Fno is 2.4, the system length is 5.359 mm, and the image height is 2.525 mm.

FIG. 33 shows the various aspheric coefficients of the object-side surface 31 of the first lens element 3 to the image-side surface 72 of the fifth lens element 7 in formula (1) in the seventh embodiment.

In addition, the relationships among the important parameters pertaining to the optical imaging lens 10 of the seventh embodiment are as shown in FIGS. 68 and 69.

In FIG. 31A that illustrates the longitudinal spherical aberration at the time when the pupil radius is 0.3968 mm in the seventh embodiment, deviations of the imaging points of the off-axis rays at different heights are controlled within a range of ±9 μm. In FIGS. 31B and 31C that illustrate the two field curvature aberrations, the focal length variation of the three representative wavelengths within the entire field of view falls within ±45 μm. In FIG. 31D, the diagram of distortion aberration shows that the distortion aberration of the seventh embodiment is maintained within a range of ±25%.

It is clear from the above descriptions that the system length of the seventh embodiment is shorter than the system length of the first embodiment. The HFOV of the seventh embodiment is greater than the HFOV of the first embodiment. The seventh embodiment is better than the first embodiment in thermal stability at low temperatures.

FIG. 34 is a schematic view of an optical imaging lens according to an eighth embodiment of the invention. FIGS. 35A to 35D illustrate longitudinal spherical aberration and various aberrations of the optical imaging lens according to the eighth embodiment. Referring first to FIG. 34, the optical imaging lens 10 according to the eighth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 34.

In the optical design of the optical imaging lens 10 of the eighth embodiment, good thermal stability is provided. The room temperature of 20° C. is set as the standard under which the focal shift is 0 mm, and the focal shift is −0.0015 mm at the temperature of 0° C. When the temperature rises to 70° C., the focal shift is −0.0015 mm.

The detailed optical data of the optical imaging lens 10 of the eighth embodiment is as shown in FIG. 36. Moreover, in the optical imaging lens 10 of the eighth embodiment, the EFL of the whole system is 1.929 mm, the HFOV is 60.500°, the Fno is 2.4, the system length is 5.366 mm, and the image height is 2.525 mm.

FIG. 37 shows the various aspheric coefficients of the object-side surface 31 of the first lens element 3 to the image-side surface 72 of the fifth lens element 7 in formula (1) in the eighth embodiment.

In addition, the relationships among the important parameters pertaining to the optical imaging lens 10 of the eighth embodiment are as shown in FIGS. 68 and 69.

In FIG. 35A that illustrates the longitudinal spherical aberration at the time when the pupil radius is 0.4020 mm in the eighth embodiment, deviations of the imaging points of the off-axis rays at different heights are controlled within a range of ±10 μm. In FIGS. 35B and 35C that illustrate the two field curvature aberrations, the focal length variation of the three representative wavelengths within the entire field of view falls within ±45 μm. In FIG. 35D, the diagram of distortion aberration shows that the distortion aberration of the eighth embodiment is maintained within a range of ±26%.

It is clear from the above descriptions that the system length of the eighth embodiment is shorter than the system length of the first embodiment. The HFOV of the eighth embodiment is greater than the HFOV of the first embodiment. The eighth embodiment is better than the first embodiment in thermal stability at low temperatures.

FIG. 38 is a schematic view of an optical imaging lens according to a ninth embodiment of the invention. FIGS. 39A to 39D illustrate longitudinal spherical aberration and various aberrations of the optical imaging lens according to the ninth embodiment. Referring first to FIG. 38, the optical imaging lens 10 according to the ninth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 38.

In the optical design of the optical imaging lens 10 of the ninth embodiment, good thermal stability is provided. The room temperature of 20° C. is set as the standard under which the focal shift is 0 mm, and the focal shift is −0.002 mm at the temperature of 0° C. When the temperature rises to 70° C., the focal shift is 0.0005 mm.

The detailed optical data of the optical imaging lens 10 of the ninth embodiment is as shown in FIG. 40. Moreover, in the optical imaging lens 10 of the ninth embodiment, the EFL of the whole system is 1.826 mm, the HFOV is 60.499°, the Fno is 2.4, the system length is 5.586 mm, and the image height is 2.525 mm.

FIG. 41 shows the various aspheric coefficients of the object-side surface 31 of the first lens element 3 to the image-side surface 72 of the fifth lens element 7 in formula (1) in the ninth embodiment.

In addition, the relationships among the important parameters pertaining to the optical imaging lens 10 of the ninth embodiment are as shown in FIGS. 68 and 69.

In FIG. 39A that illustrates the longitudinal spherical aberration at the time when the pupil radius is 0.3804 mm in the ninth embodiment, deviations of the imaging points of the off-axis rays at different heights are controlled within a range of ±10 μm. In FIGS. 39B and 39C that illustrate the two field curvature aberrations, the focal length variation of the three representative wavelengths within the entire field of view falls within ±33 μm. In FIG. 39D, the diagram of distortion aberration shows that the distortion aberration of the ninth embodiment is maintained within a range of ±25%.

It is clear from the above descriptions that the HFOV of the ninth embodiment is greater than the HFOV of the first embodiment. The distortion of the ninth embodiment is smaller than the distortion of the first embodiment.

FIG. 42 is a schematic view of an optical imaging lens according to a tenth embodiment of the invention. FIGS. 43A to 43D illustrate longitudinal spherical aberration and various aberrations of the optical imaging lens according to the tenth embodiment. Referring first to FIG. 42, the optical imaging lens 10 according to the tenth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 42.

In the optical design of the optical imaging lens 10 of the tenth embodiment, good thermal stability is provided. The room temperature of 20° C. is set as the standard under which the focal shift is 0 mm, and the focal shift is −0.0015 mm at the temperature of 0° C. When the temperature rises to 70° C., the focal shift is 0.0005 mm.

The detailed optical data of the optical imaging lens 10 of the tenth embodiment is as shown in FIG. 44. Moreover, in the optical imaging lens 10 of the tenth embodiment, the EFL of the whole system is 1.868 mm, the HFOV is 60.500°, the Fno is 2.4, the system length is 5.405 mm, and the image height is 2.525 mm.

FIG. 45 shows the various aspheric coefficients of the object-side surface 31 of the first lens element 3 to the image-side surface 72 of the fifth lens element 7 in formula (1) in the tenth embodiment.

In addition, the relationships among the important parameters pertaining to the optical imaging lens 10 of the tenth embodiment are as shown in FIGS. 68 and 69.

In FIG. 43A that illustrates the longitudinal spherical aberration at the time when the pupil radius is 0.3892 mm in the tenth embodiment, deviations of the imaging points of the off-axis rays at different heights are controlled within a range of ±9 μm. In FIGS. 43B and 43C that illustrate the two field curvature aberrations, the focal length variation of the three representative wavelengths within the entire field of view falls within ±30 μm. In FIG. 43D, the diagram of distortion aberration shows that the distortion aberration of the tenth embodiment is maintained within a range of ±24%.

It is clear from the above descriptions that the system length of the tenth embodiment is shorter than the system length of the first embodiment. The HFOV of the tenth embodiment is greater than the HFOV of the first embodiment. The tenth embodiment is better than the first embodiment in thermal stability at low temperatures.

FIG. 46 is a schematic view of an optical imaging lens according to an eleventh embodiment of the invention. FIGS. 47A to 47D illustrate longitudinal spherical aberration and various aberrations of the optical imaging lens according to the eleventh embodiment. Referring first to FIG. 46, the optical imaging lens 10 according to the eleventh embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 46.

In the optical design of the optical imaging lens 10 of the eleventh embodiment, good thermal stability is provided. The room temperature of 20° C. is set as the standard under which the focal shift is 0 mm, and the focal shift is −0.0025 mm at the temperature of 0° C. When the temperature rises to 70° C., the focal shift is 0.0025 mm.

The detailed optical data of the optical imaging lens 10 of the eleventh embodiment is as shown in FIG. 48. Moreover, in the optical imaging lens 10 of the eleventh embodiment, the EFL of the whole system is 1.588 mm, the HFOV is 60.446°, the Fno is 2.4, the system length is 5.405 mm, and the image height is 2.525 mm.

FIG. 49 shows the various aspheric coefficients of the object-side surface 31 of the first lens element 3 to the image-side surface 72 of the fifth lens element 7 in formula (1) in the eleventh embodiment.

In addition, the relationships among the important parameters pertaining to the optical imaging lens 10 of the eleventh embodiment are as shown in FIGS. 70 and 71.

In FIG. 47A that illustrates the longitudinal spherical aberration at the time when the pupil radius is 0.3309 mm in the eleventh embodiment, deviations of the imaging points of the off-axis rays at different heights are controlled within a range of ±14 µm. In FIGS. 47B and 47C that illustrate the two field curvature aberrations, the focal length variation of the three representative wavelengths within the entire field of view falls within ±14 µm. In FIG. 47D, the diagram of distortion aberration shows that the distortion aberration of the eleventh embodiment is maintained within a range of ±10%.

It is clear from the above descriptions that the system length of the eleventh embodiment is shorter than the system length of the first embodiment. The HFOV of the eleventh embodiment is greater than the HFOV of the first embodiment. The distortion of the eleventh embodiment is smaller than the distortion of the first embodiment. The eleventh embodiment is easier to manufacture than the first embodiment, and therefore has a higher yield.

FIG. 50 is a schematic view of an optical imaging lens according to a twelfth embodiment of the invention. FIGS. 51A to 51D illustrate longitudinal spherical aberration and various aberrations of the optical imaging lens according to the twelfth embodiment. Referring first to FIG. 50, the optical imaging lens 10 according to the twelfth embodiment of the invention is roughly similar to that of the first embodiment, while the optical data, the aspheric coefficients and the parameters of the lens elements 3, 4, 5, 6 and 7 in the two embodiments are different to some extent. In addition, the object-side surface 51 of the third lens element 5 is a concave surface and has the concave portion 512 in the vicinity of the optical axis I and the concave portion 514 in the vicinity of the periphery of the third lens element 5. The image-side surface 52 of the third lens element 5 has the concave portion 522 in the vicinity of the optical axis I and the convex portion 523 in the vicinity of the periphery of the third lens element 5. It should be noted that, for clear illustration, some of the reference numerals of the concave portions and the convex portions same as those of the first embodiment are omitted from FIG. 50.

The detailed optical data of the optical imaging lens 10 of the twelfth embodiment is as shown in FIG. 52. Moreover, in the optical imaging lens 10 of the twelfth embodiment, the EFL of the whole system is 1.789 mm, the HFOV is 60.010°, the Fno is 2.4, the system length is 5.196 mm, and the image height is 2.525 mm.

FIG. 53 shows the various aspheric coefficients of the object-side surface 31 of the first lens element 3 to the image-side surface 72 of the fifth lens element 7 in formula (1) in the twelfth embodiment.

In addition, the relationships among the important parameters pertaining to the optical imaging lens 10 of the twelfth embodiment are as shown in FIGS. 70 and 71.

In the optical design of the optical imaging lens 10 of the twelfth embodiment, good thermal stability is provided. The room temperature of 20° C. is set as the standard under which the focal shift is 0 mm, and the focal shift is 0.002 mm at the temperature of 0° C. When the temperature rises to 70° C., the focal shift is −0.0125 mm.

In FIG. 51A that illustrates the longitudinal spherical aberration at the time when the pupil radius is 0.3727 mm in the twelfth embodiment, deviations of the imaging points of the off-axis rays at different heights are controlled within a range of ±6 µm. In FIGS. 51B and 51C that illustrate the two field curvature aberrations, the focal length variation of the three representative wavelengths within the entire field of view falls within ±38 µm. In FIG. 51D, the diagram of distortion aberration shows that the distortion aberration of the twelfth embodiment is maintained within a range of ±18%.

It is clear from the above descriptions that the system length of the twelfth embodiment is shorter than the system length of the first embodiment. The longitudinal spherical aberration of the twelfth embodiment is smaller than the longitudinal spherical aberration of the first embodiment. The distortion of the twelfth embodiment is smaller than the distortion of the first embodiment. The twelfth embodiment is easier to manufacture than the first embodiment, and therefore has a higher yield.

FIG. 54 is a schematic view of an optical imaging lens according to a thirteenth embodiment of the invention. FIGS. 55A to 55D illustrate longitudinal spherical aberration and various aberrations of the optical imaging lens according to the thirteenth embodiment. Referring first to FIG. 54, the optical imaging lens 10 according to the thirteenth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 54.

In the optical design of the optical imaging lens 10 of the thirteenth embodiment, good thermal stability is provided.

The room temperature of 20° C. is set as the standard under which the focal shift is 0 mm, and the focal shift is −0.002 mm at the temperature of 0° C. When the temperature rises to 70° C., the focal shift is 0.0005 mm.

The detailed optical data of the optical imaging lens 10 of the thirteenth embodiment is as shown in FIG. 56. Moreover, in the optical imaging lens 10 of the thirteenth embodiment, the EFL of the whole system is 1.769 mm, the HFOV is 62.000°, the Fno is 2.4, the system length is 5.434 mm, and the image height is 2.525 mm.

FIG. 57 shows the various aspheric coefficients of the object-side surface 31 of the first lens element 3 to the image-side surface 72 of the fifth lens element 7 in formula (1) in the thirteenth embodiment.

In addition, the relationships among the important parameters pertaining to the optical imaging lens 10 of the thirteenth embodiment are as shown in FIGS. 70 and 71.

In FIG. 55A that illustrates the longitudinal spherical aberration at the time when the pupil radius is 0.3686 mm in the thirteenth embodiment, deviations of the imaging points of the off-axis rays at different heights are controlled within a range of ±30 µm. In FIGS. 55B and 55C that illustrate the two field curvature aberrations, the focal length variation of the three representative wavelengths within the entire field of view falls within ±45 µm. In FIG. 55D, the diagram of distortion aberration shows that the distortion aberration of the thirteenth embodiment is maintained within a range of ±25%.

It is clear from the above descriptions that the system length of the thirteenth embodiment is shorter than the system length of the first embodiment. The HFOV of the thirteenth embodiment is greater than the HFOV of the first embodiment.

FIG. 58 is a schematic view of an optical imaging lens according to a fourteenth embodiment of the invention. FIGS. 59A to 59D illustrate longitudinal spherical aberration and various aberrations of the optical imaging lens according to the fourteenth embodiment. Referring first to FIG. 58, the optical imaging lens 10 according to the fourteenth embodiment of the invention is roughly similar to that of the first embodiment, while the optical data, the aspheric coefficients and the parameters of the lens elements 3, 4, 5, 6 and 7 in the two embodiments are different to some extent. It should be noted that, for clear illustration, some of the reference numerals of the concave portions and the convex portions same as those of the first embodiment are omitted from FIG. 58.

In the optical design of the optical imaging lens 10 of the fourteenth embodiment, good thermal stability is provided. The room temperature of 20° C. is set as the standard under which the focal shift is 0 mm, and the focal shift is −0.0015 mm at the temperature of 0° C. When the temperature rises to 70° C., the focal shift is 0 mm.

FIG. 61 shows the various aspheric coefficients of the object-side surface 31 of the first lens element 3 to the image-side surface 72 of the fifth lens element 7 in formula (1) in the fourteenth embodiment.

In addition, the relationships among the important parameters pertaining to the optical imaging lens 10 of the fourteenth embodiment are as shown in FIGS. 70 and 71.

The detailed optical data of the optical imaging lens 10 of the fourteenth embodiment is as shown in FIG. 60. Moreover, in the optical imaging lens 10 of the fourteenth embodiment, the EFL of the whole system is 1.877 mm, the HFOV is 61.807°, the Fno is 2.4, the system length is 5.392 mm, and the image height is 2.525 mm.

In FIG. 59A that illustrates the longitudinal spherical aberration at the time when the pupil radius is 0.3911 mm in the fourteenth embodiment, deviations of the imaging points of the off-axis rays at different heights are controlled within a range of ±7.5 µm. In FIGS. 59B and 59C that illustrate the two field curvature aberrations, the focal length variation of the three representative wavelengths within the entire field of view falls within ±45 µm. In FIG. 59D, the diagram of distortion aberration shows that the distortion aberration of the fourteenth embodiment is maintained within a range of ±28%.

It is clear from the above descriptions that the system length of the fourteenth embodiment is shorter than the system length of the first embodiment. The HFOV of the fourteenth embodiment is greater than the HFOV of the first embodiment. The fourteenth embodiment is better than the first embodiment in thermal stability at low temperatures. The fourteenth embodiment is better than the first embodiment in thermal stability at high temperatures.

FIG. 62 is a schematic view of an optical imaging lens according to a fifteenth embodiment of the invention. FIGS. 63A to 63D illustrate longitudinal spherical aberration and various aberrations of the optical imaging lens according to the fifteenth embodiment. Referring first to FIG. 62, the optical imaging lens 10 according to the fifteenth embodiment of the invention is roughly similar to that of the first embodiment, while the optical data, the aspheric coefficients and the parameters of the lens elements 3, 4, 5, 6 and 7 in the two embodiments are different to some extent. The image-side surface 52 of the third lens element 5 has the concave portion 522 in the vicinity of the optical axis I and the convex portion 523 in the vicinity of the periphery of the third lens element 5. The object-side surface 61 of the fourth lens element 6 has the convex portion 611 in the vicinity of the optical axis I and the concave portion 614 in the vicinity of the periphery of the fourth lens element 6. It should be noted that, for clear illustration, some of the reference numerals of the concave portions and the convex portions same as those of the first embodiment are omitted from FIG. 62.

In the optical design of the optical imaging lens 10 of the fifteenth embodiment, good thermal stability is provided. The room temperature of 20° C. is set as the standard under which the focal shift is 0 mm, and the focal shift is 0.0005 mm at the temperature of 0° C. When the temperature rises to 70° C., the focal shift is −0.007 mm.

The detailed optical data of the optical imaging lens 10 of the fifteenth embodiment is as shown in FIG. 64. Moreover, in the optical imaging lens 10 of the fifteenth embodiment, the EFL of the whole system is 1.739 mm, the HFOV is 60.180°, the Fno is 2.4, the system length is 5.290 mm, and the image height is 2.525 mm.

FIG. 65 shows the various aspheric coefficients of the object-side surface 31 of the first lens element 3 to the image-side surface 72 of the fifth lens element 7 in formula (1) in the fifteenth embodiment.

In addition, the relationships among the important parameters pertaining to the optical imaging lens 10 of the fifteenth embodiment are as shown in FIGS. 70 and 71.

In FIG. 63A that illustrates the longitudinal spherical aberration at the time when the pupil radius is 0.3623 mm in the fifteenth embodiment, deviations of the imaging points of the off-axis rays at different heights are controlled within a range of ±10 µm. In FIGS. 63B and 63C that illustrate the two field curvature aberrations, the focal length variation of the three representative wavelengths within the entire field of view falls within ±30 µm. In FIG. 63D, the diagram of distortion aberration shows that the distortion aberration of the fifteenth embodiment is maintained within a range of ±17%.

It is clear from the above descriptions that the system length of the fifteenth embodiment is shorter than the system length of the first embodiment. The HFOV of the fifteenth embodiment is greater than the HFOV of the first embodiment. The distortion of the fifteenth embodiment is smaller than the distortion of the first embodiment. The fifteenth embodiment is better than the first embodiment in thermal stability at low temperatures.

Then, referring to FIGS. 66, 67, 68, 69, 70 and 71, FIGS. 66, 67, 68, 69, 70 and 71 are tables showing the various optical parameters of the first embodiment to the fifteenth embodiment.

To shorten the system length of the lens elements and maintain the imaging quality, it is one of the means of the invention to suitably reduce the air gaps among the lens elements or to shorten the thicknesses of the lens elements. However, considering the level of difficulty of manufacturing, a better arrangement can be provided if the numerical values satisfy the following conditional expressions:

$(T1+G12+T2)/(G23+T5) \geq 2.800$, preferably $7.100 \geq (T1+G12+T2)/(G23+T5) \geq 2.800$;

$ALT/(G45+T5) \geq 6.300$, preferably $10.200 \geq ALT/(G45+T5) \geq 6.300$;

$EFL/(T1+T3) \geq 2.300$, preferably $3.600 \geq EFL/(T1+T3) \geq 2.300$;

$ALT/AAG \geq 2.000$, preferably $4.500 \geq ALT/AAG \geq 2.000$;

$TL/(T2+T3) \leq 5.500$, preferably $2.800 \leq TL/(T2+T3) \leq 5.500$;

$ALT/T1 \leq 9.500$, preferably $5.500 \leq ALT/T1 \leq 9.500$;

$TTL/(G34+T4) \leq 5.500$, preferably $3.000 \leq TTL/(G34+T4) \leq 5.500$;

$(T2+T4)/T5 \geq 4.800$, preferably $7.700 \geq (T2+T4)/T5 \geq 4.800$;

$(T1+G12)/(T3+G34) \geq 2.000$, preferably $4.800 \geq (T1+G12)/(T3+G34) \geq 2.000$;

$(T2+T5)/T1 \geq 2.000$, preferably $4.500 \geq (T2+T5)/T1 \geq 2.000$;

$(G12+T2)/T3 \geq 5.000$, preferably $12.500 \geq (G12+T2)/T3 \geq 5.000$;

$(G12+G23+G34)/T5 \leq 4.500$, preferably $2.000 \leq (G12+G23+G34)/T5 \leq 4.500$;

$(G12+T4)/(G23+T3) \geq 4.900$, preferably $8.500 \geq (G12+T4)/(G23+T3) \geq 4.900$;

$T2/T3 \geq 2.500$, preferably $5.500 \geq T2/T3 \geq 2.500$;

$T_{max}/T_{min} \geq 4.400$, preferably $10.300 \geq T_{max}/T_{min} \geq 4.400$;

$ALT/(G12+G23+G34) \geq 2.000$, preferably $4.800 \geq ALT/(G12+G23+G34) \geq 2.000$;

$EFL/AAG \geq 1.000$, preferably $3.000 \geq EFL/AAG \geq 1.000$;

$(T2+G23)/(T3+G45) \geq 2.800$, preferably $4.500 \geq (T2+G23)/(T3+G45) \geq 2.800$;

$T4/T5 \leq 4.000$, preferably $2.700 \leq T4/T5 \leq 4.000$; and $AAG/(T3+G34) \leq 5.000$, preferably $2.000 \leq AAG/(T3+G34) \leq 5.000$.

In addition, limitations may be added to the lens by selecting any combination of the parameters from the embodiments, so as to facilitate design of the lens having the same framework as that of the invention. In view of unpredictability in designing an optical system, under the framework of the invention, by satisfying the above conditional expressions, the optical imaging lens of the invention can preferably have a reduced system length, improved imaging quality or an improved assembly yield, thereby overcoming the defects of the prior art.

The aforementioned limitation relations are provided in an exemplary sense and can be selectively combined and applied to the embodiments of the invention in different manners; the invention should not be limited to the above examples. In implementation of the invention, apart from the aforementioned relations, it is also possible to design additional detailed structure such as more arrangements of concave and convex curved surfaces with respect to a single lens element or extensively with respect to a plurality of lens elements, so as to enhance control of system performance and/or resolution. For instance, on the object-side surface of the third lens element, an additional concave portion in the vicinity of the periphery of the third lens element may be selectively formed. It should be noted that these details can be optionally combined and applied to the other embodiments of the invention under the condition where they are not in conflict with one another.

In summary, the optical imaging lens 10 of the embodiments of the invention may achieve the following effects and advantages:

1. The longitudinal spherical aberrations, astigmatic aberrations and distortions of each of the embodiments of the invention are all compliant with usage regulations. In addition, the off-axis rays of the three representative wavelengths (i.e., red, green and blue) at different heights are all concentrated around the imaging point. According to the deviation range of each curve, it can be seen that deviations of the imaging points of the off-axis rays at different heights are all controlled to achieve a good capability to suppress spherical aberration, aberration and distortion. Further, with reference to the imaging quality data, distances among the three representative wavelengths (i.e., red, green and blue) are quite close, which shows that in the invention, rays of different wavelengths are well concentrated under different circumstances and thus an excellent dispersion suppressing capability is provided. To sum up, by designing and combining the lens elements, the invention can achieve excellent imaging quality.

2. The first lens element 3 has negative refractive power, which is conducive to increasing the HFOV of the system.

3. It is designed that the object-side surface 31 of the first lens element 3 has the convex portion 311 in the vicinity of the optical axis I, the object-side surface 41 of the second lens element 4 has the convex portion 413 in the vicinity of the periphery of the second lens element 4, and the image-side surface 42 of the second lens element 4 has the convex portion 421 in the vicinity of the optical axis I, and thus light can be effectively concentrated. In addition, it is designed that the image-side surface 52 of the third lens element 5 has the concave portion 522 in the vicinity of the optical axis I, the fifth lens element 7 has negative refractive power, and the image-side surface 72 of the fifth lens element 7 has the concave portion 722 in the vicinity of the optical axis I and the convex portion 723 in the vicinity of the periphery of the fifth lens element 7, and thus a good aberration correction effect is achieved.

4. In the optical imaging lens 10 of the embodiments of the invention, at least one lens element having positive refractive power and made of glass is used to achieve the effect of improving thermal stability. To be specific, during the temperature rise from 0° C. to 70° C., the focal shift of the optical imaging lens 10 of the embodiments of the invention does not exceed 0.019 mm.

5. The fourth lens element 6 has positive refractive power and is made of glass, thus having the best thermal stability.

The numerical ranges including the maximum and minimum values and values between the maximum and minimum values obtained by the ratio relationships from various combinations among the optical parameters disclosed in the embodiments of the invention can all be implemented accordingly.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens, comprising a first lens element, a second lens element, a third lens element, a fourth lens element and a fifth lens element arranged in sequence from an object side to an image side along an optical axis, wherein the first lens element to the fifth lens element each comprises an object-side surface facing the object side and allowing an imaging ray to pass therethrough and an image-side surface facing the image side and allowing the imaging ray to pass therethrough;

the first lens element has negative refractive power, and the object-side surface of the first lens element has a convex portion in a vicinity of the optical axis;

the object-side surface of the second lens element has a convex portion in a vicinity of a periphery of the second lens element, and the image-side surface of the second lens element has a convex portion in the vicinity of the optical axis;

the image-side surface of the third lens element has a concave portion in the vicinity of the optical axis;

the object-side surface of the fourth lens element has a concave portion in a vicinity of a periphery of the fourth lens element; and the fifth lens element has negative refractive power, and the image-side surface of the fifth lens element has a concave portion in the vicinity of the optical axis and a convex portion in a vicinity of a periphery of the fifth lens element, wherein the optical imaging lens comprises at least one lens element having positive refractive power and made of glass, and among the lens elements of the optical imaging lens, only the aforementioned five lens elements have refractive power, and the optical imaging lens satisfies:

$(T1+G12+T2)/(G23+T5) \geq 2.800$; and $ALT/(G45+T5) \geq 6.300$, wherein T1 represents a central thickness of the first lens element along the optical axis, T2 represents a central thickness of the second lens element along the optical axis, T5 represents a central thickness of the fifth lens element along the optical axis, G12 represents an air gap between the first lens element and the second lens element along the optical axis, G23 represents an air gap between the second lens element and the third lens element along the optical axis, G45 represents an air gap between the fourth lens element and the fifth lens element along the optical axis, and ALT represents a sum of the central thicknesses of the first lens element, the second lens element, the third lens element, the fourth lens element and the fifth lens element along the optical axis.

2. The optical imaging lens as claimed in claim 1, wherein the optical imaging lens further satisfies: $EFL/(T1+T3) \geq 2.300$, wherein T3 represents a central thickness of the third lens element along the optical axis, and EFL represents a system focal length of the optical imaging lens.

3. The optical imaging lens as claimed in claim 1, wherein the optical imaging lens further satisfies: $ALT/AAG \geq 2.000$, wherein AAG represents a sum of four air gaps between the first lens element and the fifth lens element along the optical axis.

4. The optical imaging lens as claimed in claim 1, wherein the optical imaging lens further satisfies: $TL/(T2+T3) \leq 5.500$, wherein T3 represents a central thickness of the third lens element along the optical axis, and TL represents a distance from the object-side surface of the first lens element to the image-side surface of the fifth lens element along the optical axis.

5. The optical imaging lens as claimed in claim 1, wherein the optical imaging lens further satisfies: $ALT/T1 \leq 9.500$.

6. The optical imaging lens as claimed in claim 1, wherein the optical imaging lens further satisfies: $TTL/(G34+T4) \leq 5.500$, wherein T4 represents a central thickness of the fourth lens element along the optical axis, G34 represents an air gap between the third lens element and the fourth lens element along the optical axis, and TTL represents a distance from the object-side surface of the first lens element to an image plane of the optical imaging lens along the optical axis.

7. The optical imaging lens as claimed in claim 1, wherein the optical imaging lens further satisfies: $(T2+T4)/T5 \geq 4.800$, wherein T4 represents a central thickness of the fourth lens element along the optical axis.

8. The optical imaging lens as claimed in claim 1, wherein the optical imaging lens further satisfies: $(T1+G12)/(T3+G34) \geq 2.000$, wherein T3 represents a central thickness of the third lens element along the optical axis, and G34 represents an air gap between the third lens element and the fourth lens element along the optical axis.

9. The optical imaging lens as claimed in claim 1, wherein the optical imaging lens further satisfies: $(T2+T5)/T1 \geq 2.000$.

10. The optical imaging lens as claimed in claim 1, wherein the optical imaging lens further satisfies: $(G12+T2)/T3 \geq 5.000$, wherein T3 represents a central thickness of the third lens element along the optical axis.

11. The optical imaging lens as claimed in claim 1, wherein the optical imaging lens further satisfies: $(G12+G23+G34)/T5 \leq 4.500$, wherein G34 represents an air gap between the third lens element and the fourth lens element along the optical axis.

12. The optical imaging lens as claimed in claim 1, wherein the optical imaging lens further satisfies: $(G12+T4)/(G23+T3) \geq 4.900$, wherein T3 represents a central thickness of the third lens element along the optical axis, and T4 represents a central thickness of the fourth lens element along the optical axis.

13. The optical imaging lens as claimed in claim 1, wherein the optical imaging lens further satisfies:

$T2/T3 \geq 2.500$, wherein T3 represents a central thickness of the third lens element along the optical axis.

14. The optical imaging lens as claimed in claim 1, wherein the optical imaging lens further satisfies: $T_{max}/T_{min} \geq 4.400$, wherein $T_{max}$ represents a maximum value among the central thicknesses of the first lens element, the second lens element, the third lens element, the fourth lens element and the fifth lens element along the optical axis, and $T_{min}$ represents a minimum value among the central thicknesses of the first lens element, the second lens element, the third lens element, the fourth lens element and the fifth lens element along the optical axis.

15. The optical imaging lens as claimed in claim 1, wherein the optical imaging lens further satisfies: $ALT/(G12+G23+G34) \geq 2.000$, wherein G34 represents an air gap between the third lens element and the fourth lens element along the optical axis.

16. The optical imaging lens as claimed in claim 1, wherein the optical imaging lens further satisfies: $EFL/AAG \geq 1.000$, wherein EFL represents an effective focal length of the optical imaging lens, and AAG represents a sum of four air gaps between the first lens element and the fifth lens element along the optical axis.

17. The optical imaging lens as claimed in claim 1, wherein the optical imaging lens further satisfies: $(T2+G23)/(T3+G45) \geq 2.800$, wherein T3 represents a central thickness of the third lens element along the optical axis.

18. The optical imaging lens as claimed in claim 1, wherein the optical imaging lens further satisfies: $T4/T5 \leq 4.000$, wherein T4 represents a central thickness of the fourth lens element along the optical axis.

19. The optical imaging lens as claimed in claim 1, wherein the optical imaging lens further satisfies: $AAG/(T3+G34) \leq 5.000$, wherein AAG represents a sum of four air gaps between the first lens element and the fifth lens element along the optical axis, T3 represents a central thickness of the third lens element along the optical axis, and G34 represents the air gap between the third lens element and the fourth lens element along the optical axis.

20. The optical imaging lens as claimed in claim 1, wherein the fourth lens element has positive refractive power and is made of glass.

\* \* \* \* \*